United States Patent
Harada et al.

(10) Patent No.: US 10,511,014 B2
(45) Date of Patent: *Dec. 17, 2019

(54) BATTERY MODULE AND BATTERY PACK

(71) Applicant: Kabushiki Kaisha Toshiba, Minato-ku (JP)

(72) Inventors: Yasuhiro Harada, Isehara (JP); Norio Takami, Yokohama (JP); Yorikazu Yoshida, Yokohama (JP); Kazuki Ise, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/265,222

(22) Filed: Sep. 14, 2016

(65) Prior Publication Data

US 2017/0005322 A1 Jan. 5, 2017

Related U.S. Application Data

(63) Continuation of application No. PCT/JP2016/052708, filed on Jan. 29, 2016.

(30) Foreign Application Priority Data

Jan. 30, 2015 (JP) ................... 2015-017227
Mar. 13, 2015 (JP) ................... 2015-050791

(51) Int. Cl.
  *H01M 4/131*   (2010.01)
  *H01M 4/485*   (2010.01)
  (Continued)

(52) U.S. Cl.
  CPC ......... *H01M 4/131* (2013.01); *H01M 2/1077* (2013.01); *H01M 2/348* (2013.01);
  (Continued)

(58) Field of Classification Search
  None
  See application file for complete search history.

(56) References Cited

U.S. PATENT DOCUMENTS

| 5,478,674 A | 12/1995 | Miyasaka |
| 6,075,346 A | 6/2000 | Kikuchi et al. |

(Continued)

FOREIGN PATENT DOCUMENTS

| CN | 101154729 A | 4/2008 |
| CN | 102544446 | 7/2012 |

(Continued)

OTHER PUBLICATIONS

Office Action dated Jan. 31, 2017 in Korean Patent Application No. 10-2016-0027533.

(Continued)

*Primary Examiner* — Carmen V Lyles-Irving
(74) *Attorney, Agent, or Firm* — Oblon, McClelland, Maier & Neustadt, L.L.P.

(57) ABSTRACT

According to one embodiment, there is provided a battery module. The battery module includes five nonaqueous electrolyte batteries electrically connected in series. The five nonaqueous electrolyte batteries each include a positive electrode, a negative electrode, and a nonaqueous electrolyte. The negative electrode includes an active material including a titanium-including composite oxide. The titanium-including composite oxide includes Na and a metal element M within a crystal structure. The metal element M is at least one selected from the group consisting of Zr, Sn, V, Nb, Ta, Mo, W, Fe, Co, Mn, and Al.

17 Claims, 18 Drawing Sheets

(51) Int. Cl.
*H01M 2/10* (2006.01)
*H01M 2/34* (2006.01)
*H01M 10/44* (2006.01)
*H02J 7/00* (2006.01)
*H01M 10/48* (2006.01)

(52) U.S. Cl.
CPC .......... *H01M 4/485* (2013.01); *H01M 10/44* (2013.01); *H02J 7/0026* (2013.01); *H01M 10/486* (2013.01); *H01M 2220/20* (2013.01); *H01M 2300/0017* (2013.01)

(56) References Cited

U.S. PATENT DOCUMENTS

| | | | |
|---|---|---|---|
| 7,789,796 B2 | 9/2010 | Choi | |
| 9,812,704 B2 | 11/2017 | Inagaki et al. | |
| 2002/0182488 A1 | 12/2002 | Cho et al. | |
| 2004/0131941 A1 | 7/2004 | Belharouak et al. | |
| 2004/0185347 A1 | 9/2004 | Kim et al. | |
| 2004/0202934 A1 | 10/2004 | Zaghib et al. | |
| 2007/0148545 A1 | 6/2007 | Amine et al. | |
| 2008/0078594 A1 | 4/2008 | Harada et al. | |
| 2008/0226985 A1 | 9/2008 | Nobuta et al. | |
| 2009/0042095 A1 | 2/2009 | Inagaki et al. | |
| 2009/0104533 A1* | 4/2009 | Takeuchi | H01M 4/364 429/231.1 |
| 2009/0286157 A1 | 11/2009 | Chen et al. | |
| 2009/0305132 A1 | 12/2009 | Gauthier et al. | |
| 2011/0121240 A1 | 5/2011 | Amine et al. | |
| 2011/0217593 A1 | 9/2011 | Dollinger et al. | |
| 2011/0269021 A1 | 11/2011 | Fu et al. | |
| 2011/0293507 A1 | 12/2011 | Dambournet et al. | |
| 2012/0070744 A1 | 3/2012 | Moriyama et al. | |
| 2012/0081070 A1 | 4/2012 | Wook et al. | |
| 2012/0225346 A1 | 9/2012 | Hoshina | |
| 2012/0328930 A1* | 12/2012 | Inagaki | H01M 4/485 429/163 |
| 2013/0209897 A1 | 8/2013 | Paranthaman et al. | |
| 2013/0260210 A1 | 10/2013 | Takami et al. | |
| 2014/0001401 A1* | 1/2014 | Watanabe | H01M 4/386 252/182.1 |
| 2014/0295231 A1 | 10/2014 | Ise et al. | |
| 2014/0306149 A1 | 10/2014 | Tarascon et al. | |
| 2014/0312269 A1 | 10/2014 | Laumann et al. | |
| 2014/0356725 A1 | 12/2014 | Zaghib et al. | |
| 2015/0010820 A1 | 1/2015 | Takami et al. | |
| 2015/0076750 A1 | 3/2015 | Huang et al. | |
| 2015/0255789 A1 | 9/2015 | Bi et al. | |
| 2015/0333326 A1 | 11/2015 | Lee et al. | |
| 2016/0226067 A1 | 8/2016 | Harada et al. | |
| 2016/0268592 A1 | 9/2016 | Inagaki et al. | |
| 2016/0268603 A1 | 9/2016 | Harada et al. | |
| 2016/0276650 A1 | 9/2016 | Hoshina et al. | |
| 2017/0005322 A1 | 1/2017 | Harada et al. | |
| 2017/0069910 A1 | 3/2017 | Harada et al. | |
| 2017/0077508 A1 | 3/2017 | Hoshina et al. | |
| 2017/0077509 A1 | 3/2017 | Ise et al. | |
| 2017/0162872 A1 | 6/2017 | Takami et al. | |

FOREIGN PATENT DOCUMENTS

| | | |
|---|---|---|
| CN | 102969492 | 3/2013 |
| CN | 103811738 | 5/2014 |
| CN | 105185972 | 12/2015 |
| EP | 2784855 | 3/2014 |
| EP | 3145004 | 9/2016 |
| EP | 3 229 296 A1 | 10/2017 |
| JP | 6-310143 | 11/1994 |
| JP | 10-208747 | 8/1998 |
| JP | 2001-143702 | 5/2001 |
| JP | 2005-267940 A | 9/2005 |
| JP | 2007-227199 | 9/2007 |
| JP | 2008-91079 A | 4/2008 |
| JP | 2008-542979 A | 11/2008 |
| JP | 2009-43679 A | 2/2009 |
| JP | 4237659 B2 | 3/2009 |
| JP | 2010-123424 | 6/2010 |
| JP | 2013-008493 A | 1/2013 |
| JP | 2014-103032 | 6/2014 |
| JP | 2014-238960 | 12/2014 |
| JP | 2015-35420 | 2/2015 |
| JP | 2015-46218 | 3/2015 |
| KR | 10-2014-0117273 A | 10/2014 |
| WO | 2012002364 | 1/2014 |
| WO | WO 2016/088193 A1 | 6/2016 |
| WO | 2017073765 | 5/2017 |

OTHER PUBLICATIONS

I. Belharouak, et al., "$Li_2MTi_8O_{14}$ (M=Sr, Ba): new anodes for lithium-ion batteries" Electrochemistry Communications, 5, 2003, pp. 435-438.
S. Y. Yin, et al., "Reversible lithium storage in $Na_2Li_2Ti_8O_{14}$ as anode for lithium ion batteries" Electrochemistry Communications, 11, 2009, pp. 1251-1254.
Extended European Search Report dated Jun. 10, 2016 in Patent Application No. 16153345.0.
Zonghai Chen, et al., "Titanium-Based Anode Materials for Safe Lithium-Ion Batteries" Advanced Functional Materials, vol. 23, XP001581750, 2013, pp. 959-969.
Kaiqiang Wu, et al., "Phase composition and electrochemical performance of sodium lithium titanates as anode materials for lithium rechargeable batteries" Journal of Power Sources, vol. 275, XP029109324, 2015, pp. 419-428.
I. Koseva, et al., "A new family of isostructural titanates, $MLi_2Ti_6O_{14}$ (M=Sr, Ba, Pb)" Journal of Alloys and Compounds, vol. 389, XP027812612, 2005, pp. 47-54.
Damien Dambournet, et al., "$MLi_2 Ti_6O_{14}$ (M=Sr, Ba, 2Na) Lithium Insertion Titanate Materials: A Comparative Study" Inorganic Chemistry, vol. 49, XP055273926, 2010, pp. 2822-2826.
Office Action dated Jun. 9, 2017 in U.S. Appl. No. 15/066,402, filed Mar. 10, 2016.
Japanese Office Action dated Jul. 12, 2016 in Patent Application No. 2016-041529 (with English language translation).
Japanese Office Action dated Jul. 12, 2016 in Patent Application No. 2016-088372 (with English language translation).
Japanese Office Action dated Jul. 12, 2016 in Patent Application No. 2016-088601 (with unedited computer generated English translation).
European Office Action dated Jul. 13, 2016 in Patent Application No. 16159127.6.
Japanese Office Action dated Jul. 12, 2016 in Patent Application No. 2016-015626 (with unedited computer generated English translation).
Mengmeng Lao, et al., "Preparation and Electrochemical. Characterization of $Li_{2+x}Na_{2-x}Ti_6O_{14}$ (O<x<0.2) as Anode Materials for Lithium-ion Batteries" Ceramics International, Elsevier, vol. 41, No. 2, XP029106099, Oct. 27, 2014, pp. 2900-2907.
A. Detcheva et al., "Analysis of Single Crystals Based on Strontium-Lithium-Titanium Oxides by Inductively Coupled Plasma Atomic Emission Spectrometry" Spectrochimica Acta Part B: Elsevier, vol. 58, No. 8, XP004703791, Aug. 15, 2003, pp. 1481-1488.
Pengfei Wang, et al., "Improved Lithium Storage Performance of Lithium Sodium Titanate Anode by Titanium Site Substitution with Aluminum" Journal of Power Sources, Elsevier, vol. 293, XP055285710, May 20, 2015, pp. 33-41.
International Search Report dated May 10, 2016 in PCT/JP2016/052708 filed Jan. 29, 2016 (with English translation).
Mengmeng Lao, et al., "Enhanced electrochemical properties of $Mg^{2+}$ doped $Li_2Na_2Ti_6O_{14}$ anode material for lithium-ion batteries", Electrochimica Acta, 196, 2016, pp. 642-652.
Seongjun Bae, et al., "Tunable lithium storage properties of metal lithium titanates by stoichiometric modulation", Electrochemistry Communications, 64, 2016, pp. 26-29.
Hongbin Wu et al., "Sr-Doped $Li_4Ti_5O_{12}$ as the Anode Material for Lithium-Ion Batteries," *Solid State Ionics*, 232 (2013) 13-18.

(56) References Cited

OTHER PUBLICATIONS

Kaiqiang Wu et al., "Enhanced electrochemical performance of sodium lithium titanate by coating various carbons", Journal of Power Sources, 272(2014) 283-290 (Year:2014).

Kaiqiang Wu, et al., "Copper/Carbon Coated Lithium Sodium Titanate as Advanced Anode Material for Lithium-ion Batteries", Journal of Power Sources. 2014, vol. 259, pp. 177-182.

Bin-Na Yun, et al. Improved electrochemical performance of boron-doped carbon-coated lithium titanate as an anode material for sodium-ion batteries, Journal of Materials Chemistry A, 5, 2017, pp. 2802-2810.

B. Prihandoko, et al. "Variation of Carbon Coating on $Li_2Na_2Ti_6O_{14}$ as Anode Material of Lithium Battery", IOP Conference Series: Materials Science and Engineering, 202, 2017, 7 pages.

What Is Carbon Black? (accessed on :Jan. 22, 2019). Retrieved from https://www.thecarycompany.com/media/pdf/specs/orion-what-is-carbon-black.pdf(Year:2015).

Izumi Nakai, et al., "Funmatsu X sen Kaisetsu no Jissai" Reality of Powder X-Ray Analysis, X-Ray Analysis Investigation Conversazione, The Japan Society for Analytical Chemistry. 2002, 7 pages. (with machine translation).

\* cited by examiner

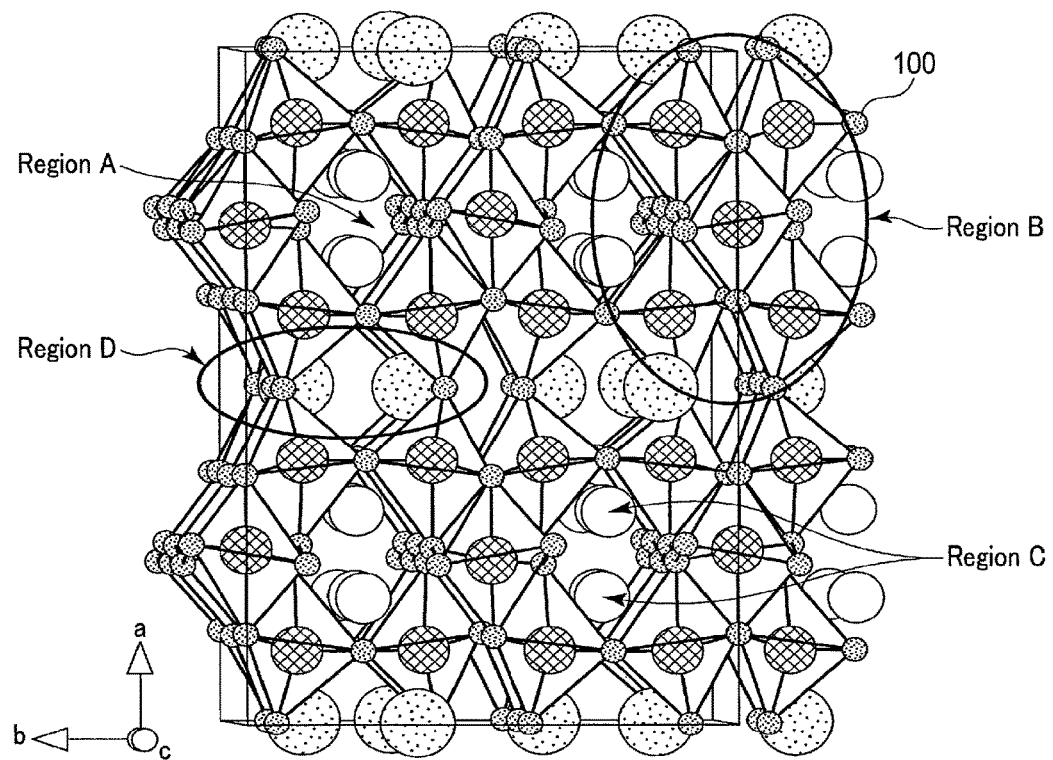
F I G. 2

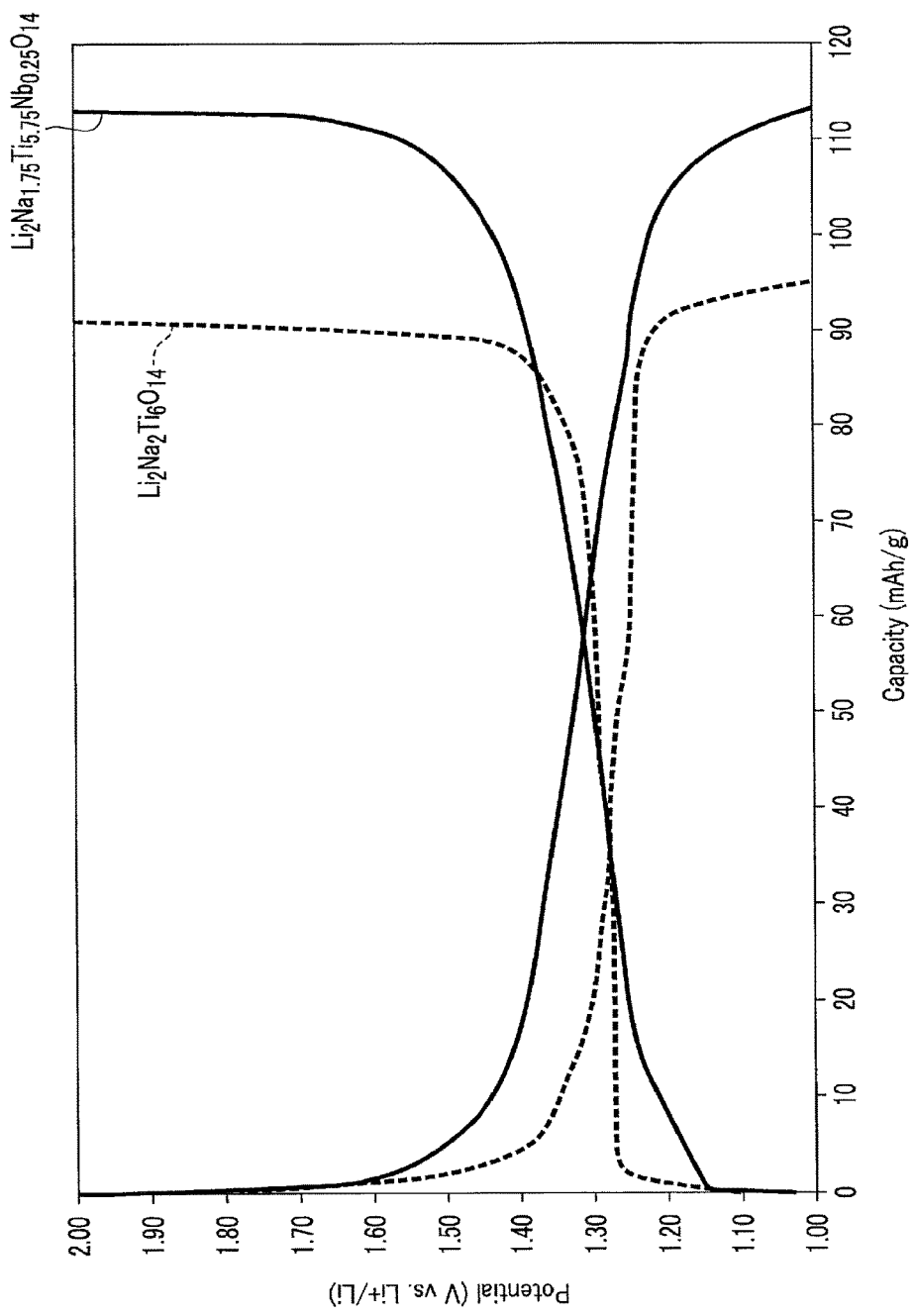
F I G. 4

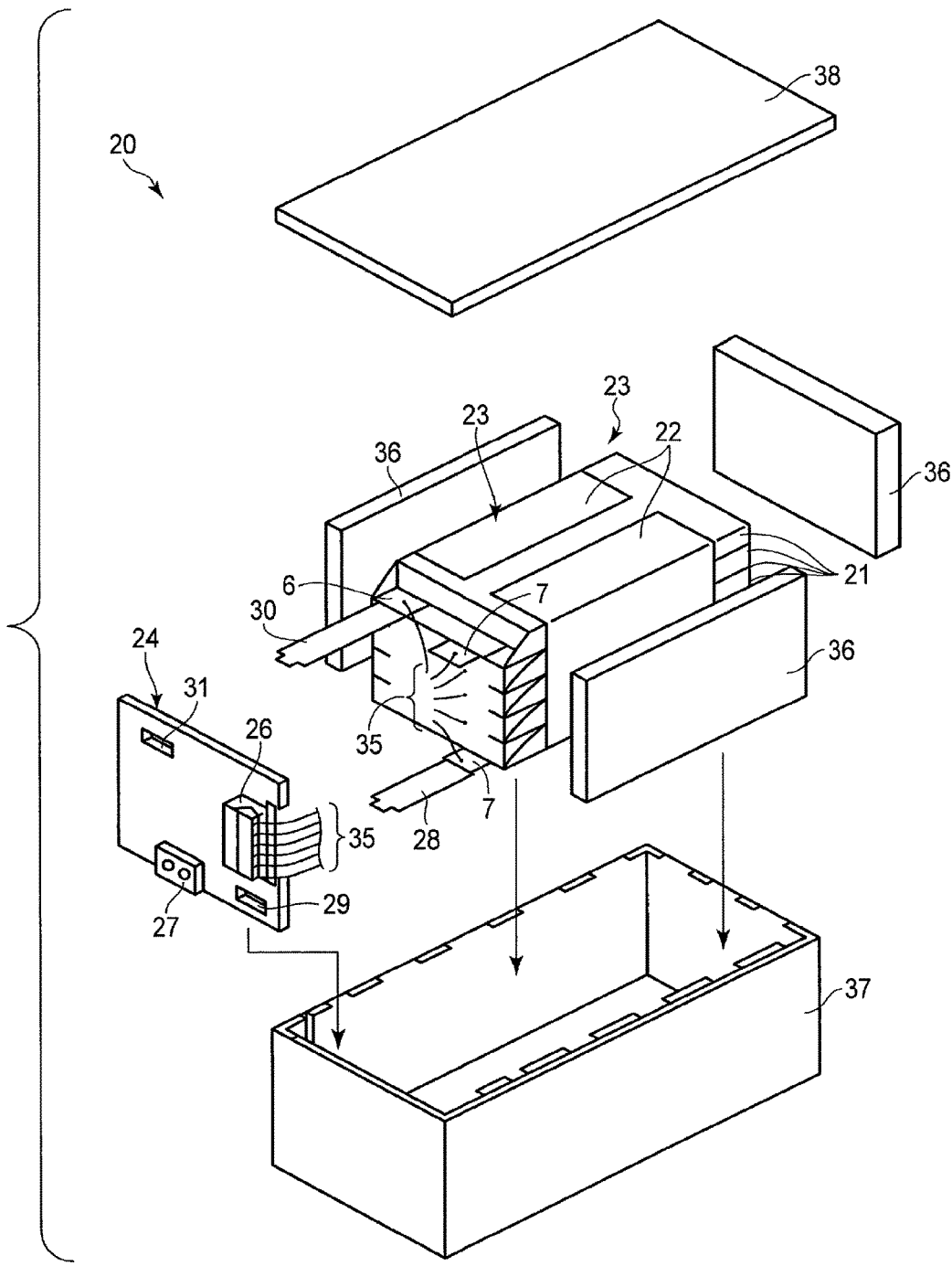
F I G. 10

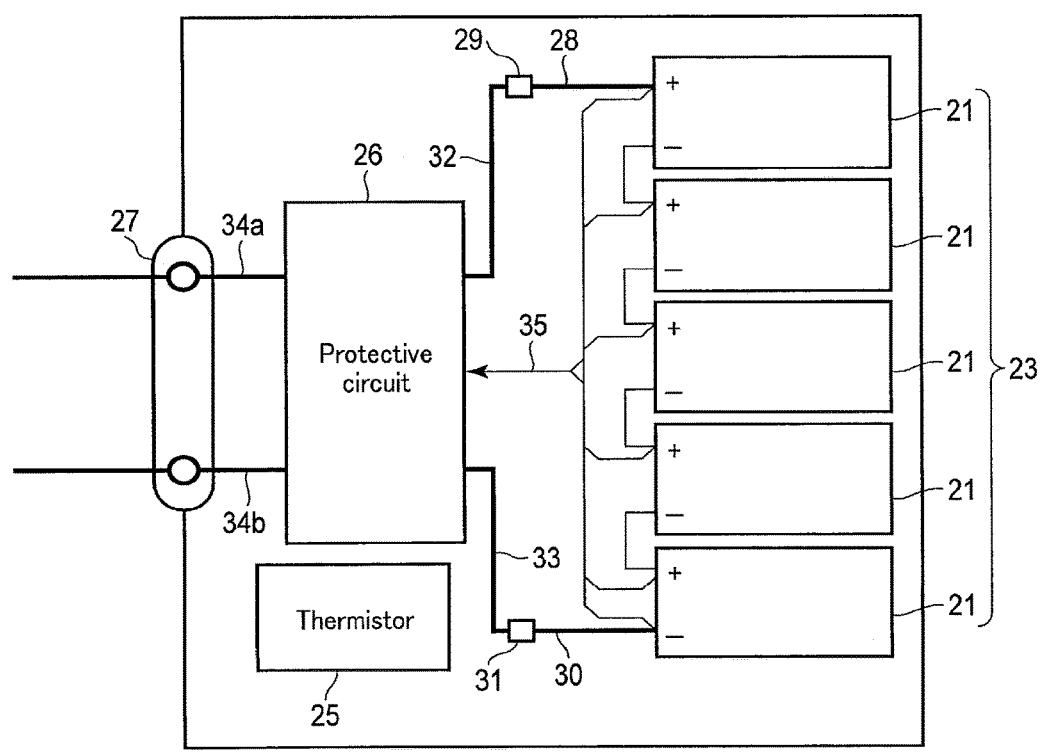
F I G. 11

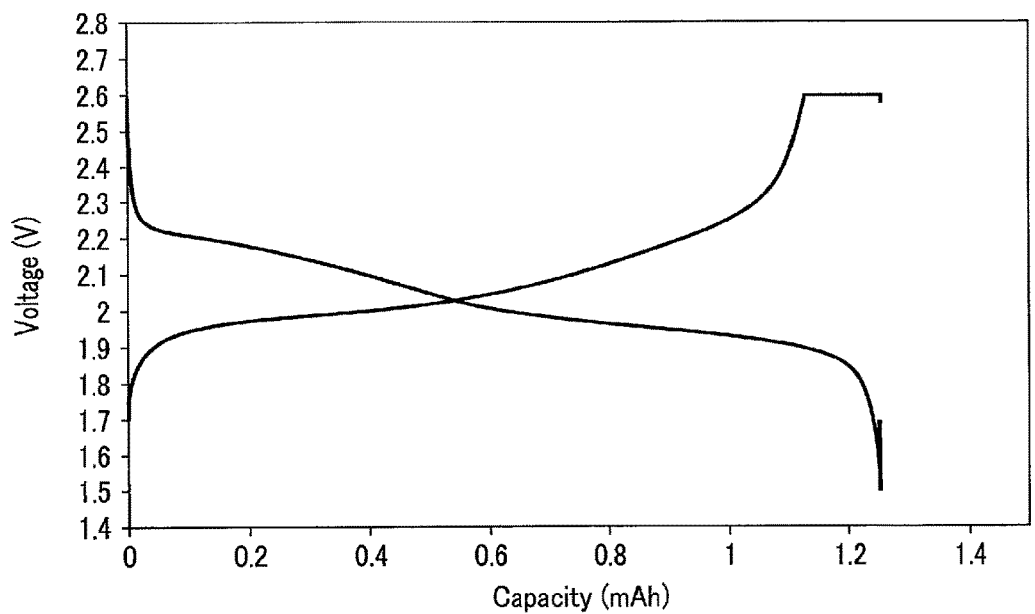
F I G. 14
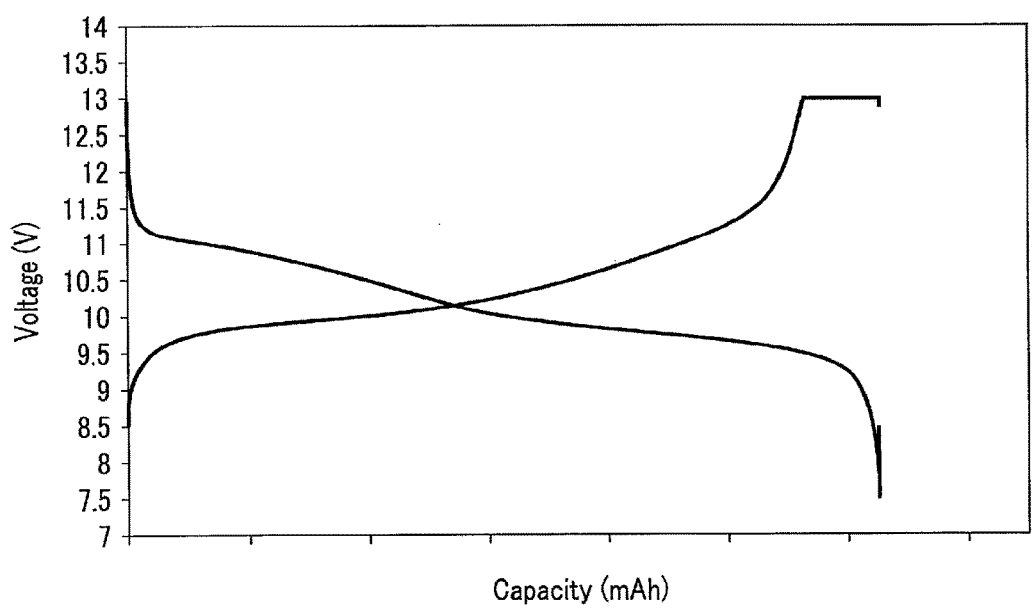
F I G. 15

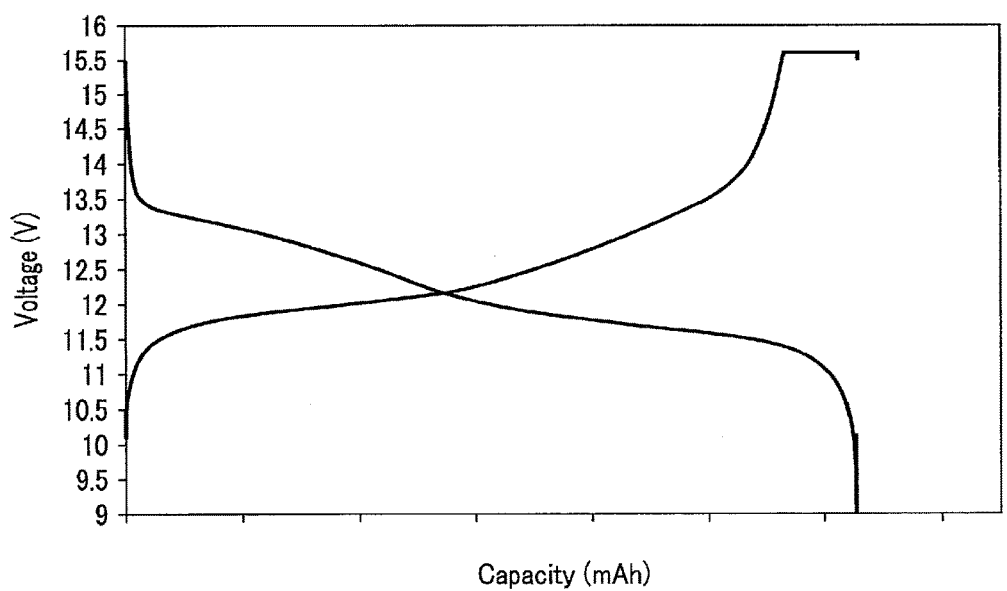
F I G. 16

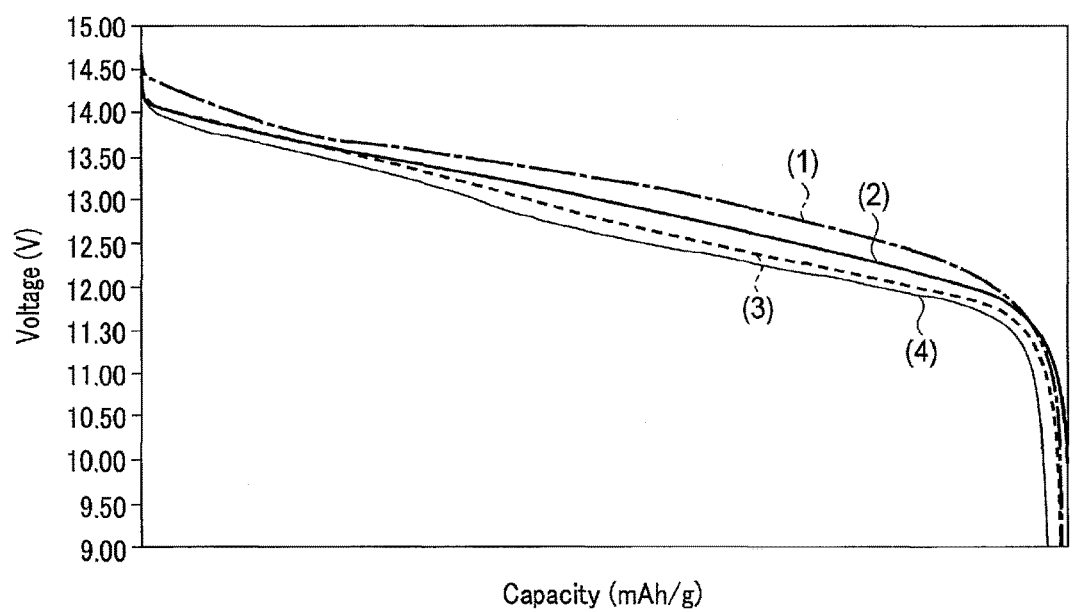
F I G. 21

BATTERY MODULE AND BATTERY PACK

CROSS-REFERENCE TO RELATED APPLICATIONS

This application is a Continuation Application of PCT Application No. PCT/JP2016/052708, filed Jan. 29, 2016, and based upon and claiming the benefit of priority from Japanese Patent Application No. 2015-017227, filed Jan. 30, 2015, Japanese Patent Application No. 2015-050791, filed Mar. 13, 2015, the entire contents of all of which are incorporated herein by reference.

FIELD

Embodiments of the present invention relate generally to a battery module and a battery pack.

BACKGROUND

Recently, a nonaqueous electrolyte battery such as a lithium ion secondary battery has been actively researched and developed as a high energy-density battery. The nonaqueous electrolyte battery is expected to be used as a power source for hybrid vehicles, electric cars, an uninterruptible power supply for base stations for portable telephone, or the like. Therefore, the nonaqueous electrolyte battery is demanded to, in addition to having a high energy density, be excellent in other performances such as rapid charge-and-discharge performances and long-term reliability, as well. For example, a nonaqueous electrolyte battery enabling rapid charge-and-discharge not only remarkably shortens a charging time but also makes it possible to improve performances related to motivity and to efficiently recover regenerative energy from motivity, in a hybrid vehicle or the like.

In order to enable rapid charge-and-discharge, electrons and lithium ions must be able to migrate rapidly between the positive electrode and the negative electrode. However, when a battery using a carbon-based negative electrode is repeatedly subjected to rapid charge-and-discharge, dendrite precipitation of metallic lithium occurs on the electrode, raising concern to heat generation and fires caused by internal short circuits.

In light of this, a battery using a metal composite oxide in place of a carbonaceous material in the negative electrode has been developed. In particular, in a battery using titanium oxide as the negative electrode active material, rapid charge-and-discharge can be stably performed. Such a battery also has a longer life than those using a negative electrode with carbonaceous material.

However, compared to carbonaceous materials, titanium oxide has a higher potential relative to metallic lithium. That is, titanium oxide is more noble. Furthermore, titanium oxide has a lower capacity per weight. Therefore, a battery using titanium oxide as the negative electrode active material has a problem that the energy density is lower. In particular, when a material having a high potential relative to metallic lithium is used as a negative electrode material, the voltage becomes lower than that of a conventional battery using a carbonaceous material. Therefore, when the battery is used for systems requiring a high voltage such as an electric vehicle and a large-scale electric power storage system, there is a problem that the number of batteries connected in a series becomes large.

The potential of the electrode using titanium oxide is about 1.5 V relative to metallic lithium and is higher (more noble) than that of the negative electrode with carbonaceous material. The potential of titanium oxide arises from the redox reaction between $Ti^{3+}$ and $Ti^{4+}$ when lithium is electrochemically absorbed and released, and is therefore limited electrochemically. It has therefore been conventionally difficult to drop the potential of the electrode in order to improve the energy density.

BRIEF DESCRIPTION OF THE DRAWINGS

FIG. 2 is a view of a crystal structure of $Li_2(Sr_{0.75}Na_{0.25})Ti_{5.75}Nb_{0.25}O_{14}$ as an example of a composite oxide having symmetry of a space group Cmca;

FIG. 4 shows a charge-and-discharge curve of a composite oxide $Li_2Na_2Ti_6O_{14}$, and a charge-and-discharge curve of a composite oxide $Li_2Na_{1.75}Ti_{5.75}Nb_{0.25}O_{14}$;

FIG. 10 is an exploded perspective view of an example of a battery pack according to a second embodiment;

FIG. 11 is a block diagram showing an electric circuit of the battery pack of FIG. 10;

FIG. 14 shows a charge-and-discharge curve of a nonaqueous electrolyte battery of Example E;

FIG. 15 shows a charge-and-discharge curve of a battery module of Example F; and FIG. 16 shows a charge-and-discharge curve of a battery module of Example G.

FIG. 21 shows charge-and-discharge curves of battery modules of Examples F2-1 to F2-4.

DETAILED DESCRIPTION

Figure 1:
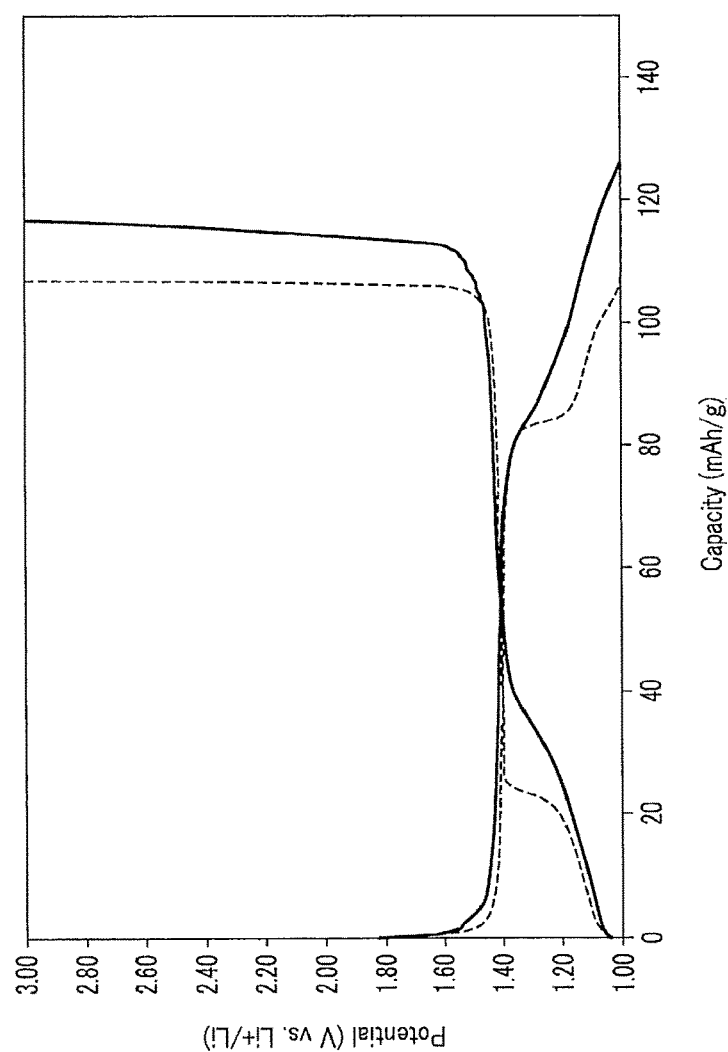
FIG. 1 shows a charge-and-discharge curve of a composite oxide $Li_2SrTi_6O_{14}$ and a charge-and-discharge curve of a composite oxide $Li_2(Sr_{0.75}Na_{0.25})Ti_{5.75}Nb_{0.25}O_{14}$.

According to a first embodiment, there is provided a battery module. The battery module includes five nonaqueous electrolyte batteries electrically connected in series. The five nonaqueous electrolyte batteries each include a positive electrode, a negative electrode, and a nonaqueous electrolyte. The negative electrode includes an active material including a titanium-including composite oxide. The titanium-including composite oxide includes Na and a metal element M within a crystal structure. The metal element M is at least one selected from the group consisting of Zr, Sn, V, Nb, Ta, Mo, W, Fe, Co, Mn, and Al.

According to a second embodiment, there is provided a battery pack. The battery pack comprises the battery module according to the first embodiment.

Embodiments will be explained below with reference to the drawings. Structures common among the embodiments are represented by the same symbols and over-lapping explanations are omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration.

(First Embodiment)

According to a first embodiment, a battery module is provided. The battery module includes five nonaqueous electrolyte batteries electrically connected in series. Each of the five nonaqueous electrolyte batteries includes a positive electrode, a negative electrode, and a nonaqueous electrolyte. The negative electrode includes an active material including a titanium composite oxide. The titanium composite oxide includes Na and a metal element M in its crystal structure. The metal element M is at least one selected from the group consisting of Zr, Sn, V, Nb, Ta, Mo, W, Fe, Co, Mn, and Al.

In the titanium composite oxide including Na and a metal element M in its crystal structure, overlap between the 2p band of oxygen O and the d bands of Ti and metal element M is weak. As a result, the titanium composite oxide including Na and a metal element M in its crystal structure can have a higher Fermi level than that of an oxide such as spinel type lithium titanate or titanium dioxide having a crystal structure of various kinds. Because of the difference between the band structures, the titanium composite oxide is able to realize an electrode capable of exhibiting a lower electrode potential (vs. Li$^+$/Li) than that in the case where titanium oxide such as spinel type lithium titanate or titanium dioxide is used. Specifically, an electrode that includes the titanium composite oxide including Na and a metal element M in its crystal structure can exhibit an electrode potential that is lower by 0.1 V or more relative to the electrode potential 1.55 V (vs. Li$^+$/Li) of an electrode that includes spinel type lithium titanate.

An electrode that can exhibit such a low electrode potential can realize, by combining with a positive electrode material of choice, a nonaqueous electrolyte battery having an average operating voltage of about 2.4 V to about 2.8 V per battery.

The battery module according to the first embodiment includes five of such nonaqueous electrolyte batteries, and the five nonaqueous electrolyte batteries are electrically connected in series. Therefore, the battery module according to the first embodiment can exhibit an average operating voltage of 12 V to 14 V. The average operating voltage which is within this range is comparable with the average operating voltage of a 12 V battery module including a lead storage battery. Therefore, when the battery module capable of exhibiting such an average operating voltage is used in a state of being connected in parallel to the 12 V battery module including the lead storage battery, the battery module can supplement the input and output of the lead storage battery. Thereby, over-discharge and over-charge due to an excessive current, which cause the degradation of the lead storage battery, can be prevented. Therefore, the battery module according to the first embodiment can exhibit excellent voltage compatibility with the battery module including the lead storage battery.

The Fermi level of the titanium composite oxide including Na and a metal element M in its crystal structure can be changed by changing the amount of Na. For example, the electrode potential of the electrode including the titanium composite oxide that includes Na and a metal element M in its crystal structure can be voluntarily changed within the range of 1.25 V (vs. Li$^+$/Li) to 1.45 V (vs. Li$^+$/Li) by changing the amount of Na. For example, by using an electrode having an electrode potential of 1.25 V (vs. Li$^+$/Li), it becomes possible to make the voltage be higher by 0.3 V per battery than in the case where the electrode containing spinel type lithium titanate is used.

The metal element M preferably includes Nb. The crystal structure of a titanium composite oxide including Na and Nb in its crystal structure is preferable, since more Li ions can be put into the crystal structure as compared to a titanium composite oxide which does not include Nb, and therefore electrode capacitance improves. This is because Nb can be divalently reduced from pentavalence to trivalence during the absorption of Li into the crystal structure of the titanium composite oxide. On the other hand, Ti can only be univalently reduced from tetravalence to trivalence during the absorption of Li into the crystal structure, therefore, the amount of absorption of Li is restricted.

The crystal structure of the titanium composite oxide including Na and a metal element M in its crystal structure can, for example, have symmetry belonging to a space group Cmca or Fmmm. These space groups will be described later.

The titanium composite oxide including Na and a metal element M in its crystal structure is a composite oxide represented by the general formula $Li_{2+a}M(I)_{2-b}Ti_{6-c}M(II)_dO_{14+\sigma}$, for example. Herein, M(I) is Na, or includes Na and at least one selected from the group consisting of Sr, Ba, Ca, Mg, Cs, and K. M(II) is at least one selected from the group consisting of Zr, Sn, V, Nb, Ta, Mo, W, Fe, Co, Mn, and Al. a is within a range of $0 \le a \le 6$. b is within a range of $0 \le b < 2$. c is within a range of $0 < c < 6$. d is within a range of $0 < d \le 6$. $\sigma$ is within a range of $-0.5 \le \sigma \le 0.5$.

Next, the battery module according to the first embodiment will be described in more detail.

The battery module according to the first embodiment includes five nonaqueous electrolyte batteries that are electrically connected in series. The five nonaqueous electrolyte batteries each include a positive electrode, a negative electrode, and a nonaqueous electrolyte.

Each of the nonaqueous electrolyte batteries can further include a separator provided between the positive electrode and the negative electrode. The positive electrode, the negative electrode, and the separator can constitute an electrode group. The nonaqueous electrolyte may be held in the electrode group.

Each of the nonaqueous electrolyte batteries can further include a container member that houses the electrode group and the nonaqueous electrolyte.

Each of the nonaqueous electrolyte batteries can further include a positive electrode terminal electrically connected to the positive electrode and a negative electrode terminal electrically connected to the negative electrode. At least a part of the positive electrode terminal and at least a part of the negative electrode terminal may extend out to the exterior of the container member.

The battery module according to the first embodiment can further include a lead for electrically connecting the five nonaqueous electrolyte batteries. The lead is preferably made of the same material as that of a terminal of the nonaqueous electrolyte battery in order to reduce contact resistance with the terminal of the nonaqueous electrolyte battery to which the lead is connected, for example.

Hereinafter, the negative electrode, the positive electrode, the nonaqueous electrolyte, the separator, the container member, the positive electrode terminal, and the negative electrode terminal that may be included by each of the nonaqueous electrolyte batteries included in the battery module according to the first embodiment will be described in detail.

1) Negative Electrode

The negative electrode can include a current collector and a negative electrode layer (a negative electrode active material-including layer). The negative electrode layer can be formed on one surface or reverse surfaces of the current collector. The negative electrode layer can include a negative electrode active material, and optionally a conductive agent and a binder.

The active material that includes the titanium composite oxide including Na and a metal element M in its crystal structure, as described above, may be included as the negative electrode active material in the negative electrode layer. Specific examples of the titanium composite oxide including Na and a metal element M in its crystal structure will be described later.

As the negative electrode, the above described active material may be singly used as the negative electrode active material; however, a mixture where this active material is further mixed with another active material may also be used. Examples of other active materials include lithium titanate having a ramsdellite structure (e.g., $Li_2Ti_3O_7$), lithium titanate having a spinel structure (e.g., $Li_4Ti_5O_{12}$), monoclinic titanium dioxide ($TiO_2$ (B)), anatase type titanium dioxide, rutile type titanium dioxide, a hollandite type titanium composite oxide, and a monoclinic niobium titanium composite oxide (e.g., $Nb_2TiO_7$).

The conductive agent is added to improve a current collection performance and to suppress the contact resistance between the negative electrode active material and the current collector. Examples of the conductive agent include carbonaceous substances such as vapor grown carbon fiber (VGCF), acetylene black, carbon black, and graphite.

The binder is added to fill gaps among the dispersed negative electrode active material and also to bind the negative electrode active material with the current collector. Examples of the binder include polytetrafluoroethylene (PTFE), polyvinylidene fluoride (PVdF), fluorine rubber, styrene-butadiene rubber, a polyacrylic acid compound, and an imide compound.

The active material, conductive agent and binder in the negative electrode layer are preferably blended in proportions of 68% by mass to 96% by mass, 2% by mass to 30% by mass, and 2% by mass to 30% by mass, respectively. When the amount of conductive agent is 2% by mass or more, the current collection performance of the negative electrode layer can be improved. When the amount of binder is 2% by mass or more, binding between the negative electrode layer and current collector is sufficient, and excellent cycling performances can be expected. On the other hand, an amount of each of the conductive agent and binder is preferably 28% by mass or less, in attempting to increase the capacity.

As the current collector, a material which is electrochemically stable at the lithium absorption and release potential of the negative electrode active material is used. The current collector is preferably made of copper, nickel, stainless steel or aluminum, or an aluminum alloy including one or more elements selected from Mg, Ti, Zn, Mn, Fe, Cu, and Si. The thickness of the current collector is preferably 5 to 20 µm. The current collector having such a thickness can maintain balance between the strength and weight reduction of the negative electrode.

By using the above described active material including an oxide of titanium that includes Na and a metal element M, the density of the negative electrode layer (excluding the current collector) can be set in the range of 1.8 $g/cm^3$ to 2.8 $g/cm^3$. The negative electrode in which the density of the negative electrode layer is within this range can exhibit an excellent energy density, and at the same time, exhibit an excellent ability to hold the electrolytic solution. More preferably, the density of the negative electrode layer is 2.1 $g/cm^3$ to 2.6 $g/cm^3$.

The negative electrode is produced by, for example, suspending a negative electrode active material, a binder, and a conductive agent in a solvent used ordinarily to prepare a slurry, applying the slurry to a current collector, drying the coating to form a negative electrode layer, and then pressing the layer. The negative electrode may also be produced by forming a negative electrode active material, a binder, and a conductive agent into pellets as the negative electrode layer, and disposing the pellets onto a current collector.

2) Positive Electrode

The positive electrode can include a current collector and a positive electrode layer (positive electrode active material-including layer). The positive electrode layer may be formed on one surface or reverse surfaces of the current collector. The positive electrode layer can include a positive electrode active material, and optionally a conductive agent and a binder.

As the positive electrode active material, for example, an oxide or a sulfide may be used. Examples of the oxide and sulfide include a compound capable of absorbing and releasing lithium. Specific examples thereof include manganese dioxide ($MnO_2$), iron oxide, copper oxide, nickel oxide, lithium manganese composite oxide (e.g., $Li_xMn_2O_4$ or $Li_xMnO_2$), lithium nickel composite oxide (e.g., $Li_xNiO_2$), lithium cobalt composite oxide (e.g., $Li_xCoO_2$), lithium nickel cobalt composite oxide (e.g., $LiNi_{1-y}CoO_2$), lithium manganese cobalt composite oxide (e.g., $Li_xMn_yCo_{1-y}O_2$), lithium manganese nickel composite oxide having a spinel structure (e.g., $Li_xMn_{2-y}NiO_4$), lithium phosphorus oxide having an olivine structure (e.g., $Li_xFePO_4$, $Li_xFe_{1-y}PO_4$, and $Li_xC_oPO_4$), iron sulfate [$Fe_2(SO_4)_3$], vanadium oxide (e.g., $V_2O_5$), and lithium nickel cobalt manganese composite oxide. In the above-described formulas, 0<x≤1, and 0<y≤1. As the active material, one of these compounds may be used singly, or plural compounds may be used in combination.

More preferred examples of the positive electrode active material include lithium manganese composite oxide (e.g., $Li_xMn_2O_4$), lithium nickel composite oxide (e.g., $Li_xNiO_2$), lithium cobalt composite oxide (e.g., $Li_xC_oO_2$), lithium nickel cobalt composite oxide (e.g., $LiNi_{1-y}Co_yO_2$), lithium manganese nickel composite oxide having a spinel structure (e.g., $Li_xMn_{2-y}NiO_4$), lithium manganese cobalt composite oxide (e.g., $Li_xMn_yCo_{1-y}O_2$), lithium iron phosphate (e.g., $Li_xFePO_4$), and lithium nickel cobalt manganese composite oxide, which have a high positive electrode voltage. In the above-described formulas, $0<x\leq1$, and $0<y\leq1$.

When a room temperature molten salt is used as the nonaqueous electrolyte of the battery, preferred examples of the positive electrode active material include lithium iron phosphate, $Li_xVPO_4F$ ($0\leq x\leq1$), lithium manganese composite oxide, lithium nickel composite oxide, and lithium nickel cobalt composite oxide. Since these compounds have low reactivity with room temperature molten salts, cycle life can be improved.

The primary particle size of the positive electrode active material is preferably 100 nm to 1 µm. The positive electrode active material having a primary particle size of 100 nm or more is easy to handle during industrial production. The positive electrode active material having a primary particle size of 1 µm or less can allow lithium ions to smoothly diffuse in solids.

The specific surface area of the positive electrode active material is preferably 0.1 $m^2/g$ to 10 $m^2/g$. The positive electrode active material having a specific surface area of 0.1 $m^2/g$ or more can secure sufficient sites for absorbing and releasing lithium ions. The positive electrode active material having a specific surface area of 10 $m^2/g$ or less is easy to handle during industrial production, and can secure a good charge-and-discharge cycle performance.

The binder is added to bind the positive electrode active material with the current collector. Examples of the binder include polytetrafluoroethylene (PTFE), polyvinylidene fluoride (PVdF), fluorine rubber, a polyacrylic acid compound, and an imide compound.

The conductive agent is added as necessary, in order to improve the current collection performance, and at the same time, suppress the contact resistance between the positive electrode active material and current collector. Examples of the conductive agent include carbonaceous substances such as acetylene black, carbon black and graphite.

In the positive electrode layer, the positive electrode active material and binder are preferably included in proportions of 80% by mass to 98% by mass, and 2% by mass to 20% by mass, respectively.

When the amount of the binder is 2% by mass or more, sufficient electrode strength can be achieved. When the amount of the binder is 20% by mass or less, the amount of the insulator in the electrode can be reduced, and thereby the internal resistance can be decreased.

When a conductive agent is added, the positive electrode active material, binder, and conductive agent are preferably included in proportions of 77% by mass to 95% by mass, 2% by mass to 20% by mass, and 3% by mass to 15% by mass, respectively. When the amount of the conductive agent is 3% by mass or more, the above-described effects can be expressed. By setting the amount of the positive electrode conductive agent to 15% by mass or less, the decomposition of a nonaqueous electrolyte on the surface of the positive electrode conductive agent during high-temperature storage can be reduced.

The current collector is preferably an aluminum foil, or an aluminum alloy foil including one or more elements selected from Mg, Ti, Zn, Ni, Cr, Mn, Fe, Cu, and Si.

The thickness of the aluminum foil or aluminum alloy foil is preferably 5 µm to 20 µm, and more preferably 15 µm or less. The purity of the aluminum foil is preferably 99% by mass or more. The amount of the transition metal such as iron, copper, nickel, or chromium included in the aluminum foil or aluminum alloy foil is preferably 1% by mass or less.

The positive electrode is produced by, for example, suspending a positive electrode active material, a binder, and a conductive agent, which is added as necessary, in an appropriate solvent to prepare a slurry, applying the slurry to a positive electrode current collector, drying the coating to form a positive electrode layer, and then pressing the layer. The positive electrode may also be produced by forming an active material, a binder, and a conductive agent, which is added as necessary, into pellets as the positive electrode layer, and disposing the pellets onto a current collector.

3) Nonaqueous Electrolyte

The nonaqueous electrolyte may be, for example, a liquid nonaqueous electrolyte which is prepared by dissolving an electrolyte in an organic solvent, or gel-like nonaqueous electrolyte which is a composite of a liquid electrolyte and a polymer material.

The liquid nonaqueous electrolyte is preferably prepared by dissolving an electrolyte in an organic solvent at a concentration of 0.5 mol/L to 2.5 mol/L.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$], and mixtures thereof. The electrolyte is preferably resistant to oxidation even at a high potential, and most preferably $LiPF_6$.

Examples of the organic solvent include a cyclic carbonate such as propylene carbonate (PC), ethylene carbonate (EC), or vinylene carbonate; a linear carbonate such as diethyl carbonate (DEC), dimethyl carbonate (DMC), or methyl ethyl carbonate (MEC); a cyclic ether such as tetrahydrofuran (THF), 2-methyl tetrahydrofuran (2MeTHF), or dioxolane (DOX); a linear ether such as dimethoxy ethane (DME) or diethoxy ethane (DEE); γ-butyrolactone (GBL), acetonitrile (AN), and sulfolane (SL). These organic solvents may be used singularly or as a mixed solvent.

Examples of the polymeric material include polyvinylidene fluoride (PVdF), polyacrylonitrile (PAN), and polyethylene oxide (PEO).

Alternatively, the nonaqueous electrolyte may be, for example, an ordinary-temperature molten salt (ionic melt) including lithium ions, a polymer solid electrolyte, or an inorganic solid electrolyte.

The ordinary-temperature molten salt (ionic melt) means compounds which can exist in a liquid state at ordinary temperature (15 to 25° C.) among organic salts constituted of combinations of organic cations and anions. The ordinary-temperature molten salt includes an ordinary-temperature molten salt which exists alone as a liquid, an ordinary-temperature molten salt which becomes a liquid after being mixed with an electrolyte, and an ordinary-temperature molten salt which becomes a liquid after being dissolved in an organic solvent. In general, the melting point of the ordinary-temperature molten salt used in nonaqueous electrolyte batteries is 25° C. or below. The organic cations generally have a quaternary ammonium framework.

The polymer solid electrolyte is prepared by dissolving the electrolyte in a polymeric material, and solidifying it.

The inorganic solid electrolyte is a solid substance having lithium ion conductivity.

4) Separator

The separator may be made of, for example, a porous film or synthetic resin nonwoven fabric including polyethylene, polypropylene, cellulose, or polyvinylidene fluoride (PVdF). Among these, a porous film formed from polyethylene or polypropylene melts at a fixed temperature and thus able to shut off a current, therefore the porous film can improve safety.

5) Container Member

As the container member, for example, a laminate film having a thickness of 0.5 mm or less, or a metal case having a wall thickness of 1 mm or less may be used. The thickness of the laminate film is more preferably 0.2 mm or less. The wall thickness of the metal case is more preferably 0.5 mm or less, and still more preferably 0.2 mm or less.

The shape of the container member is not particularly limited, and may be, for example, flat (thin), square, cylinder, coin, or button-shaped. The container member depends on the size of the battery, and may be that for a compact battery mounted on mobile electronic devices, or a large battery mounted on two- to four-wheel automobiles.

As the laminate film, used is a multilayer film including resin layers and a metal layer sandwiched between the resin layers. The metal layer is preferably an aluminum foil or an aluminum alloy foil, so as to reduce weight. The resin layer may be, for example, a polymeric material such as polypropylene (PP), polyethylene (PE), nylon, or polyethylene terephthalate (PET). The laminate film may be heat-sealed to be formed into the shape of a container member.

The metal case is made of aluminum or an aluminum alloy, for example. As the aluminum alloy, an alloy including an element such as magnesium, zinc, or silicon is preferable. If a transition metal such as iron, copper, nickel, or chromium is included in the alloy, the included amount thereof is preferably set to 1% by mass or less.

6) Positive Electrode Terminal and Negative Electrode Terminal

The positive electrode terminal may be made of, for example, a material which has electrical stability in the potential range of 3 V to 5 V relative to the oxidation-reduction potential of lithium, and electrical conductivity. Specifically, the positive electrode terminal is made of aluminum or an aluminum alloy including Mg, Ti, Zn, Mn, Fe, Cu, and Si or the like. The positive electrode terminal is preferably made of the same material as the positive electrode current collector in order to reduce contact resistance with the positive electrode current collector.

The negative electrode terminal may be made of a material which is electrochemically stable at the potential at which the above-described negative electrode active material inserts and extracts Li, and has electrical conductivity. Specific examples of the material for the negative electrode terminal include copper, nickel, stainless steel, or aluminum. The negative electrode terminal is preferably made of the same material as the negative electrode current collector in order to reduce the contact resistance with the negative electrode current collector.

Next, specific examples of an active material including the titanium composite oxide including Na and a metal element M will be described as a first example and a second example. However, note that the active material including the titanium composite oxide including Na and a metal element M is not limited to the first example and the second example described below.

FIRST EXAMPLE

An active material of a first example is an active material that includes a composite oxide having an orthorhombic crystal structure and is represented by a general formula $Li_xM1_{1-y}M2_yTi_{6-z}M3_zO_{14+\delta}$. Here, M1 is at least one selected from the group consisting of Sr, Ba, Ca, and Mg. M2 is Na or includes Na and at least one selected from the group consisting of Cs and K. M3 is at least one selected from the group consisting of Al, Fe, Zr, Sn, V, Nb, Ta, and Mo. x is within a range of $2 \leq x \leq 6$. y is within a range of $0 < y < 1$. z is within a range of $0 < z \leq 6$. $\delta$ is within a range of $-0.5 \leq \delta \leq 0.5$.

This composite oxide is a substituted oxide in which a part of M1 sites is substituted by a metal cation M2, and a part of Ti sites is substituted by a metal cation M3 in a composite oxide having an orthorhombic crystal structure and represented by the general formula $Li_xM1Ti_6O_{14+\delta}$.

The active material of the first example can have an average lithium-absorption-potential within the range of 0.5 V to 1.45 V (vs. Li/Li$^+$) relative to the redox potential of metallic lithium. Thereby, a nonaqueous electrolyte battery using the active material of the first example in a negative electrode can exhibit a higher battery voltage than that of a nonaqueous electrolyte battery using a titanium composite oxide having a lithium-absorption-potential of 1.55 V (vs. Li/Li$^+$) as a negative electrode, for example.

The active material of the first example can show a smooth potential change in the potential range of 1.0 V to 1.45 V (vs. Li/Li$^+$). Hereinafter, it will be described with reference to FIG. 1 that the active material of the first example is capable of showing a smooth potential change.

FIG. 1 shows a charge-and-discharge curve (dashed line) of a composite oxide $Li_2SrTi_6O_{14}$, and a charge-and-discharge curve (solid line) of a composite oxide $Li_2(Sr_{0.75}Na_{0.25})Ti_{5.75}Nb_{0.25}O_{14}$. The composite oxide $Li_2(Sr_{0.75}Na_{0.25})Ti_{5.75}Nb_{0.25}O_{14}$, the potential change of which is shown by the solid line, has an orthorhombic crystal structure, and can be included in the active material. On the other hand, the composite oxide $Li_2SrTi_6O_{14}$, the potential change of which is shown by the dashed line, is a composite oxide having an orthorhombic crystal structure and represented by the general formula $Li_xM1Ti_6O_{14+\delta}$. The composite oxide $Li_2(Sr_{0.75}Na_{0.25})Ti_{5.75}Nb_{0.25}O_{14}$ is a composite oxide in which a part of Sr sites is substituted by Na, and a part of Ti sites is substituted by Nb in the crystal structure of the composite oxide $Li_2SrTi_6O_{14}$.

As shown in FIG. 1, the charge-and-discharge curve of the composite oxide $Li_2SrTi_6O_{14}$ has a potential flat part in the potential range of about 1.4 V to 1.45 V (vs. Li/Li$^+$). However, when a potential becomes less than 1.4 V (vs. Li/Li$^+$), the potential steeply decreases. That is, the charge-and-discharge curve of the composite oxide $Li_2SrTi_6O_{14}$ includes a potential stepwise portion. In a nonaqueous electrolyte battery produced by using the composite oxide exhibiting such a potential change for the negative electrode, a steep voltage change occurs at low SOC, therefore, voltage management is difficult.

On the other hand, as shown in FIG. 1, the charge-and-discharge curve of the composite oxide $Li_2(Sr_{0.75}Na_{0.25})Ti_{5.75}Nb_{0.25}O_{14}$ can exhibit a smooth potential change in the potential range of about 1.0 V to 1.45 V (vs. Li/Li$^+$). The nonaqueous electrolyte battery produced by using the composite oxide exhibiting such a potential change for the negative electrode can suppress a steep voltage change at low SOC, therefore, voltage management is easy.

The composite oxide which may be included in the active material of the first example can exhibit a smooth potential change in the potential range of 1.0 V to 1.45 V (vs. Li/Li$^+$) because it can have uniform lithium-insertion sites. The reason for this will be described below.

The composite oxide which may be included in the active material of the first example is represented by the general formula $Li_xM1_{1-y}M2_yTi_{6-z}M3_zO_{14+\delta}$. In the composite oxide, Li exists as a monovalent cation. M1 is at least one divalent cation selected from the group consisting of Sr, Ba, Ca, and Mg. M2 is Na, which is a monovalent cation, or includes Na and at least one monovalent cation selected from the group consisting of Cs, K, and Na. M3 is at least one selected from the group consisting of Al and Fe, which are trivalent cations, Zr and Sn, which are tetravelent cations, V, Nb, Ta, which are pentavalent cations, and Mo, which is a hexavalent cation. Here, the valence of each cation means the valence of each cation in a state where x is 2 in the above general formula, i.e., in a discharge state.

In the composite oxide, the total of the valences of cations coincides with the total valence of oxide ions which are anions, and charge neutrality is maintained. Specifically, in the composite oxide, the total valence of lithium ions is x. The total of the valences of M1 is $2\times(1-y)$. The total of the valences of M2 is y. The total of the valences of Ti is $4\times(6-z)$. If 1 mol of the composite oxide includes $z_3$ mol of a trivalent cation M3, $z_4$ mol of a tetravalent cation M3, $z_5$ mol of a pentavalent cation M3, and $z_6$ mol of a hexavalent cation M3, the total of the valences of M3 is the sum: $(z_3\times3)+(z_4\times4)+(z_5\times5)+(z_6\times6)$ (wherein, $z_3+z_4+z_5+z_6=z$). The total of the valences of these cations coincides with the total valence of oxide ions which are anions: $(-2)\times(14+\delta)$. Here, subscript $\delta$ of oxide ions can show a value within the range of −0.5 to 0.5. Therefore, even if the total of the valences of the cations shown herein fluctuates within the range of ±1 relative to a valence of −28, which is the total valence of oxide ions, the same effect can be obtained. When $\delta$ deviates from the range of $-0.5\leq\delta\leq0.5$, the redox state of the each cations may be deviated from a stable state, or lattice defects such as oxygen defects may have occurred. In such a case, the battery performance is decreased, therefore not preferable.

Here, supposing that the cations structuring the composite oxide is in a stable oxidation state, and oxide ions exist in proper proportion, $\delta=0$ would hold. Under such supposition, the total valence of oxide ions is $-2\times14=-28$. In this case, if the agreement of the total of the valences of the cations with the total valence of oxide ions is represented using an equation, such equation (1) would be as follows:

$$x+\{2\times(1-y)\}+y+\{4\times(6-z)\}+\{(z_3\times3)+(z_4\times4)+(z_5\times5)+(z_6\times6)\}-28=0 \qquad (1)$$

If the equation (1) is simplified, the following equation (2) is obtained:

$$x-y-4z+(3z_3+4z_4+5z_5+6z_6)=2 \qquad (2)$$

By satisfying the condition of the equation (2), the charge neutrality in the crystal structure of the composite oxide is kept. The composite oxide that keeps the charge neutrality is a substituted oxide in which a part of M1 sites is correctly substituted by a metal cation M2, and a part of Ti sites is correctly substituted by a metal cation M3 in the crystal structure of the composite oxide represented by the general formula $Li_xM1Ti_6O_{14+\delta}$. By including the substituted oxide in which M2 and M3 are correctly substituted in the crystal structure of the composite oxide represented by the general formula of $Li_xM1Ti_6O_{14+\delta}$, the active material of the first example can make the coordination environment of oxide ions in relation to vacancy sites into which lithium ions are inserted uniform. This is the reason for why the composite oxide which may be included in the active material of the first example can exhibit a smooth potential change in the potential range of 1.0 V to 1.45 V (vs. Li/Li$^+$). On the other hand, when the uniformity of the coordination environment of the oxide ions in relation to the vacancy sites is low, the charge-and-discharge curve of the composite oxide shows a potential stepwise portion.

By including the substituted oxide in which M2 and M3 are correctly substituted in the crystal structure of the composite oxide represented by the general formula $Li_xM1Ti_6O_{14+\delta}$, the active material of the first example can provide a nonaqueous electrolyte battery which can exhibit a high reversible capacity during charge and discharge and excellent life performance.

Based on these results, the active material of the first example can realize a nonaqueous electrolyte battery which can exhibit a high energy density and a high battery voltage, has excellent life performance, and where voltage management is easy.

Subscript x in the general formula $Li_xM1_{1-y}M2_yTi_{6-z}M3_zO_{14+\delta}$ for the composite oxide may change within the range of $2\leq x\leq6$ according to the charging state of the composite oxide. For example, according to a production method described later, a composite oxide in which subscript x in the general formula is 2 can be produced, for example. When the composite oxide in which subscript x is 2 is included as a negative electrode active material in a nonaqueous electrolyte battery, and the nonaqueous electrolyte battery is charged, x is increased to a value within the range of more than 2 and 6 or less. Alternatively, by a method described later, for example, the composite oxide can also be synthesized with a raw material composition ratio set so that subscript x is within the range of more than 2 and 6 or less before an initial charge. The active material including the composite oxide in a state where subscript x is within the range of more than 2 and 6 or less before initial charge can suppress the trapping of lithium ions in the structure during initial charge and discharge. As a result, an initial charge-and-discharge efficiency can be improved.

In an X-ray diffraction diagram obtained by a powder X-ray diffraction method using Cu—Kα rays, for the composite oxide represented by the general formula of $Li_xM1_{1-y}M2_yTi_{6-z}M3_zO_{14+\delta}$, an intensity ratio $I_L/I_H$ is preferably within the range of $0.6\leq I_L/I_H\leq3$. The intensity $I_L$ is an intensity of a strongest diffraction peak appearing within the range of $17°\leq2\theta\leq18.5°$. The intensity $I_H$ is an intensity of a strongest diffraction peak appearing within the range of $18.5°<2\theta\leq19.5°$.

The composite oxide as an example of such a preferred aspect has an orthorhombic crystal structure belonging to a space group Cmca, and in an X-ray diffraction diagram obtained by a powder X-ray diffraction method using Cu—Kα rays, an intensity ratio $I_{L1}/I_{H1}$ is within the range of $0.6\leq I_{L1}/I_{H1}\leq3$. The intensity $IL_1$ is an intensity of a diffraction peak having an intensity that is greater of the intensities of diffraction peaks corresponding to a (112) plane and a (021) plane. The intensity $I_{H1}$ is an intensity of a diffraction peak corresponding to a (220) plane.

FIG. 2 is a view of crystal structure of $Li_2(Sr_{0.75}Na_{0.25})Ti_{5.75}Nb_{0.25}O_{14}$ as an example of a composite oxide having symmetry of a space group Cmca.

In the crystal structure shown in FIG. 2, positions shown by smallest balls 100 at vertexes of the polyhedron indicate the positions of oxide ions.

In the crystal structure shown in FIG. 2, a region A shows a vacancy site having a channel in which lithium ions can three-dimensionally move in the crystal structure, and the region A can absorb and release the lithium ions. A region B has a polyhedral structure of an oxide centering on Ti or Nb serving as the backbone of the crystal structure. On the other hand, a region C is a site in which exist lithium ions capable of being absorbed and released. A region D is site in which exist Sr, Na, and Li which function as a backbone for stabilizing a crystal structure.

In an X-ray diffraction diagram obtained by measuring the composite oxide of this example according to powder X-ray diffraction using Cu—Kα rays, an intensity ratio is within the range of $0.6 \leq I_{L1}/I_{H1} \leq 3$. The intensity $I_{L1}$ is an intensity of a diffraction peak having an intensity that is greater of the intensities of a diffraction peak appearing within the range of $17.8° \leq 2\theta \leq 18.5°$ and corresponding to a (112) plane and a diffraction peak appearing within the range of $17.0° \leq 2\theta < 17.8°$ and corresponding to a (021) plane. The intensity $I_{H1}$ is an intensity of a diffraction peak appearing within the range of $18.5° < 2\theta < 19.5°$ and corresponding to a (220) plane.

In such a composite oxide, crystallites have grown in a direction preferable for absorbing and releasing lithium ions. Furthermore, the composite oxide can also suppress the insertion of lithium ions into vacancy sites where the oxide-ions coordination environments are different from each other. Such an insertion of lithium ions is a cause of a charge-and-discharge curve having a stepwise form. Thereby, the active material including the composite oxide of this example not only exhibits a smooth charge-and-discharge curve and but also improves the reversibility of the lithium ions during charge and discharge. Therefore, the effective capacity can be increased and the life performance of the nonaqueous electrolyte battery can be improved, which is preferable.

A composite oxide of another example of a preferable aspect in which an intensity ratio $I_L/I_H$ is within the range of $0.6 \leq I_L/I_H \leq 3$ in an X-ray diffraction diagram for the composite oxide obtained by a powder X-ray diffraction method has an orthorhombic crystal structure belonging to a space group Fmmm, and in the X-ray diffraction diagram obtained by the powder X-ray diffraction method using Cu—Kα rays, an intensity ratio $I_{L2}/I_{H2}$ is within a range of $0.6 \leq I_{L2}/I_{H2} \leq 3$. The intensity $I_{L2}$ is an intensity of a diffraction peak corresponding to a (111) plane. The intensity $I_{H2}$ is an intensity of a diffraction peak corresponding to a (202) plane.

Figure 3:
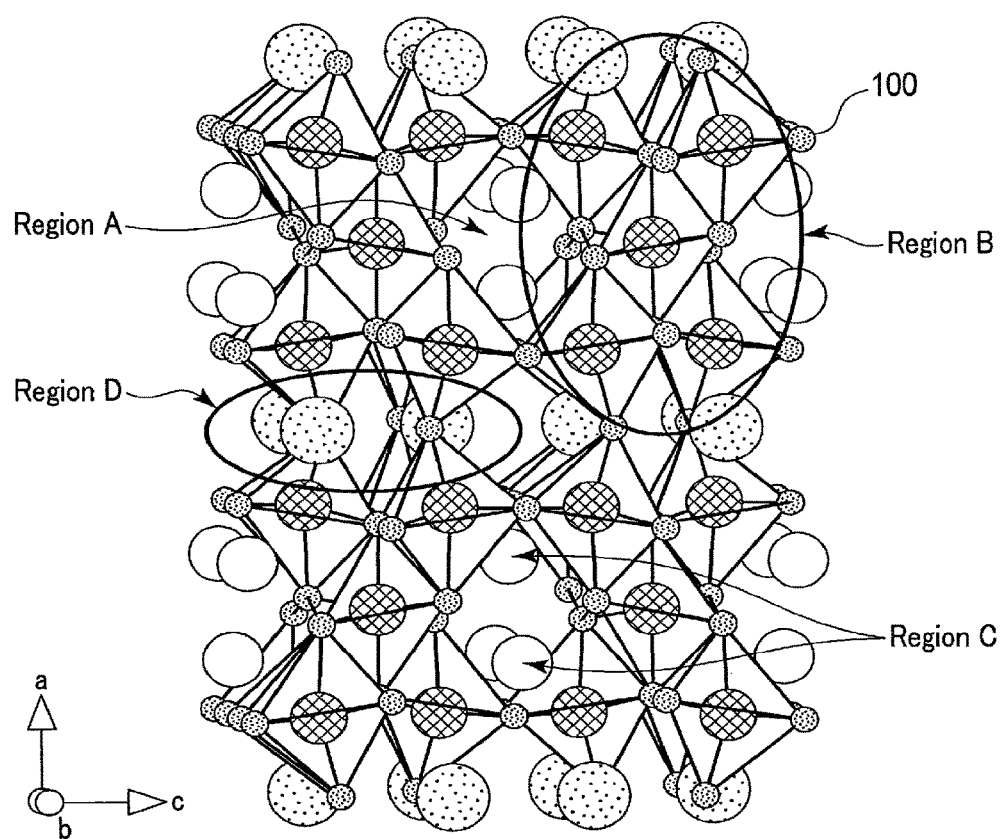
FIG. 3 is a view of a crystal structure of $Li_2(Sr_{0.25}Na_{0.75})Ti_{5.25}Nb_{0.75}O_{14}$ as an example of a composite oxide having symmetry of a space group Fmmm.

FIG. 3 is a view of a crystal structure of $Li_2(Sr_{0.25}Na_{0.75})Ti_{5.25}Nb_{0.75}O_{14}$ as an example of a composite oxide having symmetry of a space group Fmmm.

In the crystal structure shown in FIG. 3, the smallest balls 100 indicate the positions of oxide ions.

In the crystal structure shown in FIG. 3, a region A shows a vacancy site having a channel in which lithium ions can three-dimensionally move in the crystal structure, and the region A can absorb and release the lithium ions. A region B has a polyhedral structure of an oxide centering on Ti or Nb serving as the backbone of the crystal structure. On the other hand, a region C is a site in which exist lithium ions capable of being absorbed and released. A region D is a site in which exist Sr, Na, and Li which function as a backbone for stabilizing a crystal structure.

In an X-ray diffraction diagram obtained by measuring the composite oxide as this example according to powder X-ray diffraction using Cu—Kα rays, an intensity ratio $I_{L2}/I_{H2}$ is within the range of $0.6 \leq I_{L2}/I_{H2} \leq 3$. The intensity $L_{L2}$ is an intensity of a diffraction peak appearing within the range of $17.8° \leq 2\theta \leq 18.5°$ and corresponding to a (111) plane. The intensity $I_{H2}$ is an intensity of a diffraction peak appearing within the range of $18.5° < 2\theta < 19.5°$ and corresponding to a (202) plane.

In such a composite oxide, crystallites have grown in a direction preferable for absorbing and releasing lithium ions. Furthermore, the composite oxide can suppress the insertion of lithium ions into vacancy sites where the oxide-ions coordination environments are different from each other. Such an insertion of lithium ions is a cause of a charge-and-discharge curve having a stepwise form. Thereby, the active material including the composite oxide of this example not only exhibits a smooth charge-and-discharge curve and but also improves the reversibility of the lithium ions during charge and discharge. Therefore, the effective capacity can be increased and the life performance of the nonaqueous electrolyte battery can be improved, which is preferable.

Even if the active material of the first example includes a composite oxide having a crystal structure in which crystal phases having symmetries of Cmca and Fmmm are mixed, or includes a composite oxide having a crystal structure similar to symmetry of Cmca or Fmmm, the active material can provide the same effect as that of an active material including a composite oxide having symmetry of a space group Cmca or a composite oxide having symmetry of a space group Fmmm. Specific examples of symmetry similar to that of Cmca or Fmmm include Pmcm, Pmma, and Cmma. In the composite oxide having a crystal structure having such symmetries, regardless of a crystal plane index, an intensity ratio $I_L/I_H$ is preferably within a range of $0.6 \leq I_L/I_H \leq 3$, wherein the intensity $I_L$ is an intensity of a strongest diffraction peak appearing within the range of $17.0° \leq 2\theta \leq 18.5°$, and the intensity $I_H$ is an intensity of a strongest diffraction peak appearing within the range of $18.5° < 2\theta \leq 19.5°$. This not only provides a smooth charge-and-discharge curve and but also improves the reversibility of the lithium ions during charge and discharge. Therefore, the effective capacity can be increased and the life performance of the nonaqueous electrolyte battery can be also improved.

In the general formula $Li_xM1_{1-y}M2_yTi_{6-z}M3_zO_{14+\delta}$, subscript x varies within the range of $2 \leq x \leq 6$ depending on the charging state of a composite oxide represented by the general formula. Subscript y indicates a proportion of cation M1 sites substituted by cations M2 in the crystal structure of the composite oxide represented by the general formula $Li_xM1_1Ti_6O_{14+\delta}$. Subscript y is within the range of $0<y<1$, preferably within the range of $0.1 \leq y \leq 0.9$, and more preferably within the range of $0.25 \leq y \leq 0.75$. Subscript z indicates a proportion of Ti sites substituted by cations M3 in the crystal structure of the composite oxide represented by the general formula $Li_xM1_1Ti_6O_{14+\delta}$. Subscript z is within the range of $0<z \leq 6$, preferably within the range of $0.1 \leq z \leq 0.9$, and more preferably within the range of $0.25 \leq z \leq 0.75$.

In the general formula $LixM1_{1-y}M^2_yTi_{6-z}M3_zO_{14+\delta}$, subscript δ may vary within the range of $-0.5 \leq \delta \leq 0.5$ depending on oxygen defects of the composite oxide represented by the general formula and the amount of oxygen inevitably mixed during a production process of the active material.

Although each of subscript x, y, z, and δ may be within a specific numerical value range as described above, the total valences of cations and the total valences of anions are equal to each other in the composite oxide represented by the general formula $LixM1_{1-y}M2_yTi_{6-z}M3_zO_{14+\delta}$, as previously described.

In one preferable aspect, the composite oxide included in the active material of the first example is represented by the general formula $Li_xSr_{1-y}Na_yTi_{6-z}M3_zO_{14+\delta}$. In the formula, M3 is at least one selected from the group consisting of Al, Fe, Zr, Sn, V, Nb, Ta, and Mo; x is within the range of $2 \leq x \leq 6$; y is within the range of $0<y<1$; z is within the range of $0<z \leq 6$; and δ is within the range of $-0.5 \leq \delta \leq 0.5$.

By substituting a part of sites of Sr by Na, which has an ion radius close to that of Sr ion, in the orthorhombic crystal structure of a composite oxide represented by the formula $Li_xSrTi_6O_{14}$, lithium absorption potential can be lowered without largely changing the lattice constant of the crystal. Thereby, the energy density per unit weight or unit volume can be increased while a lattice volume which easily absorbs and releases lithium ions is kept.

Furthermore, in a more preferable aspect, the cation M3 is Nb. That is, in the more preferable aspect, the composite oxide included in the active material of the first example is represented by the general formula $Li_xSr_{1-y}Na_yTi_{6-z}Nb_zO_{14+\delta}$. Since Nb can be subjected to divalent reduction from a pentavalent state to a trivalent state, the amount of lithium absorption of the composite oxide can be increased by substituting at least a part of Ti, which can be subjected to univalent reduction from a tetravalent state to a trivalent state, by Nb. Furthermore, Nb exhibits a smooth change in potential in a wide potential range of 1.5 V to 1.0 V relative to the redox potential of metallic lithium when the composite oxide absorbs Li. Therefore, by substituting at least a part of Ti by Nb, not only the charge-and-discharge capacity is increased, but also a step-less and continuously smooth slope is exhibited in the potential flat part as previously described with reference to FIG. 1, which provides easy correlation between charge-and-discharge potential and a charging state, and easy charge management of the battery.

The composite oxide included in the active material of the first example may be in a particle form, for example. The average particle size of the composite oxide included in the active material of the first example is not particularly limited, and can be changed according to desired battery performance.

The active material of the first example preferably includes the above composite oxide particles and a conductive substance such as carbon coating the surface thereof. The active material of such a preferable aspect can exhibit improved rapid charge-discharge performance. Since the absorption and release of lithium may occur via a homogeneous solid state reaction in the composite oxide, the composite oxide has a property that electrical conductivity is increased in accordance to increasing of absorbed amount of lithium. In the composite oxide, a region where the amount of lithium absorbed is low has relatively low electrical conductivity. Therefore, an excellent rapid-charge-and-discharge performance can be obtained, regardless of the absorbed amount of lithium, by coating the surface of composite oxide particles in advance with a conductive substance such as carbon.

Alternatively, by coating the surface of the composite oxide particles with lithium titanate, which exhibit electrical conductivity as lithium is absorbed, in place of the conductive substance such as carbon, the same effect can be obtained. In addition, since lithium titanate coating the surface of the composite oxide particles releases lithium and becomes insulating when the battery is internally short-circuited, the lithium titanate can exhibit excellent safety.

<BET Specific Surface Area>

The BET specific surface area of the composite oxide included in the active material of the first example is not particularly limited, and is preferably 5 m$^2$/g or more and less than 200 m$^2$/g. The BET specific surface area is more preferably 5 m$^2$/g to 30 m$^2$/g.

When the BET specific surface area is 5 m$^2$/g or more, the contact area with the electrolytic solution can be secured. Thus, good discharge rate performances can be easily obtained and also, a charge time can be shortened. On the other hand, when the BET specific surface area is less than 200 m$^2$/g, reactivity with the electrolytic solution can be prevented from being too high and therefore, the life performance can be improved. When the BET specific surface area is 30 m$^2$/g or less, side reactions with the electrolytic solution can be suppressed, and thereby longer life can be further expected. And, in this case, a coatability of a slurry including the active material used in the production of an electrode, which will be described later, can be improved.

Here, as the measurement of the specific surface area, a method is used where molecules, in which an occupied area in adsorption is known, are adsorbed onto the surface of powder particles at the temperature of liquid nitrogen and determining the specific surface area of the sample from the amount of adsorbed molecules. The most frequently used method is a BET method based on the low temperature/low humidity physical adsorption of an inert gas. This is the most well-known theory of the method of calculating the specific surface area in which the Langmuir theory, which is a monolayer adsorption theory, is extended to multilayer adsorption. The specific surface area determined by the above method is referred to as "BET specific surface area".

<Production Method>

The active material of the first example can be synthesized by a solid-phase reaction method described below. First, raw materials such as an oxide, a compound and a salt are mixed in a suitable stoichiometric ratio to obtain a mixture. The above salt is preferably a salt such as a carbonate or nitrate, which decomposes at a relatively low temperature to form an oxide. Next, the obtained mixture is ground and mixed as uniformly as possible. Next, the mixture is pre-sintered. The pre-sintering is performed in a temperature range from 600 to 850° C. in the atmosphere for a total of 1 to 3 hours. Next, a sintering temperature is increased, and main sintering is performed in a range from 900 to 1500° C. in the atmosphere. At this time, when lithium which is a light element is sintered at a temperature of 900° C. or more, it may vaporize. In this case, the vaporized amount of lithium under the sintering conditions is examined, and a vaporized amount is compensated for by providing a raw material including lithium in an excess amount to obtain a sample having an appropriate composition. Furthermore, it is more preferable to prevent lattice defects due to oxygen defects or the like. For example, by subjecting the raw material powder to pressure forming into a pellet or rod shape prior to main sintering, to thereby perform sintering with the area of the raw material powder brought into contact with the atmosphere decreased and the contact surface between particles increased, the formation of lattice defects can be suppressed. In the case of industrial mass production, a raw material powder is preferably sintered under a high oxygen partial pressure such as under an oxygen atmosphere, or heat-treated (annealed) in a temperature range of 400 to 1000° C. after usual sintering in the atmosphere to restore oxygen defects. Crystallinity may be decreased if the formation of lattice defects is not suppressed by such a manner.

When the composite oxide obtained by synthesizing as described above has symmetry belonging to a space group Cmca, an intensity ratio is $0.6 \leq I_{L1}/I_{H1} \leq 3$ in an X-ray diffraction diagram obtained by a powder X-ray diffraction method using Cu—Kα rays. The intensity $I_{L1}$ is an intensity of a diffraction peak having an intensity that is greater of the intensities of a diffraction peak appearing in the range of $17.8° \leq 2\theta \leq 18.5°$ and corresponding to a (112) plane or a diffraction peak appearing in the range of $17.0° \leq 2\theta < 17.8°$ and corresponding to a (021) plane in the X-ray diffraction diagram. The intensity $I_{H1}$ is an intensity of a diffraction peak appearing in the range of $18.5° < 2\theta \leq 19.5°$ and corresponding to a (220) plane in the X-ray diffraction diagram. When the composite oxide obtained by synthesizing as described above has symmetry belonging to a space group Fmmm, an intensity ratio $I_{L2}/I_{H2}$ is $0.6 \leq I_{L2}/I_{H2} \leq 3$ in an X-ray diffraction diagram obtained by a powder X-ray diffraction method using Cu—Kα rays. The intensity $I_{L2}$ is an intensity of a diffraction peak appearing in the range of $17.8° \leq 2\theta \leq 18.5°$ and corresponding to a (111) plane in the X-ray diffraction diagram. The intensity $I_{H2}$ is an intensity of a diffraction peak appearing in the range of $18.5° < 2\theta \leq 19.5°$ and corresponding to a (202) plane in the X-ray diffraction diagram.

By synthesizing as described above, a composite oxide can be produced, for example, in which subscript x in the general formula is 2, as previously described. When the composite oxide, in which subscript x is 2, is included as a negative electrode active material in a nonaqueous electrolyte battery, and the nonaqueous electrolyte battery is charged, x is increased to a value within the range of more than 2 and 6 or less. Alternatively, a composite oxide in which x is within the range of more than 2 and 6 or less can also be synthesized by synthesizing a composite oxide with a raw material composition ratio in which x is within the range of more than 2 and 6 or less using a lithium source such as lithium carbonate as a raw material. A composite oxide in which x is within the range of more than 2 and 6 or less can also be obtained by synthesizing a composite oxide, and thereafter immersing the composite oxide into a lithium hydroxide aqueous solution or the like.

SECOND EXAMPLE

An active material of a second example is an active material including a composite oxide having an orthorhombic crystal structure. The composite oxide is represented by a general formula $Li_{2+w}Na_{2-x2}M\alpha_{y2}Ti_{6-z2}M\beta_{z2}O_{14+\delta2}$. In the general formula, Mα is at least one selected from the group consisting of Cs and K. Mβ is at least one selected from the group consisting of Zr, Sn, V, Nb, Ta, Mo, W, Fe, Co, Mn, and Al. w is within a range of $0 \leq w \leq 4$. x2 is within a range of $0 < x2 < 2$. y2 is within a range of $0 \leq y2 < 2$. z2 is within a range of $0 < z2 < 6$. δ2 is within a range of $-0.5 \leq \delta2 \leq 0.5$.

This composite oxide is a substituted composite oxide in which, in an orthorhombic crystal structure of a composite oxide represented by the general formula of $Li_{2+w}Na_2Ti_6O_{14+\delta}$, a part of Na sites is substituted by a cation Mα and/or Na is removed from a part of the Na sites to form a vacancy, and a part of Ti sites is substituted by a cation Mβ.

When an Na amount in the crystal structure of the composite oxide is changed, an electrode potential behavior of the composite oxide relative to the oxidation-reduction potential of metal lithium is changed. The active material of the second example including the composite oxide, which is represented by the general formula $Li_{2+w}Na_{2-x2}M\alpha_{y2}Ti_{6-z2}M\beta_{z2}O_{14+\delta2}$ wherein x2 is within a range of $0 < x2 < 2$, can have an average potential of lithium absorption of a range of 1.2 V (vs. Li/Li$^+$) to 1.45 V (vs. Li/Li$^+$) when an operating potential is within a range of 0.5 V to 3.0 V relative to the oxidation-reduction potential of metal lithium. Thus, a nonaqueous electrolyte battery, using the active material of the second example as a negative electrode active material can exhibit a battery voltage higher than that of a nonaqueous electrolyte battery using a titanium composite oxide, which has an average potential of lithium absorption of 1.55 V (vs. Li/Li$^+$) in the same range of operating potential, as the negative electrode, for example.

Among the composite oxides represented by the general formula $Li_{2+w}Na_{2-x2}M\alpha_{y2}Ti_{6-z2}M\beta_{z2}O_{14+\delta2}$, in a composite oxide which has a vacancy at a portion corresponding to a part of the Na sites of the composite oxide represented by the general formula $Li_{2+w}Na_2Ti_6O_{14+\delta2}$, this vacancy can serve as a further site of insertion and extraction of Li ion. For this reason, in the composite oxide including such a vacancy, Li ions can be more easily absorbed and released than in the composite oxide represented by the general formula $Li_{2+w}Na_2Ti_6O_{14+\delta2}$; as a result, a higher charge-and-discharge capacity can be realized.

In the active material of the second example, a correlation between a charging capacity and a battery voltage can be more easily comprehended than in the composite oxide represented by the general formula of $Li_{2+w}Na_2Ti_6O_{14+\delta2}$, in a potential range of 1.0 V (vs. Li/Li$^+$) to 1.45 V (vs. Li/Li$^+$). Referring FIG. 4, the reason why the correlation between the charging capacity and the battery voltage can be more easily comprehended in the active material of the second example is explained below.

FIG. 4 shows a charge-and-discharge curve (a broken line) of a composite oxide $Li_2Na_2Ti_6O_{14}$, and a charge-and-discharge curve (a solid line) of a composite oxide $Li_2Na_{1.75}Ti_{5.75}Nb_{0.25}O_{14}$. The composite oxide $Li_2Na_{1.75}Ti_{5.75}Nb_{0.25}O_{14}$, whose potential change is shown by the solid line, has an orthorhombic crystal structure, and is a composite oxide which may be included in the active material of the second example. On the other hand, the composite oxide $Li_2Na_2Ti_6O_{14}$, whose potential change is shown by the broken line, is a composite oxide represented by the general formula $Li_{2+w}Na_2Ti_6O_{14+\delta2}$, and having an orthorhombic crystal structure. The composite oxide $Li_2Na_{1.75}Ti_{5.75}Nb_{0.25}O_{14}$ is a substituted oxide in which Na is removed from a part of the Na sites of the crystal structure of the composite oxide $Li_2Na_2Ti_6O_{14}$ to form a vacancy, and a part of the Ti sites thereof is substituted by Nb.

As shown by the a broken line in FIG. 4, each of the charge curve and the discharge curve of the composite oxide $Li_2Na_2Ti_6O_{14}$ includes as majority excluding an initial stage and a last stage of charge and discharge, a flat portion, in which a variation in the potential accompanied with a change in the capacity is small. For example, it is found, from a charge curve in an Li insertion direction, when the composite oxide $Li_2Na_2Ti_6O_{14}$ is subjected to charge from a potential of 1.35 V (vs. Li/Li$^+$) to a potential of 1.20 V (vs. Li/Li$^+$), about 80 mAh/g is charged in this small difference in potential of 0.15 V. This charge capacity corresponds to about 90% of the total charge capacity of the composite oxide $Li_2Na_2Ti_6O_{14}$. Similarly, it is found, from a discharge curve in an Li extraction direction, when the composite oxide $Li_2Na_2Ti_6O_{14}$ is subjected to discharge from a potential of 1.20 V (vs. Li/Li$^+$) to a potential of 1.35 V (vs. Li/Li$^+$), about 90% of the total discharge capacity is discharged in this small difference in potential of 0.15 V. Thus, the charge curve and the discharge curve of the composite oxide $Li_2Na_2Ti_6O_{14}$ hardly show change in the potential accompanied with the changes of the charged capacity and the discharged capacity. That is, each of the charge and discharge curves of the composite oxide $Li_2Na_2Ti_6O_{14}$ includes as majority, the region in which the potential gradient is small. In a nonaqueous electrolyte battery produced using the composite oxide having such a potential change in a negative electrode, it is difficult to comprehend the correlation between the charging capacity and the battery voltage, and to control SOC during the charge and discharge.

On the other hand, as shown by a solid line in FIG. 4, it is found that each of a charge curve and a discharge curve of the composite oxide $Li_2Na_{1.75}Ti_{5.75}Nb_{0.25}O_{14}$ has, as majority excluding the initial stage and the last stage of the charge and the discharge, a portion in which a variation in the potential accompanied with a change in the capacity is large. Specifically, it is found from the charge curve in the Li insertion direction that when starting from a potential of 1.50 V (vs. Li/Li$^+$) and 90% of the total capacity is charged, the potential of the composite oxide $Li_2Na_{1.75}Ti_{5.75}Nb_{0.25}O_{14}$ becomes about 1.15 V (vs. Li/Li$^+$); in other words, the composite oxide $Li_2Na_{1.75}Ti_{5.75}Nb_{0.25}O_{14}$ exhibits a variation in the potential of about 0.35 V during the charge. Similarly, it is found from the discharge curve in the Li release direction that when starting from a potential of 1.15 V (vs. Li/Li$^+$) and 90% of the total capacity is discharged, the capacity of the composite oxide $Li_2Na_{1.75}Ti_{5.75}Nb_{0.25}O_{14}$ becomes about 1.50 V (vs. Li/Li$^+$), and there is a variation in the potential of about 0.35 V during the discharge. Thus, each of the charge and discharge curves of the composite oxide $Li_2Na_{1.75}Ti_{5.75}Nb_{0.25}O_{14}$ includes as majority, a portion in which a variation in the potential accompanied with a change in the capacity which is larger than that in the potential flat portion included in the charge-and-discharge curve of the composite oxide $Li_2Na_2Ti_6O_{14}$, i.e., a portion having a larger gradient than the potential flat portion.

In addition, as shown by the solid line in FIG. 4, the charge-and-discharge curve of the composite oxide $Li_2Na_{1.75}Ti_{5.75}Nb_{0.25}O_{14}$ exhibits, at portions excluding the initial stage and the last stage thereof, a continuous potential change which does not include a potential stepwise portion in which the potential steeply changes during the charge-and-discharge.

In a nonaqueous electrolyte battery produced using, in the negative electrode, the composite oxide exhibiting the potential change as described above, the correlation between the charged-and-discharged capacity and the battery voltage is easy to comprehend and thus management of the SOC of the battery becomes easy.

As apparent from the charge-and-discharge curve shown in FIG. 4, the composite oxide $Li_2Na_2Ti_6O_{14}$ exhibits a charge-and-discharge capacity of about 90 mAh/g. On the other hand, the composite oxide $Li_2Na_{1.75}Ti_{5.75}Nb_{0.25}O_{14}$ exhibits a charge-and-discharge capacity of 115.9 mAh/g, and can exhibit a charge-and-discharge capacity which is higher than that of the composite oxide $Li_2Na_2Ti_6O_{14}$.

The composite oxide that may be included in the active material of the second example can exhibit a continuous potential change, which does not include a potential stepwise portion, within the potential range of 1.0 V to 1.45 V (vs. Li/Li$^+$) because it can have uniform insertion sites of lithium. The reason for this will be described below.

The composite oxide, which may be included in the active material of the second example, is represented by the general formula $Li_{2+w}Na_{2-x2}M\alpha_{y2}Ti_{6-z2}M\beta_{z2}O_{14+\delta2}$. In this composite oxide, Li exists as a monovalent cation. M$\alpha$ is at least one monovalent cation selected from the group consisting of Cs and K. M$\beta$ is at least one selected from the group consisting of Fe, Co, Mn and Al, which are trivalent cations, Zr and Sn, which are tetravalent cations, V, Nb and Ta, which are pentavalent cations, Mo and W, which are hexavalent cations. Here, the valence of each cation described above are a valence of each cation when w is 0 in the above general formula, i.e., in a discharge state.

In this composite oxide, the total valence of the cations coincides with the total valence of oxide ions which are anions, and charge neutrality is maintained. Specifically, in this composite oxide, the total valence of the lithium ions is 2+w. The total valence of the sodium ions is 2−x2. The total valence of M$\alpha$ is y2. The total valence of Ti is 4×(6−z2). The total valence of the M$\beta$ is, if one mole of the composite oxide includes $z_3$ mol of the trivalent cation M$\beta_3$, $z_4$ mol of the tetravalent cation M$\beta_4$, $z_5$ mol of the pentavalent cation M$\beta_5$, and $z_6$ mol of the hexavalent cation M$\beta_6$, the sum is $(z_3 \times 3)+(z_4 \times 4)+(z_5 \times 5)+(z_6 \times 6)$ (here, $z_3+z_4+z_5+z_6=z2$). The total valence of these cations coincides with the total valence of oxide ions which are anions: $(-2) \times (14+\delta2)$. Here, the subscript of the oxide ion $\delta2$ can have a value within a range of −0.5 to 0.5, and thus the same effects can be obtained even if the total valence of the cations described above varies within a range of ±1 relative to a valence of −28, which is the total valence of the oxide ions. If $\delta2$ deviates beyond the range of $-0.5 \leq \delta2 \leq 0.5$, there is a possibility that the oxidation-reduction state of the cations is deviated from a stable state, or a lattice defects such as an oxygen deficiency has occurred, thus undesirably resulting in reduced battery performance.

Here, assuming that the cations forming the composite oxide are in a stable oxidation state, and oxide ions exist in a proper quantity, $\delta2=0$ would hold, and thus the total valence of the oxide ions is $-2 \times 14 = -28$. If represented by an equation that the total valence of the cations coincides with the total valence of the oxide ions, such an equation (1) would be as follows:

$$(2+w)+(2-x2)+y+\{4\times(6-z2)\}+\{(z_3\times3)+(z_4\times4)+(z_5\times5)+(z_6\times6)\}-28=0 \quad (1)$$

The equation (1) can be organized into the following equation (2):

$$w-x2+y2-4z2+(3z_3+4z_4+5z_5+6z_6)=0 \quad (2)$$

The charge neutrality in the crystal structure of the composite oxide can be maintained by satisfying the conditions of the equation (2). The composite oxide $Li_{2+w}Na_{2-x2}M\alpha_{y2}Ti_{6-z2}M\beta_{z2}O_{14+\delta2}$, whose charge neutrality is maintained, is a substituted oxide in which, in the crystal structure of the composite oxide represented by the general formula of $Li_{2+w}Na_2Ti_6O_{14+\delta2}$, a part of the Ti sites is properly substituted by the cation M$\beta$. In addition, the composite oxide $Li_{2+w}Na_{2-x2}M\alpha_{y2}Ti_{6-z2}M\beta_{z2}O_{14+\delta2}$, in which charge neutrality is maintained and y is greater than 0, is a substituted oxide in which, in the crystal structure of the composite oxide represented by the general formula of $Li_{2+w}Na_2Ti_6O_{14+\delta2}$, a part of the Na sites is properly substituted by the cation Ma. In addition, in the composite oxide $Li_{2+w}Na_{2-x2}M\alpha_{y2}Ti_{6-z2}M\beta_{z2}O_{14+\delta2}$ whose charge neutrality is maintained, a part corresponding to a part of the Na sites in the crystal structure of the composite oxide represented by the general formula $Li_{2+w}Na_2Ti_6O_{14+\delta2}$ can stably exist as a vacancy in the crystal structure. By including the substituted oxide in which the cation M$\beta$ is properly substituted in the crystal structure of the composite oxide represented by the general formula $Li_{2+w}Na_2Ti_6O_{14+\delta2}$ and which includes in the crystal structure of the composite oxide represented by the general formula of $Li_{2+w}Na_2Ti_6O_{14+\delta2}$, the properly substituted cation M$\alpha$ and/or the vacancy which can stably exist, as described above, the active material of the second example can make a coordination environment of the oxide ions in relation to vacancy sites where the lithium ions are inserted uniform. This is a reason why the composite oxide, which may be included in the active material of the second example, can show a continuous potential change within a potential range of 1.0 V to 1.45 V (vs. Li/Li$^+$). On the other hand, a composite oxide in which the uniformity of the coordination environment of the oxide ions in relation to the vacancy sites is low exhibits a potential stepwise portion in the charge-and-discharge curve, i.e., portions with a steep change in the potential.

In addition, by including the substituted oxide in which the cation Mβ is properly substituted in the crystal structure of the composite oxide represented by the general formula $Li_{2+w}Na_2Ti_6O_{14+\delta2}$ and which includes in the crystal structure of the composite oxide represented by the general formula of $Li_{2+w}Na_2Ti_6O_{14+\delta2}$, the properly substituted cation Mα and/or the vacancy which can stably exist, the active material of the second example can provide a nonaqueous electrolyte battery capable of exhibiting high reversible capacity in the charge and discharge and excellent life performance. In particular, the substituted oxide in which a part of the Na sites in the composite oxide $Li_{2+w}Na_2Ti_6O_{14+\delta2}$ is substituted by the vacancy which can stably exist can realize higher reversible capacity, because electrical charge repulsion of sites, which can serve as host for Li ions, is reduced.

Resultantly, the active material of the second example can realize a nonaqueous electrolyte battery which can exhibit high energy density and high battery voltage, is excellent in life performance, and where voltage management is easy.

The subscript w in the general formula $Li_{2+w}Na_{2-x2}M\alpha_{y2}Ti_{6-z2}M\beta_{z2}O_{14+\delta2}$ for the composite oxide can vary within a range of $0 \leq w \leq 4$ depending on the state-of-charge of the composite oxide. For example, according to a production method described below, a composite oxide in which the subscript w is 0 in the general formula described above can be manufactured. When the composite oxide in which the subscript w is 0 is incorporated in a nonaqueous electrolyte battery as the negative electrode active material, and the resulting nonaqueous electrolyte battery is charged, the value of w+2 is elevated to a value within a range of more than 2 and 6 or less. Alternatively, a composite oxide can also be synthesized with a raw material composition ratio where an Li amount in the formula, w+2, would be within a range of more than 2 and 6 or less before initial charge, for example, by the process described below. The active material for a battery including the composite oxide having an Li amount, w+2, within a range of more than 2 and 6 or less before initial charge can suppress the trapping of lithium ions in its structure during the initial charge-and-discharge, and as a result, the initial charge-and-discharge efficiency can be improved.

The subscript x2 in the general formula $Li_{2+w}Na_{2-x2}M\alpha_{y2}Ti_{6-z2}M\beta_{z2}O_{14+\delta2}$ for the composite oxide indicates an Na amount in the crystal structure of this composite oxide. The active material of the second example can control an average operating potential of an electrode including this active material within a range of 1.2 V (vs. Li/Li$^+$) to 1.5 V (vs. Li/Li$^+$) to the oxidation-reduction potential of metallic lithium by changing the Na amount in the crystal structure, i.e., changing the value of the subscript x. Thereby, designing the operating potential of the battery becomes easy. From a different aspect, the subscript x is an index showing a ratio of a part which is substituted by the cation Mα or the vacancy in the substituted composite oxide, among the sites corresponding to the Na sites in the composite oxide $Li_{2+w}Na_2Ti_6O_{14+\delta2}$. The subscript x2 is within a range of $0<x2<2$, preferably $0.1 \leq x2 \leq 0.9$, more preferably $0.25 \leq x2 \leq 0.75$.

The subscript y2 in the general formula $Li_{2+w}Na_{2-x2}M\alpha_{y2}Ti_{6-z2}M\beta_{z2}O_{14+\delta2}$ indicates an amount of cation Mα included in the crystal structure of the composite oxide represented by this general formula. In addition, the cation Mα is one with which a part of the Na sites in the composite oxide $Li_{2+w}Na_2Ti_6O_{14+\delta2}$ is substituted. Accordingly, the combination of the subscript x2 and the subscript y2 is an index showing a proportion of a part which is substituted by the cation Mα in the substituted composite oxide, among the sites corresponding to the Na sites in the composite oxide $Li_{2+w}Na_2Ti_6O_{14+\delta}$. The value of the subscript y2 is, accordingly, a value equal to or less than the value of the subscript x2.

The subscript y2 is within a range of $0 \leq y2 < 2$. Therefore, the value of the subscript y2 may be 0. That is, the composite oxide, represented by the general formula $Li_{2+w}Na_{2-x2}M\alpha_{y2}Ti_{6-z2}M\beta_{z2}O_{14+\delta2}$, may include no cation Mα. When the value of the subscript y2 is 0, the composite oxide included in the active material of the second example, is represented by the general formula $Li_{2+w}Na_{2-x2}Ti_{6-z2}M\beta_{z2}O_{14+\delta2}$. In this composite oxide, a part corresponding to a part of the Na sites in the composite oxide $Li_{2+w}Na_2Ti_6O_{14+\delta2}$, i.e., a part of the proportion indicated by the subscript x2 is vacancy.

When Na ion are removed from a part of the Na sites in the composite oxide $Li_{2+w}Na_2Ti_6O_{14+\delta}$ to form vacancy, the total valence of the cations in the composite oxide is reduced. Specifically, when x2 moles of Na ions are removed from one mole of the composite oxide $Li_{2+w}Na_2Ti_6O_{14+\delta2}$ to form x2 moles of vacancies, the total valence of the cations in this composite oxide is reduced by x2. In such a case, the charge neutrality can be maintained, for example, by having Li ions be absorbed into the formed vacancies or by substituting a part of Ti sites in the composite oxide $Li_{2+w}Na_2Ti_6O_{14+\delta}$ by the pentavalent Mβ$_5$ or the hexavalent Mβ$_6$ as the cation Mβ, so as to compensate the reduced valences x2. Such a substitution can reduce Na ions, which impede lithium ion conduction, and increase vacancies, which are host sites of Li ions, while the crystal structure of the composite oxide $Li_{2+w}Na_2Ti_6O_{14+\delta2}$ is maintained. Thus, the substituted composite oxide capable of realizing the improved charge-and-discharge capacity can be obtained.

The subscript y2 is preferably within a range of $0 \leq y2 \leq 1$, more preferably 0.

The subscript z2 in the general formula $Li_{2+w}Na_{2-x2}M\alpha_{y2}Ti_{6-z2}M\beta_{z2}O_{14+\delta2}$ for the composite oxide indicates an amount of the cation Mβ included in the crystal structure of the composite oxide represented by this general formula. In addition, the cation Mβ is one with which a part of the Ti sites in the composite oxide $Li_{2+w}Na_2Ti_6O_{14+\delta}$ is substituted. Therefore, the subscript z2 is an index showing a proportion of a part which is substituted by the cation Mβ in the substituted composite oxide, among the sites corresponding to the Ti sites in the composite oxide $Li_{2+w}Na_2Ti_6O_{14+\delta2}$. The subscript z2 is within a range of $0 < z2 \leq 6$, preferably $0.1 \leq z2 \leq 0.9$, more preferably $0.25 \leq z2 \leq 0.75$.

The subscript δ2 in the general formula $Li_{2+w}Na_{2-x2}M\alpha_{y2}Ti_{6-z2}M\beta_{z2}O_{14+\delta2}$ for the composite oxide may vary within a range of $-0.5 \leq \delta2 \leq 0.5$ depending on the oxygen deficiency of the composite oxide represented by this general formula or the amount of oxygen inevitably incorporated during the production process of the active material.

Although each of the subscripts w, x2, y2, z2 and δ2 can be a value within the specific range as described above, in the composite oxide represented by the general formula $Li_{2+w}Na_{2-x2}M\alpha_{y2}Ti_{6-z2}M\beta_{z2}O_{14+\delta2}$, the total valence of the cations is equal to the total valence of the anions, as described above.

In an X-ray diffraction diagram for the composite oxide represented by the general formula $Li_{2+w}Na_{2-x2}$ $M\alpha_{y2}$ $Ti_{6-z2}M\beta_{z2}O_{14+\delta2}$, obtained by a powder X-ray diffraction using Cu—Kα rays, it is preferable that an intensity ratio $I_{L20}/I_{H20}$ is within a range of $2.25 \le I_{L20}/I_{H20} < 3.50$, wherein $I_{L20}$ is an intensity of a strongest diffraction peak appearing in a range of $17° \le 2\theta \le 18.5°$, and $I_{H20}$ is an intensity of a strongest diffraction peak appearing in a range of $18.5° < 2\theta \le 19.5°$.

A composite oxide according to another example of the preferable aspects in which the intensity ratio $I_{L20}/I_{H20}$ is within a range of $2.25 \le I_{L20}/I_{H20} \le 3.5$ in an X-ray diffraction diagram of the composite oxide, obtained according to a powder X-ray diffraction, is a composite oxide having an orthorhombic crystal structure belonging to a space group Fmmm. In such a composite oxide, in the X-ray diffraction diagram of the composite oxide obtained by powder X-ray diffraction using Cu—Kα rays, an intensity ratio $I_{L21}/I_{H21}$ is within a range of $2.25 \le I_{L21}/I_{H21} \le 3.5$, wherein $I_{L21}$ is an intensity of a diffraction peak corresponding to a (111) plane, and $I_{H21}$ is an intensity of a diffraction peak corresponding to a (202) plane.

For example, $Li_2Na_{1.75}Ti_{5.75}Nb_{0.25}O_{14}$, which is one example of the composite oxide having the symmetry of the space group Fmmm, may have a crystal structure similar to the crystal structure shown in FIG. 3. Specific details are as follows.

First, the crystal structure of the composite oxide $Li_2Na_{1.75}Ti_{5.75}Nb_{0.25}O_{14}$ includes oxide ions at positions corresponding to the smallest spheres 100 shown in FIG. 3, in a similar manner as the crystal structure of $Li_2(Sr_{0.25}Na)_{0.75})Ti_{5.25}Nb_{0.75}O_{14}$.

Further, the crystal structure of the composite oxide $Li_2Na_{1.75}Ti_{5.75}Nb_{0.25}O_{14}$ includes a region corresponding to the region A shown in FIG. 3. This region shows a vacancy site having a channel in which the lithium ion can three-dimensionally move in the crystal structure, and can absorb and release lithium ions. Further, the crystal structure of the composite oxide $Li_2Na_{1.75}Ti_{5.75}Nb_{0.25}O_{14}$ includes a region corresponding to the region B shown in FIG. 3. This region has a polyhedral structure of oxide centering on Ti or Nb, serving as the backbone of the crystal structure. Further, the crystal structure of the composite oxide $Li_2Na_{1.75}Ti_{5.75}Nb_{0.25}O_{14}$ includes a region corresponding to the region C shown in FIG. 3, and this region is a site in which exist lithium ions that can be absorbed and released. In addition, the crystal structure of the composite oxide $Li_2Na_{1.75}Ti_{5.75}Nb_{0.25}O_{14}$ includes a region corresponding to the region D shown in FIG. 3, and this region is a site in which exist Na and Li that function as a backbone for stabilizing the crystal structure, and vacancy.

In the X-ray diffraction diagram of the composite oxide of this example measured by powder X-ray diffraction using Cu—Kα rays, an intensity ratio $I_{L21}/I_{H1}$ is within a range of $2.25 \le I_{L21}/I_{H21} 3.5$. Here, $I_{L21}$ is an intensity of a diffraction peak corresponding to a (111) plane, appearing in a range of $17.8° \le 2\theta \le 18.5°$, and $I_{H21}$ is an intensity of a diffraction peak corresponding to a (202) plane, appearing in a range of $18.5° < 2\theta \le 19.5°$.

In such a composite oxide, crystallites have grown in a direction preferable for absorption and release of lithium ions. Furthermore, the composite oxide can suppress the insertion of lithium ions into vacancy sites where the oxide-ions coordination environments are different from each other. Such an insertion of lithium ions is a cause for a charge-and-discharge curve having a stepwise form. In the active material including the composite oxide of this example, accordingly, the appearance of the potential step-wise portion on the charge-and-discharge curve can be suppressed, and the reversibility of the lithium ions is improved during the charge-and-discharge. Therefore, the effective capacity can be increased, and the life performance of the nonaqueous electrolyte battery can be improved, which is preferable.

Even if the active material of the second example includes a composite oxide having a crystal structure in which a crystal phase having a symmetry other than the Fmmm symmetry is mixed, or includes a composite oxide having a crystal structure similar to the Fmmm symmetry, the same effects can be obtained as those obtained in the aspect including the composite oxide having the symmetry of the space group Fmmm. Specific examples of the symmetry similar to the Fmmm symmetry may include, Cmca, F222, Pmcm, Pmma, Cmma, and the like. In the composite oxide having the crystal structure having each of the symmetries described above, regardless of the crystal plane indices, an intensity ratio $I_{L20}/I_{H20}$ is preferably within a range of $2.25 \le I_{L20}/I_{H20} \le 3.5$, wherein $L_{L20}$ is an intensity of a strongest diffraction peak appearing in a range of $17° 2\theta \le 18.5°$, and $H_{H20}$ is an intensity of a strongest diffraction peak appearing in a range of $18.5° < 2\theta \le 19.5°$. In such a case, not only is the charge-and-discharge curve smooth but also the reversibility of the lithium ion is improved in the charge-and-discharge, whereby the effective capacity is increased, and the life performance of the nonaqueous electrolyte battery can be improved.

In one preferable aspect, the active material of the second example includes the composite oxide represented by the general formula $Li_{2+w}Na_{2-x2}Ti_{6-z2}M\beta_{z2}O_{14+\delta}$. In the formula, Mβ is at least one selected from the group consisting of Zr, Sn, V, Nb, Ta, Mo, W, Fe, Co, Mn, and Al; w is within a range of $0 \le w \le 4$; x2 is within a range of $0 < x2 < 2$; z2 is within a range of $0 < z2 < 6$; and δ2 is within a range of $-0.5 \le \delta2 \le 0.5$.

In the orthorhombic crystal structure of the composite oxide represented by the general formula $Li_{2+w}Na_2Ti_6O_{14}$, a part of the Na sites may be reduced to form vacancy sites, which serve as hosts for the Li ions. Thereby, the energy density per unit weight or unit volume can be increased while a lattice volume capable of easily releasing and absorbing lithium ions is maintained. In addition, when the Na amount is changed, the average operating potential of the electrode can be changed. Thereby, designing the potential of the battery becomes easy.

Furthermore, in a more preferable aspect among these aspects, cation Mβ is Nb. In the more preferable aspect, accordingly, the composite oxide included in the active material of the second example is represented by the general formula $Li_{2+w}Na_{2-x2}Ti_{6-z2}Nb_{z2}O_{14+\delta2}$. Nb can be subjected to a divalent reduction from pentavalent Nb to trivalent Nb, and therefore, by substituting with Nb at least a part of Ti, which can be subjected to a monovalent reduction from tetravalent Ti to trivalent Ti, while on the other hand, vacancy sites are formed at the Na sites, thus the lithium absorption amount of the composite oxide can be increased. When Nb is included in the crystal structure, a potential based on the oxidation-reduction potential of metallic lithium during the absorption of Li is changes continuously in a wide range of 1.5 V to 1.0 V. When at least a part of Ti is substituted by Nb, therefore, not only is the charge-and-discharge capacity increased but also a portion can be included in the charge-and-discharge curve, where the variation in the potential accompanied with a change in the capacity is larger. In the composite oxide, which can exhibit such a charge-and-discharge curve, the charge and discharge potential can be easily correlated with the state-of-charge, and the state-of-charge (SOC) management of the battery or the like becomes easy.

In another preferable aspect, a composite oxide included in the active material of the second example includes two or more elements of different valences at sites corresponding to the Ti sites in the composite oxide $Li_{2+w}Na_2Ti_6O_{14+\delta 2}$. Such a composite oxide has a larger potential gradient during the charge-and-discharge, and therefore is preferable. The reason why the potential gradient is larger is, for example, when two or more elements that differ from each other in electrical correlations with the oxide ion exist at sites corresponding to titanium sites in the crystal structure of the composite oxide $Li_{2+w}Na_2Ti_6O_{14+\delta 2}$, generated at these sites are multiple sites that differ from each other in electrical correlation with the Li ion and with the oxide ion, respectively. More specifically, an element having a higher valence included in these sites has a tendency to draw more of an electron cloud of the oxide ion, and on the other hand, an element having a lower valence has a tendency in which the correlation with the oxide ion and the electron cloud is weak. Therefore, a difference occurs in an electrical state of the oxide ion near to the lithium host site, and as a result, the electrical correlation that the lithium ion receives from the lithium host site also becomes different. As such, the variation in the potential accompanying insertion and extraction of the lithium ion increases.

The composite oxide included in the active material of the second example may be in the state of, for example, a particle. An average particle size of the composite oxide included in the active material of the second example is not particularly limited, and may be varied depending on the desired battery performance.

It is preferable that the active material of the second example includes the composite oxide particles described above, and a conductive substance such as carbon coating the surface thereof. The active material according to such a preferable aspect can exhibit an improved rapid charge-and-discharge performance. In the composite oxide described above, the absorption and release of lithium occurs via a homogeneous solid state reaction, and thus the composite oxide has a nature in which the electrical conductivity increases as the lithium absorption amount increases. In such a composite oxide, the electrical conductivity is relatively low in a region where the lithium absorption amount is small. When the surface of the composite oxide particle is coated in advance with a conductive substance such as carbon, accordingly, the high rapid-charge-and-discharge performance can be obtained regardless of the lithium absorption amount.

Alternatively, the same effects as above can be obtained by coating the surface of the composite oxide particles with lithium titanate, which expresses electrical conductivity as lithium is absorbed, instead of the conductive substance such as carbon. In addition, when the battery is internally short-circuited, lithium titanate coating the surface of the composite oxide particles exhibit an insulation property as lithium is released, therefore the lithium titanate can exhibit excellent safety.

<BET Specific Surface Area>

The BET specific surface area of the composite oxide included in the active material of the second example is not particularly limited, and is preferably 5 m$^2$/g or more and less than 200 m$^2$/g. The BET specific surface area is more preferably 5 m$^2$/g to 30 m$^2$/g.

When the BET specific surface area is 5 m$^2$/g or more, the contact area with the electrolytic solution can be secured. Thus, good discharge rate performances can be easily obtained and also, a charge time can be shortened. On the other hand, when the BET specific surface area is less than 200 m$^2$/g, reactivity with the electrolytic solution can be prevented from being too high and therefore, the life performance can be improved. When the BET specific surface area is 30 m$^2$/g or less, side reactions with the electrolytic solution can be suppressed, and thereby longer life can be further expected. And, in this case, a coatability of a slurry including the active material used in the production of an electrode, which will be described later, can be improved.

Here, as the measurement of the specific surface area, a method similar to that for the active material of the first example may be used.

<Production Method>

The active material of the second example can be synthesized, for example, by a solid phase reaction as described below. First, raw materials, such as oxide, compound, and a salt, are mixed in a proper stoichiometric ratio to obtain a mixture. The salts are preferably salts capable of decomposing at a comparatively low temperature to generate an oxide, such as carbonates and nitrates. Next, the obtained mixture is ground and mixed as uniformly as possible. Subsequently, the resulting mixture is pre-sintered. The pre-sintering is performed at a temperature range of 600° C. to 850° C. in an air atmosphere for a total of 1 to 3 hours. Next, the sintering temperature is increased and the main-sintering is performed at 900° C. to 1500° C. in the atmosphere. At this time, the lithium, which is a light element, may be vaporized due to sintering at a temperature of 900° C. or higher. In such a case, a vaporized amount of lithium in the sintering conditions is examined, and that vaporized amount is compensated for by providing a raw material including lithium in an excess amount to obtain a sample having a proper composition. Furthermore, it is more preferable to prevent a lattice defect due to oxygen deficiency or the like. For example, the raw material powder is subjected to pressure molding to pellets or rods before the main-sintering to decrease an area brought into contact with the air atmosphere and to increase the contact surface between particles. Thereby, the generation of the lattice defect can be suppressed. It is also effective to prevent the vaporization of the light elements by attaching a lid to a sagger for sintering. In a case of industrial mass production, it is preferable that when the raw material powder is sintered, the sintering is performed under a high oxygen partial pressure such as an oxygen atmosphere, or after a normal air-atmosphere sintering, a heat treatment (annealing) is performed at a temperature range of 400° C. to 1000° C. to restore the oxygen deficiency. If the generation of the lattice defect is not suppressed, the crystallinity may possibly be reduced.

When the composite oxide obtained by the synthesis above has a symmetry belonging to the space group Fmmm, the intensity ratio $I_{L21}/I_{H21}$ is within a range of $2.25 \leq I_{L21}/I_{H21} \leq 3.5$ in the X-ray diffraction diagram obtained according to the powder X-ray diffraction using Cu—Kα rays. The intensity $I_{L21}$ is an intensity of a diffraction peak corresponding to a (111) plane, appearing in a range of $17.8° \leq 2\theta \leq 18.5°$, and the intensity $I_{H21}$ is an intensity of a diffraction peak corresponding to a (202) plane, appearing in a range of $18.5° < 2\theta \leq 19.5°$.

When the synthesis is performed as described above, for example, the composite oxide represented by the above general formula wherein the subscript w is 0 can be produced, as explained above. When the composite oxide wherein the subscript w is 0 is incorporated as the negative electrode active material into a nonaqueous electrolyte battery, and the resulting nonaqueous electrolyte battery is charged, a state in which the Li amount w+2 in the formula is increased to a range of more than 2 and 6 or less is made. Alternatively, when a lithium source such as lithium carbonate is used as a raw material, and the composite oxide is synthesized in a raw material composition ratio so that the value of w is within a range of more than 0 and 4 or less, the composite oxide in a state in which the value of w+2 is within a range of more than 2 and 6 or less can also be synthesized. In addition, the composite oxide in a state in which the value of w+2 is within a range of more than 2 and 6 or less can also be obtained by, after the composite oxide is synthesized, immersing the composite oxide into the aqueous lithium hydroxide solution.

Next, a method for obtaining the X-ray diffraction diagram of the composite oxide according to the powder X-ray diffraction, and a method for examining the composition of the composite oxide will be described.

When a target active material to be measured is included in an electrode material of a nonaqueous electrolyte battery, a pre-treatment is performed as described below.

First, a state in which lithium ions are completely removed from the crystals of the active material is made. When the target active material to be measured is included in the negative electrode, the battery is made to be in a completely discharged state. However, there may be remaining lithium ions even if in the discharged state, but the existence thereof does not greatly affect the measurement results of the powder X-ray diffraction described below.

Next, the battery is disassembled in a glove box filled with argon, and electrodes are taken out. The taken-out electrode is washed with an appropriate solvent and dried under a reduced pressure. For example, ethyl methyl carbonate may be used. After washing and drying, whether or not there are white precipitates such as a lithium salt on the surface is examined.

When subjecting to the powder X-ray diffraction measurement, the washed electrode is cut into a size having the same area as that of a holder of the powder X-ray diffraction apparatus, to be used as a measurement sample.

When a composition analysis is performed, the active material is taken out from the washed electrode, and the taken-out active material is analyzed, as described later.

<Method for Obtaining X-Ray Diffraction Diagram of Composite Oxide According to Powder X-Ray Diffraction>

The powder X-ray diffraction measurement of the active material is performed as follows:

First, the target sample is ground until an average particle size reaches about 5 μm. Even if the original average particle size is less than 5 μm, it is preferable that the sample is subjected to a grinding treatment with a mortar in order to grind apart aggregates. The average particle size can be obtained by laser diffraction. The ground sample is filled in a holder part having a depth of 0.5 mm, formed on a glass sample plate. A glass sample plate manufactured by Rigaku Corporation is used as the glass sample plate. At this time, care should be taken to fill the holder part sufficiently with the sample. Precaution should be taken to avoid cracking and formation of voids caused by insufficient filling of the sample. Then, another glass plate is used to smoothen the surface of the sample by sufficiently pressing the glass plate against the sample. In this case, precaution should be taken to avoid too much or too little filling amount, so as to prevent any rises and dents in the basic plane of the glass holder. Next, the glass plate filled with the sample is set in a powder X-ray diffractometer. And then, a diffraction pattern [XRD (X-ray diffraction) pattern] is obtained using Cu—Kα rays.

In the case where an orientation in which crystal planes are arranged in a specific direction according to the shapes of particles is observed from the results of the Rietveld analysis, there is the possibility of deviation of peak position and variation in an intensity ratio, depending on the way of filling the sample when the glass plate is filled with the sample. Such a sample having high orientation is measured using a capillary (cylindrical glass narrow tube). Specifically, the sample is inserted into the capillary, which is then mounted on a rotary sample table and measured while being rotated. Such a measuring method can provide the result with the influence of orientation reduced.

As an apparatus for powder X-ray diffraction measurement, SmartLab manufactured by Rigaku is used. Measurement is performed under the following condition: Cu target; 45 kV, 200 mA; soller slit: 5 degrees in both incident light and received light; step width: 0.02 deg; scan speed: 20 deg/min; semiconductor detector: D/teX Ultra 250; sample plate holder: flat glass sample plate holder (0.5 mm in thickness); measurement range: $5°≤2θ≤90°$. When another apparatus is used, in order to obtain measurement results equivalent to those described above, measurement using a standard Si powder for powder X-ray diffraction is performed, and measurement is conducted under conditions where a peak intensity and a peak top position correspond to those obtained using the above apparatus.

The X-ray diffraction (XRD) pattern obtained herein must be applicable to Rietveld analysis. In order to collect data for Rietveld analysis, the measurement time or X-ray intensity is appropriately adjusted in such a manner that the step width is made $⅓$ to $⅕$ of the minimum half width of the diffraction peaks, and the intensity at the peak position of strongest reflected intensity is 5,000 cps or more.

The XRD pattern obtained as described above is analyzed by the Rietveld method. In the Rietveld method, the diffraction pattern is calculated from the crystal structure model which has been previously estimated. The parameters of the crystal structure (lattice constant, atomic coordinate, crystal site occupancy ratio, or the like) can be precisely analyzed by fitting all the calculated values with the measured values. Thereby, the characteristics of the crystal structure of the synthesized composite oxide can be determined. Furthermore, the site occupancy ratio of constitutional elements in each of the sites can be determined. A fitting parameter S is used as the scale for estimating the degree of agreement between the measured intensities and the calculated intensities in the Rietveld analysis. The S value must be less than 1.8 in the analysis. When determining the occupancies in each of the sites, the standard deviation $σ_j$ must be taken into consideration. The fitting parameter S and standard deviation $σ_j$ defined herein are estimated using the formula described in "Funmatsu X sen Kaisetsu no Jissai (Reality of Powder X-Ray Analysis", X-Ray Analysis Investigation Conversazione, The Japan Society for Analytical Chemistry, written and edited by Izumi Nakai and Fujio Izumi (Asakura Publishing Co., Ltd.).

By the above method, information about the crystal structure of the target active material to be measured can be obtained. For example, when the active material according to the first embodiment is measured as described above, the measured target active material would be found to have a composite oxide having an orthorhombic structure. Further, the symmetry of the crystal structure of the measured target, such as space group Cmca and Fmmm, can be examined, for example, by measuring as described above.

On the other hand, in order to determine the intensities $I_L$ and $I_H$ ($I_{L1}$ and $I_{H1}$, or $I_{L2}$ and $I_{H2}$) of diffraction peaks for the composite oxide included in the active material of the first example, the powder X-ray diffraction results measured under the above conditions are left unprocessed, and raw data is used. The peak top, i.e., the maximum intensity of a strongest diffraction peak appearing within the range of $17.0° \leq 2\theta \leq 18.5°$ is defined as $I_L$. On the other hand, the peak top, i.e., the maximum intensity of a strongest diffraction peak appearing within the range of $18.5° < 2\theta \leq 19.5°$ is defined as $I_H$. An intensity ratio $I_L/I_H$ can be calculated by dividing the intensity numerical value (counts per second: cps) of the intensity $I_L$ by the intensity numerical value (cps) of the intensity $I_H$.

Furthermore, in order to determine the intensities $I_{L20}$ and $I_{H20}$ ($I_{L21}$ and $I_{H21}$) of diffraction peaks for the composite oxide included in the active material of the second example, the powder X-ray diffraction results measured under the aforementioned conditions are left unprocessed, and raw data is used. The peak top, i.e., the maximum intensity of a strongest diffraction peak appearing within the range of $17° \leq 2\theta \leq 18.5°$ is defined as $I_{L20}$. On the other hand, the peak top, i.e., the maximum intensity of a strongest diffraction peak appearing within the range of $18.5° < 2\theta \leq 19.5°$ is defined as $I_{H20}$. An intensity ratio $I_{L20}/I_{H20}$ can be calculated by dividing the intensity numerical value (counts per second: cps) of the intensity $I_{L20}$ by the intensity numerical value (cps) of the intensity $I_{H20}$.

When the target active material to be measured is included in the electrode material of the nonaqueous electrolyte battery, first, the electrode is taken out from the nonaqueous electrolyte battery according to the previously described procedure. The taken-out and washed electrode is cut to be of an area about equal to the area of the holder of a powder X-ray diffractometer, and used as the measurement sample.

The obtained measurement sample is affixed directly to the glass holder, and measured. In this case, the position of the peak originated from the electrode substrate such as a metal foil is measured in advance. The peaks of other components such as a conductive agent and a binder are also measured in advance. In a case such that the peaks of the substrate and active material overlap each other, it is desirable that the layer including the active material (e.g., the later-described electrode layer) is separated from the substrate, and subjected to measurement. This is in order to separate the overlapping peaks when quantitatively measuring the peak intensity. For example, the active material layer can be separated by irradiating the electrode substrate with an ultrasonic wave in a solvent. The active material layer is inserted into a capillary, mounted on a rotary sample table, and measured. By such a method, the XRD pattern of the active material can be obtained with the influence of the orientation reduced.

<Method for Examining Composition of Composite Oxide>

The composition of the active material can be analyzed using Inductively Coupled Plasma (ICP) emission spectroscopy, for example. In this case, the abundance ratios of elements depend on the sensitivity of an analyzing device to be used. Therefore, when the composition of the active material of the first example, for example, is analyzed using ICP emission spectroscopy, the numerical values may deviate from the previously described element ratios to a degree corresponding to error in the measuring device. However, even if the measurement results deviate within the error range of the analyzing device, as described above, the active material of the first example can sufficiently exhibit the previously described effects.

In order to measure the composition of the active material included in a battery according to ICP emission spectroscopy, the following procedure is specifically performed. First, according to the previously described procedure, an electrode including the target active material to be measured is taken out from a nonaqueous electrolyte battery, and washed. The washed electrode is put in a suitable solvent, and irradiated with an ultrasonic wave. For example, an electrode is put into ethyl methyl carbonate in a glass beaker and the glass beaker is vibrated in an ultrasonic washing machine, and thereby an electrode layer including an electrode active material can be separated from a current collector. Next, the separated electrode layer is dried under reduced pressure. The obtained electrode layer is ground in a mortar or the like to provide a powder including the target active material, conductive auxiliary agent, binder, or the like. By dissolving the powder in an acid, a liquid sample including the active material can be prepared. At this time, hydrochloric acid, nitric acid, sulfuric acid, and hydrogen fluoride or the like can be used as the acid. The composition of the active material can be found by subjecting the liquid sample to ICP emission spectrochemical analysis.

Next, an example of a battery module according to the first embodiment will be specifically described with reference to the drawings.

Figure 5:
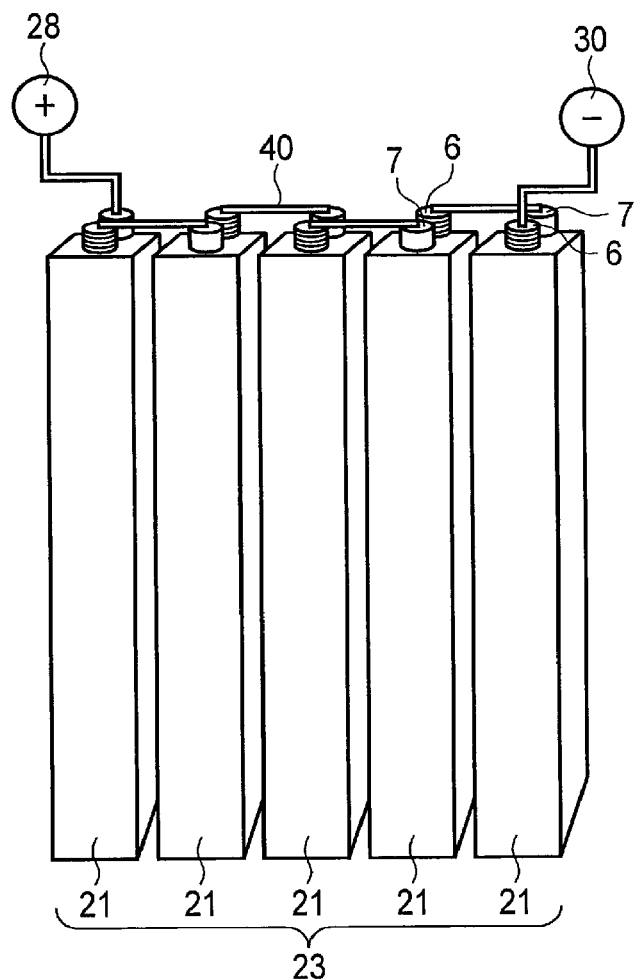
FIG. 5 is a schematic perspective view of an example of a battery module according to a first embodiment.

FIG. 5 is a schematic perspective view of an example of a battery module according to the first embodiment. A battery module 23 shown in FIG. 5 includes five nonaqueous electrolyte batteries that are unit cells 21.

The battery module 23 shown in FIG. 5 further includes four leads 40. A lead 40 connects a negative electrode terminal 6 of one unit cell 21 and a positive electrode terminal 7 of another unit cell 21. Thus, the five unit cells 21 are electrically connected to each other in series via the four leads 40. That is, the battery module 23 of FIG. 5 is a battery module with five unit cells connected in series.

As shown in FIG. 5, the positive electrode terminal 7 of one unit cell 21 among the five unit cells 21 is connected to a positive electrode-side lead 28 for external connection. The negative electrode terminal 6 of another unit cell 21 among the five unit cells 21 is connected to a negative electrode-side lead 30 for external connection.

The battery module including the square-shaped nonaqueous electrolyte battery 21 is described by way of illustration in FIG. 5. However, the structure of the nonaqueous electrolyte batteries included in the battery module according to the first embodiment is not particularly limited. For example, the battery module according to the first embodiment may also include a nonaqueous electrolyte battery shown in FIGS. 6 and 7 described below.

Figure 6:
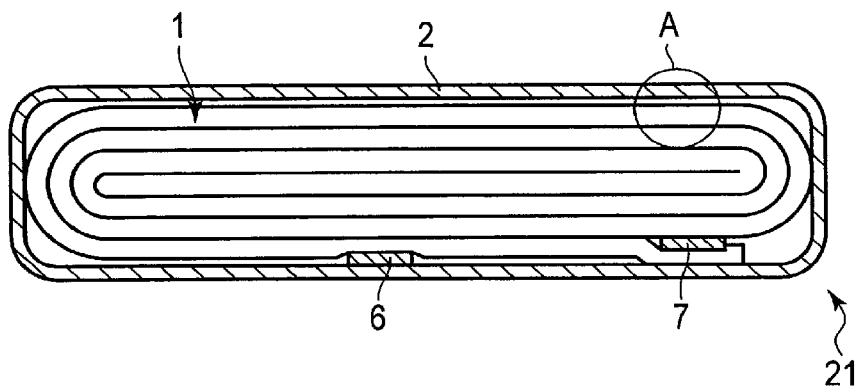
FIG. 6 is a cross-sectional view of an example of a nonaqueous electrolyte battery that can be included in the battery module according to the first embodiment.
Figure 7:
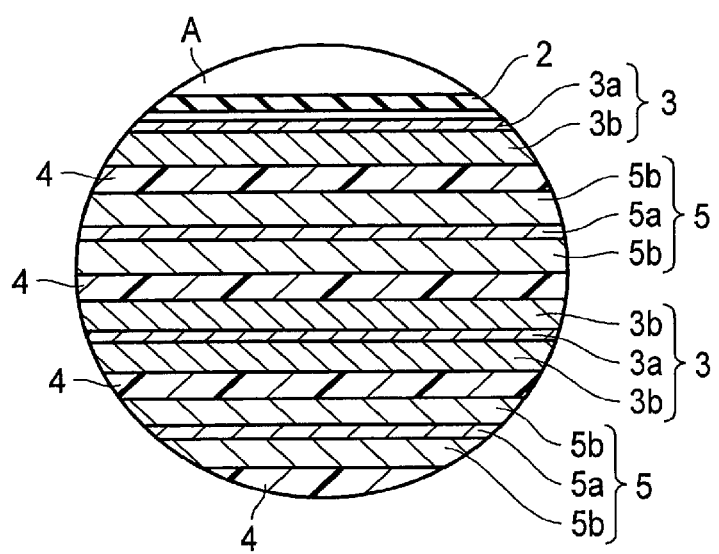
FIG. 7 is an enlarged cross-sectional view showing a portion A in FIG. 6.

FIG. 6 is a cross-sectional view of an example of a nonaqueous electrolyte battery that the battery module according to the first embodiment may include. FIG. 7 is an enlarged cross-sectional view showing a portion A in FIG. 6.

A nonaqueous electrolyte battery 21 shown in FIGS. 6 and 7 includes a bag-shaped container member 2 shown in FIG. 6, an electrode group 1 shown in FIGS. 6 and 7, and a nonaqueous electrolyte (not shown). The electrode group 1 and the nonaqueous electrolyte are housed in the container member 2. The nonaqueous electrolyte is held in the electrode group 1.

The bag-shaped container member 2 is made of a laminate film including two resin layers and a metal layer sandwiched between the resin layers.

As shown in FIG. 6, the electrode group 1 is a wound electrode group in a flat form. The wound electrode group 1 in a flat form is formed by, spirally winding a stack where stacked, in order from the outside, are a negative electrode 3, a separator 4, a positive electrode 5, and a separator 4, as shown in FIG. 7, and then press-forming the wound laminate.

The negative electrode 3 includes a negative electrode current collector 3a and a negative electrode layer 3b. In the portion positioned on the outermost side, the negative electrode 3 has a configuration in which a negative electrode layer 3b is formed only on one side which is the internal surface of a negative electrode current collector 3a as shown in FIG. 7. In the other portions of the negative electrode 3, the negative electrode layers 3b are formed on both of reverse surfaces of the negative electrode current collector 3a.

The positive electrode 5 includes a positive electrode current collector 5a and positive electrode layers 5b formed on both of reverse surfaces of the positive electrode current collector 5a.

As shown in FIG. 6, in the vicinity of the outer peripheral edge of the wound electrode group 1, a negative electrode terminal 6 is connected to the negative electrode current collector 3a in the outermost negative electrode 3, and a positive electrode terminal 7 is connected to the positive electrode current collector 5a in the positive electrode 5 on the inner side. The negative electrode terminal 6 and the positive electrode terminal 7 are extended out from the opening of the bag-shaped container member 2.

The nonaqueous electrolyte battery 21 shown in FIGS. 6 and 7 can be produced according to the following procedure, for example. First, an electrode group 1 is produced. The electrode group 1 is then enclosed in a bag-shaped container member 2. Upon which, one ends of each the negative electrode terminal 6 and positive electrode terminal 7 are made to protrude outside the container member 2. Next, the circumference of the container member 2 is heat-sealed with a portion left unsealed. Next, for example, a liquid nonaqueous electrolyte is injected via the opening of the bag-shaped container member 2 which had not been heat-sealed. Finally, the opening is heat-sealed, and thereby the wound electrode group 1 and the liquid state nonaqueous electrolyte are completely sealed.

Figure 8:
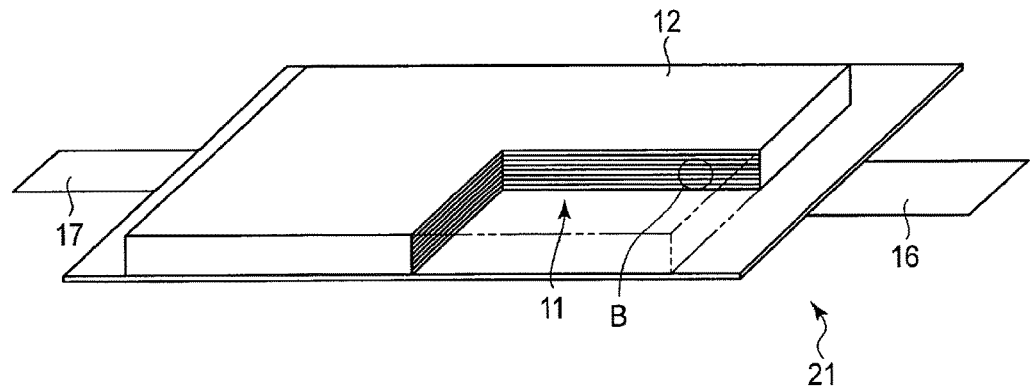
FIG. 8 is a partially cutout perspective view schematically showing another example of a nonaqueous electrolyte battery that can be included in the battery module according to the first embodiment.
Figure 9:
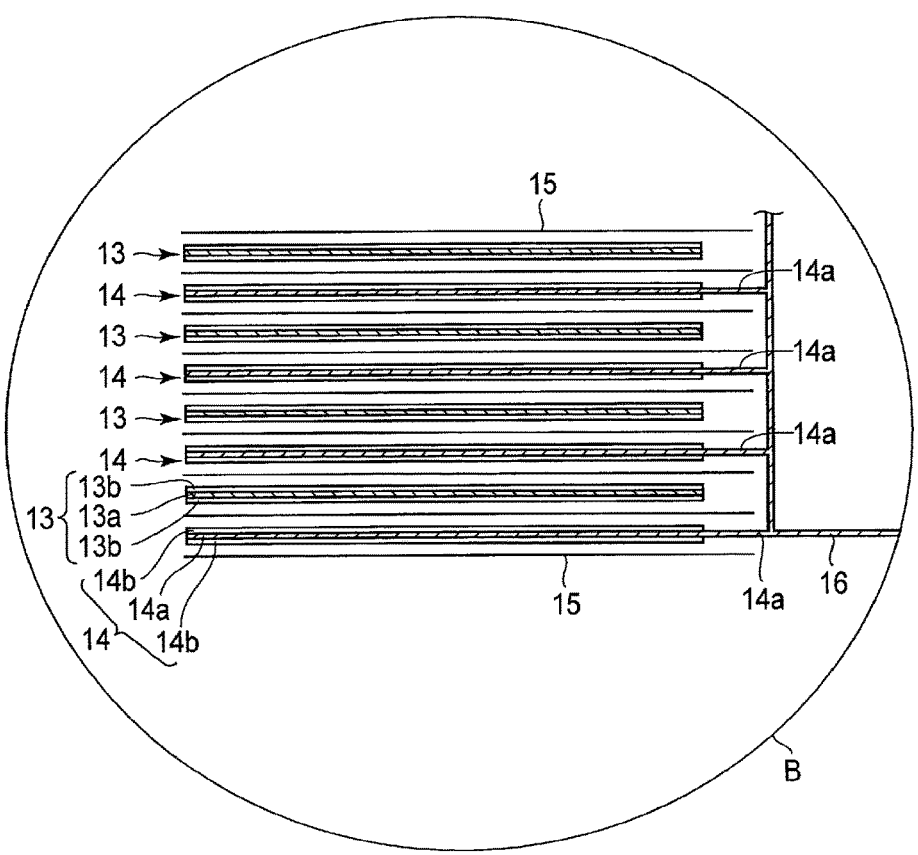
FIG. 9 is an enlarged cross sectional view of a portion B in FIG. 8.

The battery module according to the first embodiment may include, for example, a battery configured as shown in FIGS. 8 and 9.

FIG. 8 is a partially cutaway perspective view schematically showing another example of a nonaqueous electrolyte battery according to the second embodiment. FIG. 9 is an enlarged cross-sectional view showing a portion B in FIG. 8.

A nonaqueous electrolyte battery 21 shown in FIGS. 8 and 9 includes an electrode group 11 shown in FIGS. 8 and 9, a container member 12 shown in FIG. 8, and a nonaqueous electrolyte (not shown). The electrode group 11 and the nonaqueous electrolyte are housed in the container member 12. The nonaqueous electrolyte is held in the electrode group 11.

The container member 12 is made of a laminate film including two resin layers and a metal layer sandwiched between the resin layers.

As shown in FIG. 9, the electrode group 11 is a stacked electrode group. As shown in FIG. 9, the stacked electrode group 11 has a structure in which positive electrodes 13 and negative electrodes 14 are alternately stacked with a separator 15 sandwiched therebetween.

The electrode group 11 includes plural positive electrodes 13. Each of the plural positive electrodes 13 includes a positive electrode current collector 13a, and a positive electrode layer 13b supported on both of reverse surfaces of the positive electrode current collector 13a. The electrode group 11 includes plural negative electrodes 14. Each of the plural negative electrodes 14 includes a negative electrode current collector 14a, and a negative electrode layer 14b supported on both of reverse surfaces of the negative electrode current collector 14a. An end of the negative electrode current collector 14a of each of the negative electrodes 14 protrudes out from the negative electrode 14. The protruded negative electrode current collector 14a is electrically connected to a strip-shaped negative electrode terminal 16. The tip of the strip-shaped negative electrode terminal 16 is extended out from the container member 12. Although not shown in the drawings, an end of the positive electrode current collector 13a of the positive electrode 13 protrudes from the positive electrode 13 at the side opposed to the protruded end of the negative electrode current collector 14a. The positive electrode current collector 13a protruding from the positive electrode 13 is electrically connected to a strip-shaped positive electrode terminal 17. The tip of the strip-shaped positive electrode terminal 17 is positioned on the opposite side from the negative electrode terminal 16, and extended out from a side of the container member 12.

The battery module according to the first embodiment includes five nonaqueous electrolyte batteries electrically connected in series. Each of the nonaqueous electrolyte batteries includes a negative electrode including an active material that includes a titanium composite oxide. The titanium composite oxide includes Na and a metal element M in its crystal structure. The metal element M is at least one selected from the group consisting of Zr, Sn, V, Nb, Ta, Mo, W, Fe, Co, Mn, and Al. The battery module can exhibit an average operating voltage which is comparable with the average operating voltage of a 12 V battery module including a lead storage battery. Therefore, the battery module according to the first embodiment can exhibit excellent voltage compatibility with the battery module including a lead storage battery.

(Second Embodiment)

According to a second embodiment, a battery pack is provided. The battery pack includes the battery module of the first embodiment.

Next, an example of a battery pack according to the second embodiment will be described with reference to the drawings.

FIG. 10 is an exploded perspective view of an example of the battery pack according to the second embodiment. FIG. 11 is a block diagram showing an electric circuit of the battery pack of FIG. 10.

A battery pack 20 shown in FIGS. 10 and 11 includes five unit cells 21. The 5 unit cells 21 are flat nonaqueous electrolyte batteries 10 described with reference to FIGS. 6 and 7.

Plural unit cells 21 are stacked so that the negative electrode terminals 6 and the positive electrode terminals 7 extended outside are arranged in the same direction, and fastened with an adhesive tape 22 to configure a battery module 23. The unit cells 21 are electrically connected to each other in series as shown in FIG. 11. That is, the battery pack shown in FIG. 10 includes an example of the battery module according to the first embodiment.

A printed wiring board 24 is arranged to face opposite to the side plane of the battery module 23 where the negative electrode terminal 6 and the positive electrode terminal 7 extend out from. A thermistor 25, a protective circuit 26, and an energizing terminal 27 to an external device are mounted on the printed wiring board 24 as shown in FIG. 11. An electric insulating plate (not shown) is attached to the surface of the printed wiring board 24 facing the battery module 23 to avoid unnecessary connection of the wires of the battery module 23.

A positive electrode-side lead 28 is connected to the positive electrode terminal 7 located at the bottom layer of the battery module 23 and the distal end of the lead 28 is inserted into a positive electrode-side connector 29 of the printed wiring board 24 so as to be electrically connected. An negative electrode-side lead 30 is connected to the negative electrode terminal 6 located at the top layer of the battery module 23 and the distal end of the lead 30 is inserted into an negative electrode-side connector 31 of the printed wiring board 24 so as to be electrically connected. The connectors 29 and 31 are connected to the protective circuit 26 through wires 32 and 33 formed on the printed wiring board 24.

The thermistor 25 detects the temperature of the unit cells 21, and the detection signal is sent to the protective circuit 26. The protective circuit 26 can shut down a plus-side wire 34a and a minus-side wire 34b between the protective circuit 26 and the energizing terminal 27 to an external device under a predetermined condition. The predetermined condition indicates, for example, the case where the temperature detected by the thermistor 25 becomes a predetermined temperature or more. Another example of the predetermined condition indicates the case where the over-charge, over-discharge, or over-current of the unit cells 21 is detected. The detection of the over-charge and the like is performed on each of the unit cells 21 or the entire battery module 23. When each of the unit cells 21 is detected, the cell voltage may be detected, or positive electrode or negative electrode potential may be detected. In the latter case, a lithium electrode to be used as a reference electrode is inserted into each of the unit cells 21. In the case of the battery pack 20 of FIGS. 10 and 11, wires 35 for voltage detection are connected to each of the unit cells 21. Detection signals are sent to the protective circuit 26 through the wires 35.

Protective sheets 36 made of rubber or resin are arranged on three side planes of the battery module 23 except the side plane from which the positive electrode terminal 7 and the negative electrode terminal 6 protrude out from.

The battery module 23 is housed in a housing container 37 together with each of the protective sheets 36 and the printed wiring board 24. That is, the protective sheets 36 are arranged on both internal surfaces in a long side direction and on one internal surface in a short side direction of the housing container 37. The printed wiring board 24 is arranged on the internal surface on the opposite side in a short side direction. The battery module 23 is located in a space surrounded by the protective sheets 36 and the printed wiring board 24. A lid 38 is attached to the upper surface of the housing container 37.

In order to fix the battery module 23, a heat-shrinkable tape may be used in place of the adhesive tape 22. In this case, the battery module is bound by placing the protective sheets on the both sides of the battery module, revolving the heat-shrinkable tape, and thermally shrinking the heat-shrinkable tape.

In FIGS. 10 and 11, a battery pack including one battery module has been described; however, a battery pack according to the second embodiment may also include plural battery modules. The plural battery modules may be electrically connected in series and/or in parallel.

For example, the battery pack according to the second embodiment can include a first battery module according to the first embodiment, and a second battery module including a lead storage battery operated at 12 V and electrically connected in parallel to the first battery module via a regulator circuit or the like. As described above, the battery module according to the first embodiment can exhibit the same average operating voltage as the average operating voltage of the lead storage battery operated at 12 V, and also has excellent life performance and rapid charge-and-discharge performances. Therefore, the battery pack of this example can assist the input/output performance of the lead storage battery, and prevent over discharge and charge due to an excessive current which cause degradation. Accordingly, the battery pack can reduce a load to the lead storage battery, and therefore, can exhibit excellent life performance. As described above, even if the battery module according to the first embodiment includes five nonaqueous electrolyte batteries, the battery module can have the same average operating voltage as that of the battery module of the lead storage battery operated at 12 V. Therefore, the battery pack of this example can exhibit excellent life performance, and can be produced more inexpensively than a battery pack requiring six nonaqueous electrolyte batteries.

The aspect of the battery pack according to the second embodiment may be appropriately changed depending on its application. The battery pack according to the second embodiment can be suitably used in applications in which cycle performance is demanded to be excellent when large-current is taken out. Specifically the battery pack is used as a power source of a digital camera, or for example, a battery for mounting on a vehicle such as a two- or four-wheeled hybrid electric vehicle, a two- or four-wheeled electric vehicle or a power-assisted bicycle. In particular, the battery pack is suitably used for a battery mounted on a vehicle.

Since the battery pack according to the second embodiment includes the battery module according to the first embodiment, the battery pack can exhibit excellent voltage compatibility with a battery module including a lead storage battery.

EXAMPLES

Examples

Hereinafter, the above embodiments will be described in more detail by way of Examples. The identification of a crystal phase and estimation of a crystal structure of each of the synthesized composite oxides having an orthorhombic crystal structure were made by a powder X-ray diffraction method using Cu—K$\alpha$ rays. The composition of a product was analyzed by an ICP method to examine that a target product was obtained.

(Synthesis)

Example A

Examples A-1 to A-12

In Examples A-1 to A-12, products of Examples A-1 to A-12 were synthesized according to the following procedure. Target compositions of Examples A-1 to A-12 are shown in the following Table 1.

First, commercially available oxides and carbonate reagents shown in the following Table 1 were provided as starting materials so that molar ratios shown in Table 1 were satisfied and the total weight was 50 g. As a result of analyzing the vaporized amount of lithium ions during firing in a preliminary experiment, since the vaporized amount corresponding to 3% in terms of lithium carbonate was confirmed, lithium carbonate was provided in 3% excess relative to the target composition.

Next, the starting materials provided as described above were mixed, and the mixture was put into an agate pod for ball mill (300 ml internal volume). Agate balls having diameters of 10 mm and 5 mm were put into the pod at 1:1 in number so that the volume of the agate balls was one third of the pod internal volume. Then, 50 ml of ethanol was put into the pod, and wet mixing was performed for 60 minutes at 120 rpm to obtain a mixture. Since the materials are uniformly mixed by such wet mixing, a target single crystal phase can be obtained.

Next, the thus obtained mixture was put into an electric furnace, and heat-treated according to the following procedure.

First, the mixture was subjected to pre-sintering in an air atmosphere at a temperature of 650° C. for 6 hours. Then, the powder obtained by pre-sintering was taken out from the furnace, reground, and mixed. By thus performing pre-sintering in advance to decompose carbonates or the like in the raw materials, and then remixing, raw material particles can adhere tightly to each other in the main sintering, and as a result, particles having uniform and high crystallinity can be obtained.

Subsequently, the thus obtained mixture was subjected to first sintering at a temperature of 900° C. for 6 hours. After the sintering, the sintered powder was taken out from the furnace, and remixed.

Subsequently, the remixed sintered powder was put into the furnace, and subjected to second sintering at a temperature of 900° C. in an air atmosphere for 6 hours. Then, the temperature in the electric furnace was held at 400° C. for 2 hours, and the sintered powder was then promptly cooled to room temperature. Then, the sintered powder was taken out from the furnace and remixed. The powder obtained after the second sintering, i.e., as a result of sintering at a temperature of 900° C. for a total of 12 hours was used as each of products of Examples A-1 to A-12.

Example A-13

In Example A-13, a product of Example A-13 was synthesized according to the same procedure as that of Example A-6 except that sintering was performed under a flow of nitrogen gas including 3% of hydrogen in a reduction atmosphere in the electric furnace.

TABLE 1

| A series | Target Composition | Li Source/ Amount | M1 Source/ Amount | M2 Source/ Amount | Ti Source/ Amount | M3 Source/ Amount |
|---|---|---|---|---|---|---|
| Example a-1 | $Li_2SrTi_6O_{14}$ | $Li_2CO_3$/1.0 | $SrCO_3$/1.0 | — | $TiO_2$/6.0 | — |
| Example a-2 | $Li_2MgTi_6O_{14}$ | $Li_2CO_3$/1.0 | MgO/1.0 | — | $TiO_2$/6.0 | — |
| Example a-3 | $Li_2BaTi_{5.9}Al_{0.1}O_{14}$ | $Li_2CO_3$/1.0 | $BaCO_3$/1.0 | — | $TiO_2$/5.9 | $Al_2O_3$/0.05 |
| Example a-4 | $Li_2(Sr_{0.75}Na_{0.25})Ti_6O_{14}$ | $Li_2CO_3$/1.0 | $SrCO_3$/0.75 | $Na_2CO_3$/0.125 | $TiO_2$/6.0 | — |
| Example a-5 | $Li_2SrTi_{5.25}Nb_{0.75}O_{14}$ | $Li_2CO_3$/1.0 | $SrCO_3$/1.0 | — | $TiO_2$/5.25 | $Nb_2O_5$/0.375 |
| Example a-6 | $Li_2Na_2Ti_6O_{14}$ | $Li_2CO_3$/1.0 | — | $Na_2CO_3$/1.0 | $TiO_2$/6.0 | — |
| Example a-7 | $Ti_2Nb_4O_{14}(TiNb_2O_7)$ | — | — | — | $TiO_2$/1.0 | $Nb_2O_5$/1.0 |
| Example A-1 | $Li_2(Sr_{0.99}Na_{0.01})Ti_{5.99}Nb_{0.01}O_{14}$ | $Li_2CO_3$/1.03 | $SrCO_3$/0.99 | $Na_2CO_3$/0.005 | $TiO_2$/5.99 | $Nb_2O_5$/0.005 |
| Example A-2 | $Li_2(Sr_{0.95}Na_{0.05})Ti_{5.95}Nb_{0.05}O_{14}$ | $Li_2CO_3$/1.03 | $SrCO_3$/0.95 | $Na_2CO_3$/0.025 | $TiO_2$/5.95 | $Nb_2O_5$/0.025 |
| Example A-3 | $Li_2(Sr_{0.90}Na_{0.10})Ti_{5.90}Nb_{0.10}O_{14}$ | $Li_2CO_3$/1.03 | $SrCO_3$/0.90 | $Na_2CO_3$/0.05 | $TiO_2$/5.90 | $Nb_2O_5$/0.05 |
| Example A-4 | $Li_2(Sr_{0.75}Na_{0.25})Ti_{5.75}Nb_{0.25}O_{14}$ | $Li_2CO_3$/1.03 | $SrCO_3$/0.75 | $Na_2CO_3$/0.125 | $TiO_2$/5.75 | $Nb_2O_5$/0.125 |
| Example A-5 | $Li_2(Sr_{0.50}Na_{0.50})Ti_{5.50}Nb_{0.50}O_{14}$ | $Li_2CO_3$/1.03 | $SrCO_3$/0.50 | $Na_2CO_3$/0.25 | $TiO_2$/5.50 | $Nb_2O_5$/0.25 |
| Example A-6 | $Li_2(Sr_{0.25}Na_{0.75})Ti_{5.25}Nb_{0.75}O_{14}$ | $Li_2CO_3$/1.03 | $SrCO_3$/0.25 | $Na_2CO_3$/0.375 | $TiO_2$/5.25 | $Nb_2O_5$/0.375 |
| Example A-7 | $Li_2(Sr_{0.10}Na_{0.90})Ti_{5.10}Nb_{0.90}O_{14}$ | $Li_2CO_3$/1.03 | $SrCO_3$/0.10 | $Na_2CO_3$/0.45 | $TiO_2$/5.10 | $Nb_2O_5$/0.45 |
| Example A-8 | $Li_2(Sr_{0.05}Na_{0.95})Ti_{5.05}Nb_{0.95}O_{14}$ | $Li_2CO_3$/1.03 | $SrCO_3$/0.05 | $Na_2CO_3$/0.475 | $TiO_2$/5.05 | $Nb_2O_5$/0.475 |
| Example A-9 | $Li_2(Sr_{0.01}Na_{0.99})Ti_{5.01}Nb_{0.99}O_{14}$ | $Li_2CO_3$/1.03 | $SrCO_3$/0.01 | $Na_2CO_3$/0.495 | $TiO_2$/5.01 | $Nb_2O_5$/0.495 |
| Example A-10 | $Li_{2.2}(Sr_{0.25}Na_{0.75})Ti_{5.25}Nb_{0.75}O_{14}$ | $Li_2CO_3$/1.13 | $SrCO_3$/0.25 | $Na_2CO_3$/0.375 | $TiO_2$/5.25 | $Nb_2O_5$/0.375 |
| Example A-11 | $Li_3(Sr_{0.25}Na_{0.75})Ti_{5.25}Nb_{0.75}O_{14}$ | $Li_2CO_3$/1.55 | $SrCO_3$/0.25 | $Na_2CO_3$/0.375 | $TiO_2$/5.25 | $Nb_2O_5$/0.375 |
| Example A-12 | $Li_6(Sr_{0.25}Na_{0.75})Ti_{5.25}Nb_{0.75}O_{14}$ | $Li_2CO_3$/3.09 | $SrCO_3$/0.25 | $Na_2CO_3$/0.375 | $TiO_2$/5.25 | $Nb_2O_5$/0.375 |
| Example A-13 | $Li_2(Sr_{0.25}Na_{0.75})Ti_{5.25}Nb_{0.75}O_{13.5}$ | $Li_2CO_3$/1.03 | $SrCO_3$/0.25 | $Na_2CO_3$/0.375 | $TiO_2$/5.25 | $Nb_2O_5$/0.375 |

Examples a-1 to a-7

In Example a-1, a compound $Li_2SrTi_6O_{14}$ was synthesized by a solid reaction method described in Electrochemistry Communications, 5, (2003), pp. 435-438. Starting materials and molar ratios thereof were as described in the above Table 1.

In Examples a-2 and a-3, a compound $Li_2MgTi_6O_{14}$ and a compound $Li_2BaTi_{5.9}Al_{0.1}O_{14}$ described in Japanese Patent No. 4237659 were synthesized according to the same procedure as that of Example a-1 except that starting materials and molar ratios thereof were as described in the above Table 1.

In Examples a-4 to a-6, a compound described in the above Table 1 was synthesized according to the same procedure as that of Example a-1 except that starting materials and molar ratios thereof were as described in the above Table 1. In Example a-7, a compound was synthesized according to the same procedure as that of Example a-1 except that starting materials and molar ratios thereof were as described in the above Table 1, and a temperature of the main sintering was 1100° C.

(Examining of Composition of Product)

The compositions of the products of Examples A-1 to A-13 and Examples a-1 to a-7 were analyzed by the previously described ICP method. The results are shown in the following Table 2.

As shown in Table 2, the subscript of oxygen in a composition formula in the product of Example A-13 was 13.5. That is, in the product of Example A-13, oxygen defects had slightly occurred with respect to that of Example A-6.

TABLE 2

| A series | Composition | $Li_xM1_{1-y}M2_yTi_{6-z}M3_zO_{14}$ | | |
|---|---|---|---|---|
| | | x | y | z |
| Example a-1 | $Li_2SrTi_6O_{14}$ | 2.0 | 0 | 0 |
| Example a-2 | $Li_2MgTi_6O_{14}$ | 2.0 | 0 | 0 |
| Example a-3 | $Li_2BaTi_{5.9}Al_{0.1}O_{14}$ | 2.0 | 0 | 0.1 |
| Example a-4 | $Li_2(Sr_{0.75}Na_{0.25})Ti_6O_{14}$ | 2.0 | 0.25 | 0 |
| Example a-5 | $Li_2SrTi_{5.25}Nb_{0.75}O_{14}$ | 2.0 | 0 | 0.75 |
| Example a-6 | $Li_2Na_2Ti_6O_{14}$ | 2.0 | 2.0 | 0 |
| Example a-7 | $Ti_2Nb_4O_{14}$ ($TiNb_2O_7$) | 0 | 0 | 4 |
| Example A-1 | $Li_2(Sr_{0.99}Na_{0.01})Ti_{5.99}Nb_{0.01}O_{14}$ | 2.0 | 0.01 | 0.01 |
| Example A-2 | $Li_2(Sr_{0.95}Na_{0.05})Ti_{5.95}Nb_{0.05}O_{14}$ | 2.0 | 0.05 | 0.05 |
| Example A-3 | $Li_2(Sr_{0.90}Na_{0.10})Ti_{5.90}Nb_{0.10}O_{14}$ | 2.0 | 0.10 | 0.10 |
| Example A-4 | $Li_2(Sr_{0.75}Na_{0.25})Ti_{5.75}Nb_{0.25}O_{14}$ | 2.0 | 0.25 | 0.25 |
| Example A-5 | $Li_2(Sr_{0.50}Na_{0.50})Ti_{5.50}Nb_{0.50}O_{14}$ | 2.0 | 0.50 | 0.50 |
| Example A-6 | $Li_2(Sr_{0.25}Na_{0.75})Ti_{5.25}Nb_{0.75}O_{14}$ | 2.0 | 0.75 | 0.75 |
| Example A-7 | $Li_2(Sr_{0.10}Na_{0.90})Ti_{5.10}Nb_{0.90}O_{14}$ | 2.0 | 0.90 | 0.90 |
| Example A-8 | $Li_2(Sr_{0.05}Na_{0.95})Ti_{5.05}Nb_{0.95}O_{14}$ | 2.0 | 0.95 | 0.95 |
| Example A-9 | $Li_2(Sr_{0.01}Na_{0.99})Ti_{5.01}Nb_{0.99}O_{14}$ | 2.0 | 0.99 | 0.99 |
| Example A-10 | $Li_{2.2}(Sr_{0.25}Na_{0.75})Ti_{5.25}Nb_{0.75}O_{14}$ | 2.2 | 0.75 | 0.75 |
| Example A-11 | $Li_3(Sr_{0.25}Na_{0.75})Ti_{5.25}Nb_{0.75}O_{14}$ | 3.0 | 0.75 | 0.75 |
| Example A-12 | $Li_6(Sr_{0.25}Na_{0.75})Ti_{5.25}Nb_{0.75}O_{14}$ | 6.0 | 0.75 | 0.75 |
| Example A-13 | $Li_2(Sr_{0.25}Na_{0.75})Ti_{5.25}Nb_{0.75}O_{13.5}$ | 2.0 | 0.75 | 0.75 |

(Powder X-Ray Diffraction Measurement)

The products of Examples A-1 to A-13 and the products of Examples a-1 to a-7 were subjected to powder X-ray diffraction measurement according to the previously described procedure.

For each of the products obtained from the results of powder X-ray diffraction measurement, a plane index corresponding to a strongest diffraction peak L appearing within the range of 17.0°≤2θ≤18.5°, a value $2θ_L$ of 2θ of the diffraction peak L, a plane index corresponding to a strongest diffraction peak H appearing within the range of 18.5°<2θ≤19.5°, a value $2θ_H$ of 2θ of the diffraction peak H, and an intensity ratio $I_L/I_H$ of the diffraction peaks are shown in the following Table 3. In Example a-7, not an orthorhombic crystal structure but a monoclinic crystal structure was obtained.

As a result of analyzing the above results of the powder X-ray diffraction method according to the Rietveld method, it was found that the products obtained in Examples A-1 to 13 are an orthorhombic compound having symmetry of a space group Cmca shown in FIG. 2 or an orthorhombic compound having symmetry of a space group Fmmm shown in FIG. 3. The crystal phases and space groups of the products are summarized in the following Table 3.

TABLE 3

| A series | Composition | Crystal Phase | Space Group | Diffraction Peak L Plane Index | Diffraction Peak L 2θ/deg | Diffraction Peak H Plane Index | Diffraction Peak H 2θ/deg | Intensity Ratio of Diffraction Peaks $I_L/I_H$ |
|---|---|---|---|---|---|---|---|---|
| Example a-1 | $Li_2SrTi_6O_{14}$ | Orthorhombic | Cmca | (112) | 18.27 | (220) | 19.25 | 0.60 |
| Example a-2 | $Li_2MgTi_6O_{14}$ | Orthorhombic | Cmca | (112) | 18.35 | (220) | 19.34 | 0.52 |
| Example a-3 | $Li_2BaTi_{5.9}Al_{0.1}O_{14}$ | Orthorhombic | Cmca | (021) | 17.58 | (220) | 19.28 | 0.43 |
| Example a-4 | $Li_2(Sr_{0.75}Na_{0.25})Ti_6O_{14}$ | Orthorhombic | Cmca | (112) | 18.27 | (220) | 19.27 | 0.59 |
| Example a-5 | $Li_2SrTi_{5.25}Nb_{0.75}O_{14}$ | Orthorhombic | Cmca | (112) | 18.29 | (220) | 19.29 | 0.63 |
| Example a-6 | $Li_2Na_2Ti_6O_{14}$ | Orthorhombic | Fmmm | (111) | 18.14 | (202) | 19.09 | 3.06 |
| Example a-7 | $Ti_2Nb_4O_{14}(TiNb_2O_7)$ | Monoclinic | C2/m | — | — | — | — | — |
| Example A-1 | $Li_2(Sr_{0.99}Na_{0.01})Ti_{5.99}Nb_{0.01}O_{14}$ | Orthorhombic | Cmca | (112) | 18.26 | (220) | 19.25 | 0.60 |
| Example A-2 | $Li_2(Sr_{0.95}Na_{0.05})Ti_{5.95}Nb_{0.05}O_{14}$ | Orthorhombic | Cmca | (112) | 18.26 | (220) | 19.25 | 0.65 |
| Example A-3 | $Li_2(Sr_{0.90}Na_{0.10})Ti_{5.90}Nb_{0.10}O_{14}$ | Orthorhombic | Cmca | (112) | 18.24 | (220) | 19.23 | 0.78 |
| Example A-4 | $Li_2(Sr_{0.75}Na_{0.25})Ti_{5.75}Nb_{0.25}O_{14}$ | Orthorhombic | Cmca | (112) | 18.22 | (220) | 19.21 | 1.07 |
| Example A-5 | $Li_2(Sr_{0.50}Na_{0.50})Ti_{5.50}Nb_{0.50}O_{14}$ | Orthorhombic | Cmca | (112) | 18.19 | (220) | 19.18 | 1.56 |
| Example A-6 | $Li_2(Sr_{0.25}Na_{0.75})Ti_{5.25}Nb_{0.75}O_{14}$ | Orthorhombic | Fmmm | (111) | 18.16 | (202) | 19.15 | 2.21 |
| Example A-7 | $Li_2(Sr_{0.10}Na_{0.90})Ti_{5.10}Nb_{0.90}O_{14}$ | Orthorhombic | Fmmm | (111) | 18.15 | (202) | 19.16 | 2.28 |
| Example A-8 | $Li_2(Sr_{0.05}Na_{0.95})Ti_{5.05}Nb_{0.95}O_{14}$ | Orthorhombic | Fmmm | (111) | 18.15 | (202) | 19.15 | 2.36 |
| Example A-9 | $Li_2(Sr_{0.01}Na_{0.99})Ti_{5.01}Nb_{0.99}O_{14}$ | Orthorhombic | Fmmm | (111) | 18.15 | (202) | 19.15 | 2.99 |
| Example A-10 | $Li_{2.2}(Sr_{0.25}Na_{0.75})Ti_{5.25}Nb_{0.75}O_{14}$ | Orthorhombic | Fmmm | (111) | 18.15 | (202) | 19.16 | 2.23 |
| Example A-11 | $Li_3(Sr_{0.25}Na_{0.75})Ti_{5.25}Nb_{0.75}O_{14}$ | Orthorhombic | Fmmm | (111) | 18.14 | (202) | 19.15 | 2.51 |
| Example A-12 | $Li_6(Sr_{0.25}Na_{0.75})Ti_{5.25}Nb_{0.75}O_{14}$ | Orthorhombic | Fmmm | (111) | 18.13 | (202) | 19.14 | 2.63 |
| Example A-13 | $Li_2(Sr_{0.25}Na_{0.75})Ti_{5.25}Nb_{0.75}O_{13.5}$ | Orthorhombic | Fmmm | (111) | 18.16 | (202) | 19.14 | 2.33 |

Figure 12:
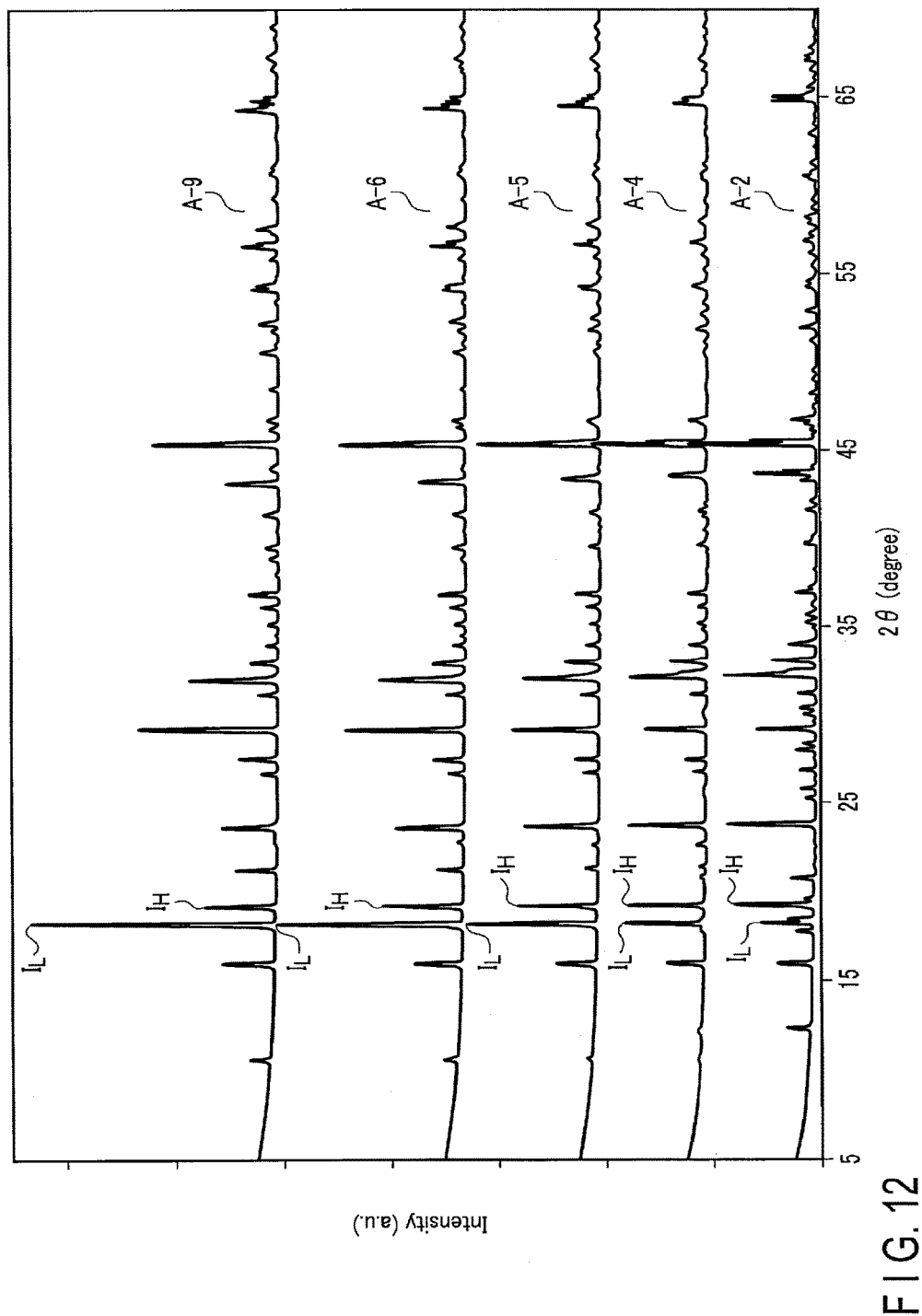
FIG. 12 shows X-ray diffraction diagrams of products of Examples A-2, A-4, A-5, A-6, and A-9.

FIG. 12 shows X-ray charts of Examples A-2, A-4, A-5, A-6, and A-9 as typical X-ray charts.

Example A-14

In Example A-14, a product of Example A-14 was synthesized according to the following procedure.

First, a part of the product of Example A-6 was immersed into a sucrose aqueous solution having a concentration adjusted to 10% by weight. Then, the sucrose solution was filtered. Then, the filtration residue was heated in a nitrogen atmosphere at 700° C. for 2 hours. A product obtained by heating was used as the product of Example A-14.

As a result of analyzing the product of Example A-14 with TEM-EDX (Transmission Electron Microscopy and Energy Dispersive X-ray Spectroscopy), it was found that the surface of the particles of the product of Example A-6 is coated with carbon.

Example A-15

In Example A-15, according to the following procedure, the surface of the product of Example A-6 was coated with lithium titanate $Li_4Ti_5O_{12}$ using a tumbling fluidized bed granulator to synthesize a product of Example A-15.

Specifically, first, lithium ethoxide and titanium tetraisopropoxide were mixed at a molar ratio of Li:Ti=4:5 to prepare a sol-gel liquid. Next, the prepared sol-gel liquid was sprayed to a part of the product of Example A-6 in a tumbling fluidized bed. Thus, a composite in which the sol-gel liquid adhered to the surface of the particles was obtained. The composite was sintered in an air atmosphere at 600° C. for 2 hours. The sol-gel liquid was converted into spinel type lithium titanate by sintering. The thus obtained product was used as the product of Example A-15.

As a result of analyzing the product of Example A-15 with TEM-EDX (Transmission Electron Microscopy and Energy Dispersive X-ray Spectroscopy) and electron diffraction, it was found that the surface of the particles of the product of Example A-6 is coated with a layer of spinel type lithium titanate $Li_4Ti_5O_{12}$.

Example B

In Examples B-1 to B-11, products of Example B-1 to B-11 were obtained in the same manner as in Examples A-1 to A-12 except that, in order to obtain products having target compositions shown in the following Table 4, starting materials shown in Table 4 were used. The molar ratios of the starting materials were set to ratios shown in the following Table 4.

TABLE 4

| B series | Target Composition | Li Source/ Amount | M1 Source/ Amount | M2 Source/ Amount | Ti Source/ Amount | M3 Source/ Amount |
|---|---|---|---|---|---|---|
| Example B-1 | $Li_2(Ba_{0.75}Na_{0.25})Ti_{5.75}Nb_{0.25}O_{14}$ | $Li_2CO_3$/1.03 | $BaCO_3$/0.75 | $Na_2CO_3$/0.125 | $TiO_2$/5.75 | $Nb_2O_5$/0.125 |
| Example B-2 | $Li_2(Ba_{0.50}Na_{0.50})Ti_{5.50}Nb_{0.50}O_{14}$ | $Li_2CO_3$/1.03 | $BaCO_3$/0.50 | $Na_2CO_3$/0.25 | $TiO_2$/5.50 | $Nb_2O_5$/0.25 |
| Example B-3 | $Li_2(Ba_{0.25}Na_{0.75})Ti_{5.25}Nb_{0.75}O_{14}$ | $Li_2CO_3$/1.03 | $BaCO_3$/0.25 | $Na_2CO_3$/0.375 | $TiO_2$/5.25 | $Nb_2O_5$/0.375 |
| Example B-4 | $Li_2(Ca_{0.25}Na_{0.75})Ti_{5.25}Nb_{0.75}O_{14}$ | $Li_2CO_3$/1.03 | $CaCO_3$/0.25 | $Na_2CO_3$/0.375 | $TiO_2$/5.25 | $Nb_2O_5$/0.375 |
| Example B-5 | $Li_2(Mg_{0.25}Na_{0.75})Ti_{5.25}Nb_{0.75}O_{14}$ | $Li_2CO_3$/1.03 | MgO/0.25 | $Na_2CO_3$/0.375 | $TiO_2$/5.25 | $Nb_2O_5$/0.375 |
| Example B-6 | $Li_2(Sr_{0.25}Ba_{0.25}Na_{0.50})Ti_{5.50}Nb_{0.50}O_{14}$ | $Li_2CO_3$/1.03 | $SrCO_3$/0.25 $BaCO_3$/0.25 | $Na_2CO_3$/0.25 | $TiO_2$/5.50 | $Nb_2O_5$/0.25 |
| Example B-7 | $Li_2(Sr_{0.25}Ca_{0.25}Na_{0.50})Ti_{5.50}Nb_{0.50}O_{14}$ | $Li_2CO_3$/1.03 | $SrCO_3$/0.25 $CaCO_3$/0.25 | $Na_2CO_3$/0.25 | $TiO_2$/5.50 | $Nb_2O_5$/0.25 |
| Example B-8 | $Li_2(Sr_{0.25}Mg_{0.25}Na_{0.50})Ti_{5.50}Nb_{0.50}O_{14}$ | $Li_2CO_3$/1.03 | $SrCO_3$/0.25 MgO/0.25 | $Na_2CO_3$/0.25 | $TiO_2$/5.50 | $Nb_2O_5$/0.25 |
| Example B-9 | $Li_2(Ba_{0.25}Ca_{0.25}Na_{0.50})Ti_{5.50}Nb_{0.50}O_{14}$ | $Li_2CO_3$/1.03 | $BaCO_3$/0.25 $CaCO_3$/0.25 | $Na_2CO_3$/0.25 | $TiO_2$/5.50 | $Nb_2O_5$/0.25 |
| Example B-10 | $Li_2(Ba_{0.25}Mg_{0.25}Na_{0.50})Ti_{5.50}Nb_{0.50}O_{14}$ | $Li_2CO_3$/1.03 | $BaCO_3$/0.25 MgO/0.25 | $Na_2CO_3$/0.25 | $TiO_2$/5.50 | $Nb_2O_5$/0.25 |
| Example B-11 | $Li_2(Ca_{0.25}Mg_{0.25}Na_{0.50})Ti_{5.50}Nb_{0.50}O_{14}$ | $Li_2CO_3$/1.03 | $CaCO_3$/0.25 MgO/0.25 | $Na_2CO_3$/0.25 | $TiO_2$/5.50 | $Nb_2O_5$/0.25 |

Products of Examples B-1 to B-11 were subjected to composition analysis and powder X-ray diffraction measurement in the same manner as in Example A series. The results are shown in the following Tables 5 and 6.

TABLE 5

| | | $Li_xMi_{1-y}M2_yTi_{6-z}M3_zO_{14}$ | | |
|---|---|---|---|---|
| B series | Composition | x | y | z |
| Example B-1 | $Li_2(Ba_{0.75}Na_{0.25})Ti_{5.75}Nb_{0.25}O_{14}$ | 2.0 | 0.25 | 0.25 |
| Example B-2 | $Li_2(Ba_{0.50}Na_{0.50})Ti_{5.50}Nb_{0.50}O_{14}$ | 2.0 | 0.50 | 0.50 |
| Example B-3 | $Li_2(Ba_{0.25}Na_{0.75})Ti_{5.25}Nb_{0.75}O_{14}$ | 2.0 | 0.75 | 0.75 |
| Example B-4 | $Li_2(Ca_{0.25}Na_{0.75})Ti_{5.25}Nb_{0.75}O_{14}$ | 2.0 | 0.75 | 0.75 |
| Example B-5 | $Li_2(Mg_{0.25}Na_{0.75})Ti_{5.25}Nb_{0.75}O_{14}$ | 2.0 | 0.75 | 0.75 |
| Example B-6 | $Li_2(Sr_{0.25}Ba_{0.25}Na_{0.50})Ti_{5.50}Nb_{0.50}O_{14}$ | 2.0 | 0.5 | 0.5 |
| Example B-7 | $Li_2(Sr_{0.25}Ca_{0.25}Na_{0.50})Ti_{5.50}Nb_{0.50}O_{14}$ | 2.0 | 0.5 | 0.5 |
| Example B-8 | $Li_2(Sr_{0.25}Mg_{0.25}Na_{0.50})Ti_{5.50}Nb_{0.50}O_{14}$ | 2.0 | 0.5 | 0.5 |
| Example B-9 | $Li_2(Ba_{0.25}Ca_{0.25}Na_{0.50})Ti_{5.50}Nb_{0.50}O_{14}$ | 2.0 | 0.5 | 0.5 |
| Example B-10 | $Li_2(Ba_{0.25}Mg_{0.25}Na_{0.50})Ti_{5.50}Nb_{0.50}O_{14}$ | 2.0 | 0.5 | 0.5 |
| Example B-11 | $Li_2(Ca_{0.25}Mg_{0.25}Na_{0.50})Ti_{5.50}Nb_{0.50}O_{14}$ | 2.0 | 0.5 | 0.5 |

TABLE 6

| B series | Composition | Crystal Phase | Space Group | Diffraction Peak L Plane Index | Diffraction Peak L 2θ/deg | Diffraction Peak H Plane Index | Diffraction Peak H 2θ/deg | Intensity Ratio of Diffraction Peaks $I_L/I_H$ |
|---|---|---|---|---|---|---|---|---|
| Example B-1 | $Li_2(Ba_{0.75}Na_{0.25})Ti_{5.75}Nb_{0.25}O_{14}$ | Orthorhombic | Cmca | (021) | 17.55 | (220) | 19.24 | 0.66 |
| Example B-2 | $Li_2(Ba_{0.50}Na_{0.50})Ti_{5.50}Nb_{0.50}O_{14}$ | Orthorhombic | Cmca | (021) | 17.52 | (220) | 19.21 | 0.85 |
| Example B-3 | $Li_2(Ba_{0.25}Na_{0.75})Ti_{5.25}Nb_{0.75}O_{14}$ | Orthorhombic | Fmmm | (111) | 18.18 | (202) | 19.17 | 1.55 |
| Example B-4 | $Li_2(Ca_{0.25}Na_{0.75})Ti_{5.25}Nb_{0.75}O_{14}$ | Orthorhombic | Fmmm | (111) | 18.26 | (202) | 19.27 | 0.98 |
| Example B-5 | $Li_2(Mg_{0.25}Na_{0.75})Ti_{5.25}Nb_{0.75}O_{14}$ | Orthorhombic | Fmmm | (111) | 18.28 | (202) | 19.28 | 1.05 |
| Example B-6 | $Li_2(Sr_{0.25}Ba_{0.25}Na_{0.50})Ti_{5.50}Nb_{0.50}O_{14}$ | Orthorhombic | Cmca | (112) | 18.14 | (220) | 19.09 | 1.36 |
| Example B-7 | $Li_2(Sr_{0.25}Ca_{0.25}Na_{0.50})Ti_{5.50}Nb_{0.50}O_{14}$ | Orthorhombic | Cmca | (112) | 18.27 | (220) | 19.26 | 1.55 |
| Example B-8 | $Li_2(Sr_{0.25}Mg_{0.25}Na_{0.50})Ti_{5.50}Nb_{0.50}O_{14}$ | Orthorhombic | Cmca | (112) | 18.26 | (220) | 19.25 | 1.43 |
| Example B-9 | $Li_2(Ba_{0.25}Ca_{0.25}Na_{0.50})Ti_{5.50}Nb_{0.50}O_{14}$ | Orthorhombic | Cmca | (112) | 18.24 | (220) | 19.24 | 1.38 |
| Example B-10 | $Li_2(Ba_{0.25}Mg_{0.25}Na_{0.50})Ti_{5.50}Nb_{0.50}O_{14}$ | Orthorhombic | Cmca | (112) | 18.22 | (220) | 19.21 | 1.52 |
| Example B-11 | $Li_2(Ca_{0.25}Mg_{0.25}Na_{0.50})Ti_{5.50}Nb_{0.50}O_{14}$ | Orthorhombic | Cmca | (112) | 18.19 | (220) | 19.18 | 1.54 |

Example C

In Examples c-1 to c-4, Example C-5 and C6, and Example c-7, products of Examples c-1 to c-4, Examples C-5 and C6, and Example c-7 were obtained in the same manner as in Examples A-1 to A-12 except that, in order to obtain products having target compositions shown in the following Table 7, starting materials shown in Table 7 were used. The molar ratios of the starting materials were set to ratios shown in the following Table 7.

TABLE 7

| C series | Target Composition | Li Source/ Amount | M1 Source/ Amount | M2 Source/ Amount | Ti Source/ Amount | M3 Source/ Amount |
|---|---|---|---|---|---|---|
| Example c-1 | $Li_2(Sr_{0.75}K_{0.25})Ti_{5.75}Nb_{0.25}O_{14}$ | $Li_2CO_3/1.03$ | $SrCO_3/0.75$ | $K_2CO_3/0.125$ | $TiO_2/5.75$ | $Nb_2O_5/0.125$ |
| Example c-2 | $Li_2(Sr_{0.50}K_{0.50})Ti_{5.50}Nb_{0.50}O_{14}$ | $Li_2CO_3/1.03$ | $SrCO_3/0.50$ | $K_2CO_3/0.25$ | $TiO_2/5.50$ | $Nb_2O_5/0.25$ |
| Example c-3 | $Li_2(Sr_{0.25}K_{0.75})Ti_{5.25}Nb_{0.75}O_{14}$ | $Li_2CO_3/1.03$ | $SrCO_3/0.25$ | $K_2CO_3/0.375$ | $TiO_2/5.25$ | $Nb_2O_5/0.375$ |
| Example c-4 | $Li_2(Sr_{0.25}Cs_{0.75})Ti_{5.25}Nb_{0.75}O_{14}$ | $Li_2CO_3/1.03$ | $SrCO_3/0.25$ | $Cs_2CO_3/0.375$ | $TiO_2/5.25$ | $Nb_2O_5/0.375$ |
| Example C-5 | $Li_2(Sr_{0.50}K_{0.25}Na_{0.25})Ti_{5.50}Nb_{0.50}O_{14}$ | $Li_2CO_3/1.03$ | $SrCO_3/0.50$ | $K_2CO_3/0.125$ $Na_2CO_3/0.125$ | $TiO_2/5.50$ | $Nb_2O_5/0.25$ |
| Example C-6 | $Li_2(Sr_{0.50}Cs_{0.25}Na_{0.25})Ti_{5.50}Nb_{0.50}O_{14}$ | $Li_2CO_3/1.03$ | $SrCO_3/0.50$ | $Cs_2CO_3/0.125$ $Na_2CO_3/0.125$ | $TiO_2/5.50$ | $Nb_2O_5/0.25$ |
| Example c-7 | $Li_2(Sr_{0.50}Cs_{0.25}K_{0.25})Ti_{5.50}Nb_{0.50}O_{14}$ | $Li_2CO_3/1.03$ | $SrCO_3/0.25$ | $Cs_2CO_3/0.125$ $K_2CO_3/0.125$ | $TiO_2/5.50$ | $Nb_2O_5/0.25$ |

The products of Examples c-1 to c-4, Example C-5 and C6, and Example c-7 were subjected to composition analysis and powder X-ray diffraction measurement in the same manner as in Example A series. The results are shown in the following Tables 8 and 9.

TABLE 8

| | | $Li_xM1_{1-y}M2_yTi_{6-z}M3_zO_{14}$ | | |
|---|---|---|---|---|
| C series | Composition | x | y | z |
| Example c-1 | $Li_2(Sr_{0.75}K_{0.25})Ti_{5.75}Nb_{0.25}O_{14}$ | 2.0 | 0.25 | 0.25 |
| Example c-2 | $Li_2(Sr_{0.50}K_{0.50})Ti_{5.50}Nb_{0.50}O_{14}$ | 2.0 | 0.50 | 0.50 |
| Example c-3 | $Li_2(Sr_{0.25}K_{0.75})Ti_{5.25}Nb_{0.75}O_{14}$ | 2.0 | 0.75 | 0.75 |
| Example c-4 | $Li_2(Sr_{0.25}Cs_{0.75})Ti_{5.25}Nb_{0.75}O_{14}$ | 2.0 | 0.75 | 0.75 |
| Example C-5 | $Li_2(Sr_{0.50}K_{0.25}Na_{0.25})Ti_{5.50}Nb_{0.50}O_{14}$ | 2.0 | 0.50 | 0.50 |
| Example C-6 | $Li_2(Sr_{0.50}Cs_{0.25}Na_{0.25})Ti_{5.50}Nb_{0.50}O_{14}$ | 2.0 | 0.50 | 0.50 |
| Example c-7 | $Li_2(Sr_{0.50}Cs_{0.25}K_{0.25})Ti_{5.50}Nb_{0.50}O_{14}$ | 2.0 | 0.50 | 0.50 |

TABLE 9

| C series | Composition | Crystal Phase | Space Group | Diffraction Peak L Plane Index | Diffraction Peak L 2θ/deg | Diffraction Peak H Plane Index | Diffraction Peak H 2θ/deg | Intensity Ratio of Diffraction Peaks $I_L/I_H$ |
|---|---|---|---|---|---|---|---|---|
| Example c-1 | $Li_2(Sr_{0.75}K_{0.25})Ti_{5.75}Nb_{0.25}O_{14}$ | Orthorhombic | Cmca | (021) | 18.26 | (220) | 19.24 | 1.11 |
| Example c-2 | $Li_2(Sr_{0.50}K_{0.50})Ti_{5.50}Nb_{0.50}O_{14}$ | Orthorhombic | Cmca | (021) | 18.19 | (220) | 19.20 | 1.58 |
| Example c-3 | $Li_2(Sr_{0.25}K_{0.75})Ti_{5.25}Nb_{0.75}O_{14}$ | Orthorhombic | Fmmm | (111) | 18.14 | (202) | 19.15 | 2.61 |

TABLE 9-continued

| C series | Composition | Crystal Phase | Space Group | Diffraction Peak L Plane Index | 2θ/deg | Diffraction Peak H Plane Index | 2θ/deg | Intensity Ratio of Diffraction Peaks $I_L/I_H$ |
|---|---|---|---|---|---|---|---|---|
| Example c-4 | $Li_2(Sr_{0.25}Cs_{0.75})Ti_{5.25}Nb_{0.75}O_{14}$ | Orthorhombic | Fmmm | (111) | 18.12 | (202) | 19.14 | 2.89 |
| Example C-5 | $Li_2(Sr_{0.50}K_{0.25}Na_{0.25})Ti_{5.50}Nb_{0.50}O_{14}$ | Orthorhombic | Fmmm | (111) | 18.20 | (202) | 19.21 | 2.31 |
| Example C-6 | $Li_2(Sr_{0.50}Cs_{0.25}Na_{0.25})Ti_{5.50}Nb_{0.50}O_{14}$ | Orthorhombic | Fmmm | (111) | 18.18 | (202) | 19.19 | 1.85 |
| Example c-7 | $Li_2(Sr_{0.50}Cs_{0.25}K_{0.25})Ti_{5.50}Nb_{0.50}O_{14}$ | Orthorhombic | Fmmm | (111) | 18.26 | (202) | 19.25 | 1.95 |

Example D

In Examples D-1 to D-16, products of Example D-1 to D-16 were obtained in the same manner as in Examples A-1 to A-12 except that, in order to obtain products having target compositions shown in the following Table 10, starting materials shown in Table 10 were used. The molar ratios of the starting materials were set to ratios shown in the following Table 10.

TABLE 10

| D series | Target Composition | Li Source/Amount | M1 Source/Amount | M2 Source/Amount | Ti Source/Amount | M3 Source/Amount |
|---|---|---|---|---|---|---|
| Example D-1 | $Li_{2.2}(Sr_{0.9}Na_{0.1})Ti_{5.9}Al_{0.1}O_{14}$ | $Li_2CO_3/1.13$ | $SrCO_3/0.90$ | $Na_2CO_3/0.05$ | $TiO_2/5.90$ | $Al_2O_3/0.05$ |
| Example D-2 | $Li_{2.2}(Sr_{0.9}Na_{0.1})Ti_{5.9}Fe_{0.1}O_{14}$ | $Li_2CO_3/1.13$ | $SrCO_3/0.90$ | $Na_2CO_3/0.05$ | $TiO_2/5.90$ | $Fe_2O_3/0.05$ |
| Example D-3 | $Li_{2.75}(Sr_{0.25}Na_{0.75})Ti_5Zr_1O_{14}$ | $Li_2CO_3/1.42$ | $SrCO_3/0.25$ | $Na_2CO_3/0.375$ | $TiO_2/5.00$ | $ZrO_2/1.00$ |
| Example D-4 | $Li_{2.25}(Sr_{0.75}Na_{0.25})Ti_5Sn_1O_{14}$ | $Li_2CO_3/1.16$ | $SrCO_3/0.75$ | $Na_2CO_3/0.125$ | $TiO_2/5.00$ | $SnO_2/1.00$ |
| Example D-5 | $Li_{2.50}(Sr_{0.50}Na_{0.50})Ti_5Sn_1O_{14}$ | $Li_2CO_3/1.29$ | $SrCO_3/0.50$ | $Na_2CO_3/0.25$ | $TiO_2/5.00$ | $SnO_2/1.00$ |
| Example D-6 | $Li_{2.75}(Sr_{0.25}Na_{0.75})Ti_1Sn_5O_{14}$ | $Li_2CO_3/1.42$ | $SrCO_3/0.25$ | $Na_2CO_3/0.375$ | $TiO_2/1.00$ | $SnO_2/5.00$ |
| Example D-7 | $Li_2(Sr_{0.25}Na_{0.75})Ti_4Sn_{1.25}Nb_{0.75}O_{14}$ | $Li_2CO_3/1.03$ | $SrCO_3/0.25$ | $Na_2CO_3/0.375$ | $TiO_2/4.00$ | $SnO_2/1.25$ $Nb_2O_5/0.375$ |
| Example D-8 | $Li_2(Sr_{0.75}Na_{0.25})Ti_{5.75}V_{0.25}O_{14}$ | $Li_2CO_3/1.03$ | $SrCO_3/0.75$ | $Na_2CO_3/0.125$ | $TiO_2/5.75$ | $V_2O_5/0.125$ |
| Example D-9 | $Li_2(Sr_{0.5}Na_{0.5})Ti_{5.5}V_{0.5}O_{14}$ | $Li_2CO_3/1.03$ | $SrCO_3/0.50$ | $Na_2CO_3/0.25$ | $TiO_2/5.50$ | $V_2O_5/0.25$ |
| Example D-10 | $Li_2(Sr_{0.25}Na_{0.75})Ti_{5.25}V_{0.75}O_{14}$ | $Li_2CO_3/1.03$ | $SrCO_3/0.25$ | $Na_2CO_3/0.375$ | $TiO_2/5.25$ | $V_2O_5/0.75$ |
| Example D-11 | $Li_2(Sr_{0.25}Na_{0.75})Ti_{5.25}Ta_{0.75}O_{14}$ | $Li_2CO_3/1.03$ | $SrCO_3/0.25$ | $Na_2CO_3/0.375$ | $TiO_2/5.25$ | $Ta_2O_5/0.75$ |
| Example D-12 | $Li_2(Sr_{0.25}Na_{0.75})Ti_{5.25}Nb_{0.74}Ta_{0.01}O_{14}$ | $Li_2CO_3/1.03$ | $SrCO_3/0.25$ | $Na_2CO_3/0.375$ | $TiO_2/5.25$ | $Nb_2O_5/0.37$ $Ta_2O_5/0.005$ |
| Example D-13 | $Li_2(Sr_{0.25}Na_{0.75})Ti_{5.25}Nb_{0.70}Ta_{0.05}O_{14}$ | $Li_2CO_3/1.03$ | $SrCO_3/0.25$ | $Na_2CO_3/0.375$ | $TiO_2/5.25$ | $Nb_2O_5/0.35$ $Ta_2O_5/0.025$ |
| Example D-14 | $Li_2(Sr_{0.25}Na_{0.75})Ti_{5.25}Nb_{0.40}Ta_{0.35}O_{14}$ | $Li_2CO_3/1.03$ | $SrCO_3/0.25$ | $Na_2CO_3/0.375$ | $TiO_2/5.25$ | $Nb_2O_5/0.40$ $Ta_2O_5/0.175$ |
| Example D-15 | $Li_2(Sr_{0.25}Na_{0.75})Ti_{5.625}Mo_{0.375}O_{14}$ | $Li_2CO_3/1.03$ | $SrCO_3/0.25$ | $Na_2CO_3/0.375$ | $TiO_2/5.625$ | $MoO_3/0.375$ |
| Example D-16 | $Li_{2.25}(Sr_{0.25}Na_{0.75})Ti_5Fe_{0.25}Nb_{0.75}O_{14}$ | $Li_2CO_3/1.16$ | $SrCO_3/0.25$ | $Na_2CO_3/0.375$ | $TiO_2/5.00$ | $Fe_2O_3/0.125$ $Nb_2O_5/0.375$ |

The products of Examples D-1 to D-16 were subjected to composition analysis and powder X-ray diffraction measurement in the same manner as in Example A series. The results are shown in the following Tables 11 and 12.

TABLE 11

| | | $Li_xM1_{1-y}M2_yTi_{6-z}M3_zO_{14}$ | | |
|---|---|---|---|---|
| D series | Composition | x | y | z |
| Example D-1 | $Li_{2.2}(Sr_{0.9}Na_{0.1})Ti_{5.9}Al_{0.1}O_{14}$ | 2.2 | 0.1 | 0.1 |
| Example D-2 | $Li_{2.2}(Sr_{0.9}Na_{0.1})Ti_{5.9}Fe_{0.1}O_{14}$ | 2.2 | 0.1 | 0.1 |
| Example D-3 | $Li_{2.75}(Sr_{0.25}Na_{0.75})Ti_5Zr_1O_{14}$ | 2.75 | 0.75 | 1.0 |
| Example D-4 | $Li_{2.75}(Sr_{0.25}Na_{0.75})Ti_5Sn_1O_{14}$ | 2.75 | 0.75 | 1.0 |
| Example D-5 | $Li_{2.25}(Sr_{0.75}Na_{0.25})Ti_5Sn_1O_{14}$ | 2.25 | 0.25 | 1.0 |
| Example D-6 | $Li_{2.75}(Sr_{0.25}Na_{0.75})Ti_1Sn_5O_{14}$ | 2.75 | 0.75 | 5.0 |
| Example D-7 | $Li_2(Sr_{0.25}Na_{0.75})Ti_4Sn_{1.25}Nb_{0.75}O_{14}$ | 2.0 | 0.75 | 2.0 |
| Example D-8 | $Li_2(Sr_{0.75}Na_{0.25})Ti_{5.75}V_{0.25}O_{14}$ | 2.0 | 0.25 | 0.25 |
| Example D-9 | $Li_2(Sr_{0.5}Na_{0.5})Ti_{5.5}V_{0.5}O_{14}$ | 2.0 | 0.5 | 0.5 |
| Example D-10 | $Li_2(Sr_{0.25}Na_{0.75})Ti_{5.25}V_{0.75}O_{14}$ | 2.0 | 0.75 | 0.75 |
| Example D-11 | $Li_2(Sr_{0.25}Na_{0.75})Ti_{5.25}Ta_{0.75}O_{14}$ | 2.0 | 0.75 | 0.75 |
| Example D-12 | $Li_2(Sr_{0.25}Na_{0.75})Ti_{5.25}Nb_{0.74}Ta_{0.01}O_{14}$ | 2.0 | 0.75 | 0.75 |
| Example D-13 | $Li_2(Sr_{0.25}Na_{0.75})Ti_{5.25}Nb_{0.70}Ta_{0.05}O_{14}$ | 2.0 | 0.75 | 0.75 |
| Example D-14 | $Li_2(Sr_{0.25}Na_{0.75})Ti_{5.25}Nb_{0.40}Ta_{0.35}O_{14}$ | 2.0 | 0.75 | 0.75 |
| Example D-15 | $Li_2(Sr_{0.25}Na_{0.75})Ti_{5.625}Mo_{0.375}O_{14}$ | 2.0 | 0.75 | 0.375 |
| Example D-16 | $Li_{2.25}(Sr_{0.25}Na_{0.75})Ti_5Fe_{0.25}Nb_{0.75}O_{14}$ | 2.25 | 0.75 | 1.0 |

TABLE 12

| D series | Composition | Crystal Phase | Space Group | Diffraction Peak L Plane Index | Diffraction Peak L 2θ/deg | Diffraction Peak H Plane Index | Diffraction Peak H 2θ/deg | Intensity Ratio of Diffraction Peaks $I_L/I_H$ |
|---|---|---|---|---|---|---|---|---|
| Example D-1 | $Li_{2.2}(Sr_{0.9}Na_{0.1})Ti_{5.9}Al_{0.1}O_{14}$ | Orthorhombic | Cmca | (112) | 18.28 | (220) | 19.28 | 0.68 |
| Example D-2 | $Li_{2.2}(Sr_{0.9}Na_{0.1})Ti_{5.9}Fe_{0.1}O_{14}$ | Orthorhombic | Cmca | (112) | 18.31 | (220) | 19.32 | 0.61 |
| Example D-3 | $Li_{2.75}(Sr_{0.25}Na_{0.75})Ti_5Zr_1O_{14}$ | Orthorhombic | Fmmm | (111) | 18.22 | (202) | 19.23 | 0.69 |
| Example D-4 | $Li_{2.25}(Sr_{0.75}Na_{0.25})Ti_5Sn_1O_{14}$ | Orthorhombic | Cmca | (112) | 18.27 | (220) | 19.27 | 0.66 |
| Example D-5 | $Li_{2.50}(Sr_{0.50}Na_{0.50})Ti_5Sn_1O_{14}$ | Orthorhombic | Cmca | (112) | 18.21 | (220) | 19.19 | 1.46 |
| Example D-6 | $Li_{2.75}(Sr_{0.25}Na_{0.75})Ti_1Sn_5O_{14}$ | Orthorhombic | Fmmm | (111) | 18.14 | (202) | 19.11 | 3.00 |
| Example D-7 | $Li_2(Sr_{0.25}Na_{0.75})Ti_4Sn_{1.25}Nb_{0.75}O_{14}$ | Orthorhombic | Fmmm | (111) | 18.18 | (220) | 19.19 | 2.89 |
| Example D-8 | $Li_2(Sr_{0.75}Na_{0.25})Ti_{5.75}V_{0.25}O_{14}$ | Orthorhombic | Cmca | (112) | 18.24 | (220) | 19.24 | 0.65 |
| Example D-9 | $Li_2(Sr_{0.5}Na_{0.5})Ti_{5.5}V_{0.5}O_{14}$ | Orthorhombic | Cmca | (112) | 18.20 | (220) | 19.21 | 1.23 |
| Example D-10 | $Li_2(Sr_{0.25}Na_{0.75})Ti_{5.25}V_{0.75}O_{14}$ | Orthorhombic | Fmmm | (111) | 18.16 | (202) | 19.18 | 1.78 |
| Example D-11 | $Li_2(Sr_{0.25}Na_{0.75})Ti_{5.25}Ta_{0.75}O_{14}$ | Orthorhombic | Fmmm | (111) | 18.16 | (202) | 19.15 | 2.22 |
| Example D-12 | $Li_2(Sr_{0.25}Na_{0.75})Ti_{5.25}Nb_{0.74}Ta_{0.01}O_{14}$ | Orthorhombic | Fmmm | (111) | 18.16 | (202) | 19.15 | 2.21 |
| Example D-13 | $Li_2(Sr_{0.25}Na_{0.75})Ti_{5.25}Nb_{0.70}Ta_{0.05}O_{14}$ | Orthorhombic | Fmmm | (111) | 18.16 | (202) | 19.15 | 2.23 |
| Example D-14 | $Li_2(Sr_{0.25}Na_{0.75})Ti_{5.25}Nb_{0.40}Ta_{0.35}O_{14}$ | Orthorhombic | Fmmm | (111) | 18.17 | (202) | 19.16 | 2.25 |
| Example D-15 | $Li_2(Sr_{0.25}Na_{0.75})Ti_{5.625}Mo_{0.375}O_{14}$ | Orthorhombic | Fmmm | (111) | 18.18 | (202) | 19.17 | 2.50 |
| Example D-16 | $Li_{2.25}(Sr_{0.25}Na_{0.75})Ti_5Fe_{0.25}Nb_{0.75}O_{14}$ | Orthorhombic | Fmmm | (111) | 18.16 | (202) | 19.17 | 2.22 |

(Electrochemical Measurement)

Each of the products obtained in the above-mentioned Examples was subjected to electrochemical measurement according to the following procedure. Hereinafter, an example using the product of Example A-1 will be described, but each of the products of other Examples were also subjected to electrochemical measurement in the same manner as in the product of Example A-1.

First, the particles of the product of Example A-1 were ground so that the average particle size of particles of the product was 5 μm or less, to obtain a ground product. Next, acetylene black as a conductive agent was mixed with the active material in the proportion of 10 parts by mass based on the active material to obtain a mixture. Next, the mixture was dispersed in NMP (N-methyl-2-pyrrolidone) to obtain dispersion liquid. Polyvinylidene fluoride (PVdF) as a binder was mixed with the dispersion liquid in the proportion of 10 parts by mass based on the product of Example A-1 to prepare electrode slurry. The slurry was applied using a blade to a current collector made of an aluminum foil. This was dried at 130° C. for 12 hours under vacuum, and then rolled so that the density of an electrode layer (excluding the current collector) was 2.2 g/cm³, to obtain an electrode.

Using this electrode, a metallic lithium foil as a counter electrode, and a nonaqueous electrolyte, an electrochemical measurement cell of Example A-1 was produced. As the nonaqueous electrolyte, used was a 1 M solution of lithium hexafluorophosphate ($LiPF_6$) dissolved in a mixed solvent of ethylene carbonate and diethyl carbonate (1:1 in volume ratio).

The electrochemical measurement cell of Example A-1 was subjected to a charge-and-discharge test at room temperature. The charge-and-discharge test was performed with a charge-and-discharge current value of 0.2 C (hourly discharge rate) in the potential range of 1.0 V to 3.0 V with reference to the metallic lithium electrode. The first absorption amount of Li in the test was defined as an initial charge capacity, and the release amount of Li was defined as an initial discharge capacity. At this time, a value obtained by dividing the initial discharge capacity by the initial charge capacity then multiplying by 100 (initial discharge capacity/initial charge capacity×100) was defined as an initial charge-and-discharge efficiency.

Next, in order to examine that the product of Example A-1 can be stably charged and discharged, the electrochemical measurement cell of Example A-1 was subjected to 50 cycles of charge and discharge. One cycle had one charge and one discharge. The charge and discharge were performed at room temperature in the potential range of 1.0 V to 3.0 V with reference to the metallic lithium electrode, at a current value of 1 C (hourly discharge rate).

In order to examine the discharge capacity retention ratio after the 50 cycles, the electrochemical measurement cell of Example A-1 was charged and discharged again at 0.2 C (hourly discharge rate), and the capacity retention ratio was calculated with the initial discharge capacity defined as 100%.

The discharge capacity at 0.2 C and discharge capacity at 10.0 C of the electrochemical measurement cell of Example A-1 were measured. The discharge rate was calculated as the barometer of the rate performance by dividing the discharge capacity at 10.0 C obtained by the measurement by the capacity at 0.2 C similarly obtained by the measurement.

[Charge-and-Discharge Curves]

Figure 13:
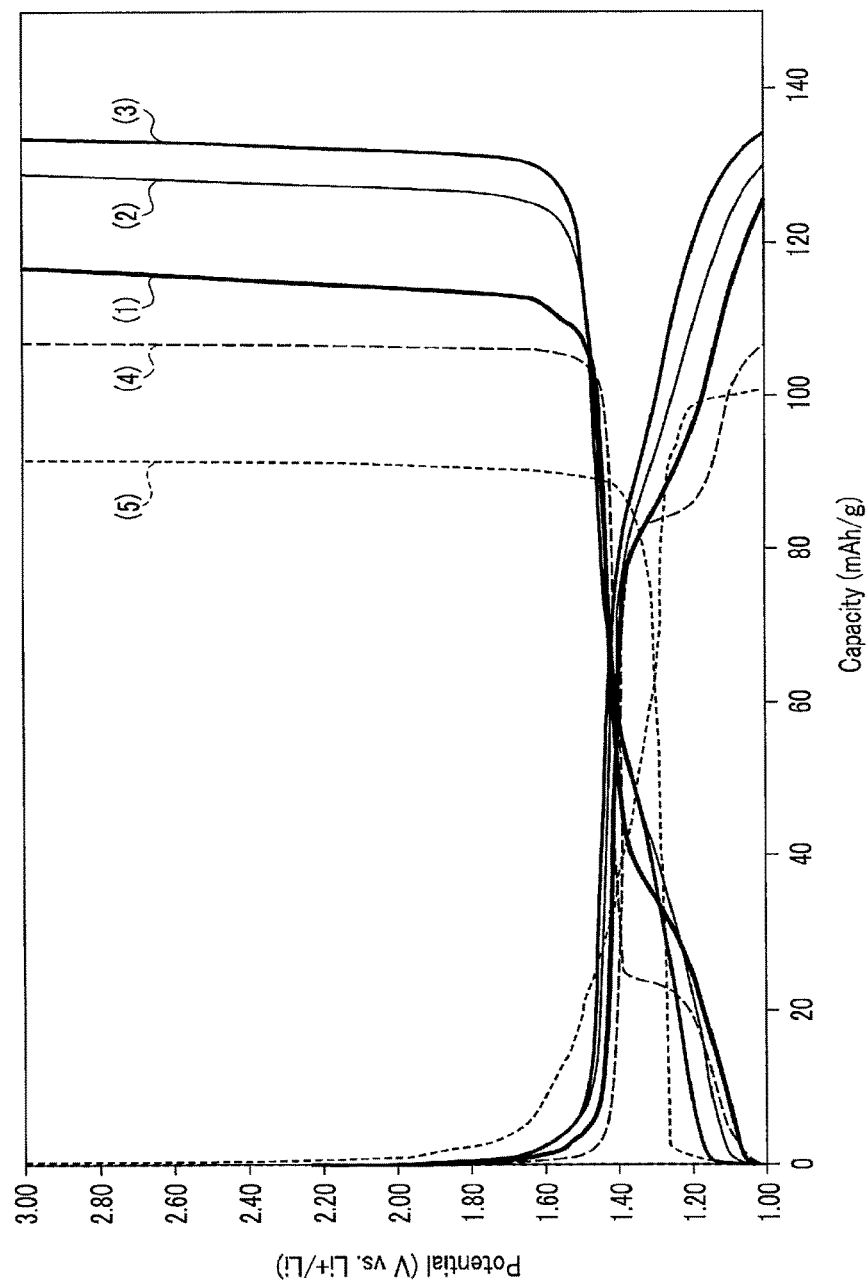
FIG. 13 shows charge-and-discharge curves of Examples A-4 to A-6 and Comparative Examples A-1 and A-6.

FIG. 13 shows initial charge-and-discharge curves obtained in the electrochemical measurement cells of Examples A-4, A-5, and A-6 and the electrochemical measurement cells of Examples a-1 and a-6. In FIG. 13, the curve of a solid line having symbol (1) shows the potential change of the electrode including the orthorhombic oxide of Example A-4. The curve of a solid line having symbol (2) shows the potential change of the electrode including the orthorhombic oxide of Example A-5. Furthermore, the curve of a solid line having symbol (3) shows the potential change of the electrode including the orthorhombic oxide of Example A-6. The curve of a dotted line having symbol (4) shows the potential change of the electrode including the orthorhombic oxide of Example a-1. Furthermore, the curve of a dotted line having symbol (5) shows the potential change of the electrode including the orthorhombic oxide of Example a-6.

As apparent from FIG. 13, in the potential of the electrochemical measurement cell within the range of 1.0 V (vs. Li/Li$^+$) to 2.0 V (vs. Li/Li$^+$), which is the effective potential range of the negative electrode, the charge-and-discharge curves of Example a-1 had potential flat parts near 1.4 V (vs. Li/Li$^+$) and near 1.2 V (vs. Li/Li$^+$), and were stepwise charge-and-discharge curves. The product of Example a-1 showing such charge-and-discharge curves is practically not preferable. It is found that in the product of Example a-6, the charge-and-discharge curves each have a wide potential flat portion, and therefore, it is difficult to grasp a correlation between a capacity and a potential, and reversible capacity (Li release capacity) is less than 100 mAh/g, which is low.

On the other hand, as shown in FIG. 13, each of the charge-and-discharge curves of Examples A-4, A-5, and A-6 has a continuous potential gradient within the range of 1.0 V (vs. Li/Li$^+$) to 1.6 V (vs. Li/Li$^+$). In a battery capable of being charged, the charging state (remaining capacity) can be estimated by determining the battery potential. That is, the continuous potential gradients which can be exhibited by the products of Examples A-4 to A-6 are useful for controlling the charge and discharge of the battery. Furthermore, as apparent from FIG. 13, the electrode capacitances of Examples A-4 to A-6 are higher than those of Examples a-1 and a-6. Therefore, the products of Examples A-4 to A-6 can provide a battery having a high energy density.

Although not shown in the drawings, the initial charge-and-discharge curves in each of the electrochemical measurement cells of Examples A-1 to A-3, A-7 to A-15, B-1 to B-11, Examples c-1 to c-4, Examples C-5 and C-6, Example c-7, and Examples D-1 to D-16 had less stepwise charge-and-discharge curve portions in the potential curves of the electrode, in comparison to Example a-1, in the battery voltage of the electrochemical measurement cell which was within the range of 1.0 V (vs. Li/Li$^+$) to 2.0 V (vs. Li/Li$^+$), and had a continuous potential gradient, as in Examples A-4 to A-6. Furthermore, electrode capacitances of these Examples were also higher than those of Examples a-1 and a-6.

Tables 13 to 16 show the initial discharge capacity, initial charge-and-discharge efficiency, 10 C/0.2 C discharge capacity ratio, capacity retention ratio after 50 cycles, electrode potential in a half charge state (when a full charge was defined as 100%, 50% state of charge=SOC 50%), and capacity proportion of a potential stepwise portion obtained by dividing the discharge capacity of the potential stepwise portion at a 1.2 V (vs. Li/Li$^+$) by the total discharge capacity, of each of the electrochemical measurement cells in Example A series to D series, and Examples a-1 to a-7. The less the capacity proportion of the potential stepwise portion, practical adverse effect caused by the potential stepwise can be estimated to be low. Since for Example a-7, a monoclinic structure different from an orthorhombic structure had been obtained, the electrode potential in a half charge state was 1.54 V, and a low potential as the negative electrode could not be obtained.

TABLE 13

| A series | Composition | Initial Discharge Capacity (mAh/g) | Initial Charge-and-Discharge Efficiency (%) | 10 C/0.2 C Discharge Capacity Ratio | Capacity Retention Ratio after 50 Cycles (%) | Potential in SOC50% (V vs. Li$^+$/Li) | Capacity Proportion of Potential Stepwise Portion (%) |
|---|---|---|---|---|---|---|---|
| Example a-1 | Li$_2$SrTi$_6$O$_{14}$ | 106.8 | 92.1 | 89.3 | 89.5 | 1.43 | 23.5 |
| Example a-2 | Li$_2$MgTi$_6$O$_{14}$ | 96.1 | 91.8 | 86.5 | 87.3 | 1.42 | 22.1 |
| Example a-3 | Li$_2$BaTi$_{5.9}$Al$_{0.1}$O$_{14}$ | 107.3 | 90.9 | 84.3 | 90.1 | 1.43 | 22.5 |
| Example a-4 | Li$_2$(Sr$_{0.75}$Na$_{0.25}$)Ti$_6$O$_{14}$ | 73.6 | 83.3 | 65.9 | 61.3 | 1.42 | 20.3 |
| Example a-5 | Li$_2$SrTi$_{5.25}$Nb$_{0.75}$O$_{14}$ | 60.8 | 78.5 | 68.2 | 28.3 | 1.43 | 0 |
| Example a-6 | Li$_2$Na$_2$Ti$_6$O$_{14}$ | 90.8 | 92.0 | 89.8 | 90.5 | 1.28 | 0 |
| Example a-7 | Ti$_2$Nb$_4$O$_{14}$(TiNb$_2$O$_7$) | 261.3 | 92.3 | 88.3 | 89.8 | 1.54 | 0 |
| Example A-1 | Li$_2$(Sr$_{0.99}$Na$_{0.01}$)Ti$_{5.99}$Nb$_{0.01}$O$_{14}$ | 110.5 | 92.8 | 90.1 | 92.5 | 1.42 | 2.5 |
| Example A-2 | Li$_2$(Sr$_{0.95}$Na$_{0.05}$)Ti$_{5.95}$Nb$_{0.05}$O$_{14}$ | 112.3 | 92.5 | 90.5 | 93.0 | 1.42 | 0 |
| Example A-3 | Li$_2$(Sr$_{0.90}$Na$_{0.10}$)Ti$_{5.90}$Nb$_{0.10}$O$_{14}$ | 114.8 | 92.2 | 90.8 | 92.8 | 1.42 | 0 |
| Example A-4 | Li$_2$(Sr$_{0.75}$Na$_{0.25}$)Ti$_{5.75}$Nb$_{0.25}$O$_{14}$ | 116.7 | 92.3 | 90.7 | 93.0 | 1.42 | 0 |
| Example A-5 | Li$_2$(Sr$_{0.50}$Na$_{0.50}$)Ti$_{5.50}$Nb$_{0.50}$O$_{14}$ | 128.7 | 93.3 | 93.7 | 92.6 | 1.42 | 0 |
| Example A-6 | Li$_2$(Sr$_{0.25}$Na$_{0.75}$)Ti$_{5.25}$Nb$_{0.75}$O$_{14}$ | 133.4 | 93.5 | 93.8 | 93.6 | 1.42 | 0 |
| Example A-7 | Li$_2$(Sr$_{0.10}$Na$_{0.90}$)Ti$_{5.10}$Nb$_{0.90}$O$_{14}$ | 130.5 | 93.1 | 92.3 | 93.3 | 1.41 | 0 |
| Example A-8 | Li$_2$(Sr$_{0.05}$Na$_{0.95}$)Ti$_{5.05}$Nb$_{0.95}$O$_{14}$ | 127.9 | 92.9 | 92.5 | 93.5 | 1.42 | 0 |
| Example A-9 | Li$_2$(Sr$_{0.01}$Na$_{0.99}$)Ti$_{5.01}$Nb$_{0.99}$O$_{14}$ | 126.3 | 92.8 | 93.1 | 94.2 | 1.42 | 0 |
| Example A-10 | Li$_{2.2}$(Sr$_{0.25}$Na$_{0.75}$)Ti$_{5.25}$Nb$_{0.75}$O$_{14}$ | 135.1 | 94.2 | 93.3 | 93.5 | 1.42 | 0 |
| Example A-11 | Li$_3$(Sr$_{0.25}$Na$_{0.75}$)Ti$_{5.25}$Nb$_{0.75}$O$_{14}$ | 120.1 | 93.8 | 92.2 | 94.3 | 1.42 | 0 |
| Example A-12 | Li$_6$(Sr$_{0.25}$Na$_{0.75}$)Ti$_{5.25}$Nb$_{0.75}$O$_{14}$ | 109.0 | 92.3 | 90.6 | 93.9 | 1.42 | 0 |
| Example A-13 | Li$_2$(Sr$_{0.25}$Na$_{0.75}$)Ti$_{5.25}$Nb$_{0.75}$O$_{13.5}$ | 132.3 | 93.9 | 90.8 | 92.9 | 1.42 | 0 |
| Example A-14 | Li$_2$(Sr$_{0.25}$Na$_{0.75}$)Ti$_{5.25}$Nb$_{0.75}$O$_{14}$ | 134.8 | 92.9 | 95.9 | 94.8 | 1.42 | 0 |
| Example A-15 | Li$_2$(Sr$_{0.25}$Na$_{0.75}$)Ti$_{5.25}$Nb$_{0.75}$O$_{14}$ | 131.5 | 94.0 | 94.3 | 94.5 | 1.42 | 0 |

TABLE 14

| B series | Composition | Initial Discharge Capacity (mAh/g) | Initial Charge-and-Discharge Efficiency (%) | 10 C/0.2 C Discharge Capacity Ratio | Capacity Retention Ratio after 50 Cycles (%) | Potential in SOC50% (V vs. Li$^+$/Li) | Capacity Proportion of Potential Stepwise Portion (%) |
|---|---|---|---|---|---|---|---|
| Example B-1 | Li$_2$(Ba$_{0.75}$Na$_{0.25}$)Ti$_{5.75}$Nb$_{0.25}$O$_{14}$ | 112.8 | 92.3 | 89.9 | 91.5 | 1.43 | 0 |
| Example B-2 | Li$_2$(Ba$_{0.50}$Na$_{0.50}$)Ti$_{5.50}$Nb$_{0.50}$O$_{14}$ | 123.3 | 93.0 | 93.5 | 93.3 | 1.43 | 0 |
| Example B-3 | Li$_2$(Ba$_{0.25}$Na$_{0.75}$)Ti$_{5.25}$Nb$_{0.75}$O$_{14}$ | 131.3 | 92.9 | 93.1 | 93.6 | 1.43 | 0 |
| Example B-4 | Li$_2$(Ca$_{0.25}$Na$_{0.75}$)Ti$_{5.25}$Nb$_{0.75}$O$_{14}$ | 128.2 | 92.6 | 92.2 | 92.5 | 1.43 | 0 |
| Example B-5 | Li$_2$(Mg$_{0.25}$Na$_{0.75}$)Ti$_{5.25}$Nb$_{0.75}$O$_{14}$ | 121.5 | 92.5 | 91.9 | 93.0 | 1.43 | 0 |
| Example B-6 | Li$_2$(Sr$_{0.25}$Ba$_{0.25}$Na$_{0.50}$)Ti$_{5.50}$Nb$_{0.50}$O$_{14}$ | 118.5 | 92.1 | 92.7 | 91.6 | 1.43 | 0 |
| Example B-7 | Li$_2$(Sr$_{0.25}$Ca$_{0.25}$Na$_{0.50}$)Ti$_{5.50}$Nb$_{0.50}$O$_{14}$ | 116.5 | 92.9 | 91.1 | 92.2 | 1.43 | 0 |
| Example B-8 | Li$_2$(Sr$_{0.25}$Mg$_{0.25}$Na$_{0.50}$)Ti$_{5.50}$Nb$_{0.50}$O$_{14}$ | 119.3 | 92.4 | 90.8 | 92.0 | 1.43 | 0 |

TABLE 14-continued

| B series | Composition | Initial Discharge Capacity (mAh/g) | Initial Charge-and-Discharge Efficiency (%) | 10 C/0.2 C Discharge Capacity Ratio | Capacity Retention Ratio after 50 Cycles (%) | Potential in SOC50% (V vs. Li$^+$/Li) | Capacity Proportion of Potential Stepwise Portion (%) |
|---|---|---|---|---|---|---|---|
| Example B-9 | Li$_2$(Ba$_{0.25}$Ca$_{0.25}$Na$_{0.50}$)Ti$_{5.50}$Nb$_{0.50}$O$_{14}$ | 115.7 | 92.2 | 90.6 | 92.8 | 1.43 | 0 |
| Example B-10 | Li$_2$(Ba$_{0.25}$Mg$_{0.25}$Na$_{0.50}$)Ti$_{5.50}$Nb$_{0.50}$O$_{14}$ | 118.7 | 92.4 | 90.7 | 92.5 | 1.43 | 0 |
| Example B-11 | Li$_2$(Ca$_{0.25}$Mg$_{0.25}$Na$_{0.50}$)Ti$_{5.50}$Nb$_{0.50}$O$_{14}$ | 110.4 | 92.7 | 91.7 | 92.6 | 1.43 | 0 |

TABLE 15

| C series | Composition | Initial Discharge Capacity (mAh/g) | Initial Charge-and-Discharge efficiency (%) | 10 C/0.2 C Discharge Capacity Ratio | Capacity Retention Ratio after 50 Cycles (%) | Potential in SOC50% (V vs. Li$^+$/Li) | Capacity Proportion of Potential Stepwise Portion (%) |
|---|---|---|---|---|---|---|---|
| Example c-1 | Li$_2$(Sr$_{0.75}$K$_{0.25}$)Ti$_{5.75}$Nb$_{0.25}$O$_{14}$ | 114.4 | 92.5 | 91.1 | 92.8 | 1.43 | 0 |
| Example c-2 | Li$_2$(Sr$_{0.50}$K$_{0.50}$)Ti$_{5.25}$Nb$_{0.50}$O$_{14}$ | 122.4 | 93.1 | 92.7 | 92.1 | 1.43 | 0 |
| Example c-3 | Li$_2$(Sr$_{0.25}$K$_{0.75}$)Ti$_{5.25}$Nb$_{0.75}$O$_{14}$ | 130.8 | 93.2 | 93.1 | 92.4 | 1.43 | 0 |
| Example c-4 | Li$_2$(Sr$_{0.25}$Cs$_{0.75}$)Ti$_{5.25}$Nb$_{0.75}$O$_{14}$ | 132.2 | 92.8 | 92.8 | 93.5 | 1.43 | 0 |
| Example C-5 | Li$_2$(Sr$_{0.50}$K$_{0.25}$Na$_{0.25}$)Ti$_{5.50}$Nb$_{0.50}$O$_{14}$ | 118.5 | 93.0 | 91.7 | 92.8 | 1.43 | 0 |
| Example C-6 | Li$_2$(Sr$_{0.50}$Cs$_{0.25}$Na$_{0.25}$)Ti$_{5.50}$Nb$_{0.50}$O$_{14}$ | 125.3 | 92.7 | 93.0 | 92.4 | 1.43 | 0 |
| Example c-7 | Li$_2$(Sr$_{0.50}$Cs$_{0.25}$K$_{0.25}$)Ti$_{5.50}$Nb$_{0.50}$O$_{14}$ | 121.5 | 92.9 | 92.1 | 92.4 | 1.43 | 0 |

TABLE 16

| D series | Composition | Initial Discharge Capacity (mAh/g) | Initial Charge-and-Discharge efficiency (%) | 10 C/0.2 C Discharge Capacity Ratio | Capacity Retention Ratio after 50 Cycles (%) | Potential in SOC50% (V vs. Li$^+$/Li) | Capacity Proportion of Potential Stepwise Portion (%) |
|---|---|---|---|---|---|---|---|
| Example D-1 | Li$_{2.2}$(Sr$_{0.9}$Na$_{0.1}$)Ti$_{5.9}$Al$_{0.1}$O$_{14}$ | 110.8 | 92.9 | 90.3 | 92.1 | 1.43 | 18.2 |
| Example D-2 | Li$_{2.2}$(Sr$_{0.9}$Na$_{0.1}$)Ti$_{5.9}$Fe$_{0.1}$O$_{14}$ | 109.9 | 92.6 | 91.5 | 93.3 | 1.42 | 15.3 |
| Example D-3 | Li$_{2.75}$(Sr$_{0.25}$Na$_{0.75}$)Ti$_5$Zr$_1$O$_{14}$ | 111.2 | 92.8 | 92.7 | 92.3 | 1.42 | 10.3 |
| Example D-4 | Li$_{2.25}$(Sr$_{0.75}$Na$_{0.25}$)Ti$_5$Sn$_1$O$_{14}$ | 115.5 | 92.5 | 91.1 | 92.5 | 1.42 | 12.1 |
| Example D-5 | Li$_{2.50}$(Sr$_{0.50}$Na$_{0.50}$)Ti$_5$Sn$_1$O$_{14}$ | 118.1 | 93.1 | 92.2 | 91.8 | 1.42 | 8.6 |
| Example D-6 | Li$_{2.75}$(Sr$_{0.25}$Na$_{0.75}$)Ti$_1$Sn$_5$O$_{14}$ | 108.9 | 93.0 | 92.8 | 92.3 | 1.42 | 5.2 |
| Example D-7 | Li$_2$(Sr$_{0.25}$Na$_{0.75}$)Ti$_4$Sn$_{1.25}$Nb$_{0.75}$O$_{14}$ | 124.5 | 93.2 | 93.1 | 92.5 | 1.42 | 0 |
| Example D-8 | Li$_2$(Sr$_{0.75}$Na$_{0.25}$)Ti$_{5.75}$V$_{0.25}$O$_{14}$ | 116.3 | 92.4 | 91.5 | 92.0 | 1.42 | 9.8 |
| Example D-9 | Li$_2$(Sr$_{0.5}$Na$_{0.5}$)Ti$_{5.5}$V$_{0.5}$O$_{14}$ | 113.4 | 92.2 | 91.4 | 92.8 | 1.42 | 4.3 |
| Example D-10 | Li$_2$(Sr$_{0.25}$Na$_{0.75}$)Ti$_{5.25}$V$_{0.75}$O$_{14}$ | 120.7 | 92.5 | 92.7 | 92.0 | 1.42 | 2.3 |
| Example D-11 | Li$_2$(Sr$_{0.25}$Na$_{0.75}$)Ti$_{5.25}$Ta$_{0.75}$O$_{14}$ | 109.1 | 93.3 | 92.4 | 92.1 | 1.42 | 15.2 |
| Example D-12 | Li$_2$(Sr$_{0.25}$Na$_{0.75}$)Ti$_{5.25}$Nb$_{0.74}$Ta$_{0.01}$O$_{14}$ | 134.5 | 93.8 | 94.0 | 93.9 | 1.42 | 0 |
| Example D-13 | Li$_2$(Sr$_{0.25}$Na$_{0.75}$)Ti$_{5.25}$Nb$_{0.70}$Ta$_{0.05}$O$_{14}$ | 134.0 | 93.6 | 94.1 | 94.3 | 1.42 | 0 |
| Example D-14 | Li$_2$(Sr$_{0.25}$Na$_{0.75}$)Ti$_{5.25}$Nb$_{0.40}$Ta$_{0.35}$O$_{14}$ | 128.7 | 92.8 | 92.1 | 92.5 | 1.42 | 0 |
| Example D-15 | Li$_2$(Sr$_{0.25}$Na$_{0.75}$)Ti$_{5.625}$Mo$_{0.375}$O$_{14}$ | 120.3 | 91.8 | 94.8 | 93.6 | 1.42 | 5.1 |
| Example D-16 | Li$_{2.25}$(Sr$_{0.25}$Na$_{0.75}$)Ti$_5$Fe$_{0.25}$Nb$_{0.75}$O$_{14}$ | 133.9 | 92.2 | 93.7 | 93.8 | 1.42 | 0 |

Example E

In Example E, a nonaqueous electrolyte battery was produced according to the following procedure.

(Production of Negative Electrode)

First, particles of a product of Example A-5 were ground so that the average particle size was 5 μm or less to obtain a ground product. Next, acetylene black as a conductive agent was mixed with the product in the proportion of 6 parts by mass based on the product to obtain a mixture. Next, the mixture was dispersed in NMP (N-methyl-2-pyrrolidone) to obtain dispersion liquid. Polyvinylidene fluoride (PVdF) as a binder was mixed with the dispersion liquid in the proportion of 10 parts by mass based on the product of Example A-5 to prepare a negative electrode slurry. The slurry was applied using a blade to a current collector made of an aluminum foil. This was dried at 130° C. for 12 hours under vacuum, and then rolled so that the density of an electrode layer (excluding the current collector) was 2.2 g/cm³, to obtain a negative electrode.

(Production of Positive Electrode)

Acetylene black as a conductive auxiliary agent was mixed with commercially available lithium iron phosphate (LiFePO$_4$) in the proportion of 5 parts by weight to obtain a mixture. Next, the mixture was dispersed in NMP to obtain a dispersion liquid. PVdF as a binder was mixed with the dispersion liquid in the proportion of 5 parts by weight based on lithium iron phosphate to prepare a positive electrode slurry. The slurry was applied using a blade to a current collector made of an aluminum foil. This was dried at 130° C. for 12 hours under vacuum, and then rolled so that the density of an electrode layer (excluding the current collector) was 2.1 g/cm³, to obtain a positive electrode.

(Production of Electrode Group)

The positive and negative electrodes produced as described above were stacked with a polyethylene separator sandwiched therebetween to obtain a stack. Then, the stack was wound and pressed to obtain a flat-shaped wound electrode group. A positive electrode terminal and a negative electrode terminal were connected to the electrode group.

(Preparation of Nonaqueous Electrolyte)

As a mixed solvent, a mixed solvent of ethylene carbonate and diethyl carbonate (1:1 in volume ratio) was provided. Lithium hexafluorophosphate ($LiPF_6$) was dissolved in the solvent in the concentration of 1 M. Thus, a nonaqueous electrolyte was prepared.

(Assembly of Nonaqueous Electrolyte Battery)

A nonaqueous electrolyte battery of Example E was produced using the electrode group and the nonaqueous electrolyte which were produced as described above.

(Charge-and-Discharge Test)

The nonaqueous electrolyte battery of Example E was subjected to a charge-and-discharge test at room temperature. The charge-and-discharge test was performed in a voltage range of 1.5 V to 2.6 V in battery voltage and at a charge-and-discharge current value of 0.2 C (hourly discharge rate).

FIG. 14 shows the charge-and-discharge curves of the nonaqueous electrolyte battery of Example E. As apparent from FIG. 14, in the nonaqueous electrolyte battery of Example E, a voltage changed smoothly within a voltage range of 2.3 V to 1.8 V. That is, a nonaqueous electrolyte battery in which a voltage smoothly changes within a voltage range of 2.3 V to 1.8 V was obtained by using the product of Example A-5. By connecting six of the nonaqueous electrolyte batteries in series, compared to the case where spinel lithium titanate ($Li_4Ti_5O_{12}$) is used for the negative electrode, an operating voltage range becomes a higher range, that is, 13.8 V to 10.8 V, and thereby a battery pack having a voltage compatible with a 12 V lead storage battery for automobiles can be constituted.

Example F

In Example F, a battery module of Example F was produced according to the following procedure.

First, five nonaqueous electrolyte batteries that are the same as that of Example E were produced according to the same procedure as that described in Example E.

Next, the produced five nonaqueous electrolyte batteries were electrically connected to each other in series. Thus, the battery module of Example F was produced.

(Charge-and-Discharge Test)

The battery module of Example F was subjected to a charge-and-discharge test at room temperature. The charge-and-discharge test was performed with a charge-and-discharge current value as 0.2 C (hourly discharge rate) within the voltage range of 7.5 V to 13.0 V in voltage of the battery module.

FIG. 15 shows the charge-and-discharge curve of the battery module of Example F. As apparent from FIG. 15, in the battery module of Example F, a voltage changed smoothly and continuously within a voltage range of 11.5 V to 9.0 V. That is, it was found that the battery module of Example F can be operated at 11.5 V to 9.0 V.

Thus, a battery module in which a voltage smoothly changes within the voltage range of 11.5 V to 9.0 V was obtained by using the nonaqueous electrolyte battery of Example E using the product of Example A-5. This operating voltage is slightly lower than that of a lead storage battery for automobiles. The battery module which can exhibit this operating voltage can, by using in parallel with the lead storage battery through a regulator circuit, protect the lead storage battery from an abrupt load subjected onto the lead storage battery and over-discharge during activation of a starter motor when starting an engine on cold land.

Example g

In Example g, a battery module of Example g was produced according to the following procedure.

First, six nonaqueous electrolyte batteries that are the same as that of Example E were produced according to the same procedure as that described in Example E.

Next, the produced six nonaqueous electrolyte batteries were electrically connected to each other in series. Thus, the battery module of Example g was produced.

(Charge-and-Discharge Test)

The battery module of Example g was subjected to a charge-and-discharge test at room temperature. The charge-and-discharge test was performed with a charge-and-discharge current value as 0.2 C (hourly discharge rate) within the voltage range of 9.0 V to 15.6 V in voltage of the battery module.

FIG. 16 shows the charge-and-discharge curve of the battery module of Example g. As apparent from FIG. 16, in the battery module of Example g, a voltage changed smoothly within a voltage range of 13.8 V to 10.8 V. That is, it was found that the battery module of Example g can be operated at 13.8 V to 10.8 V.

Thus, a battery module in which a voltage changes smoothly within the voltage range of 13.8 V to 10.8 V was obtained by using the nonaqueous electrolyte battery of Example E using the product of Example A-5. This operating voltage is slightly higher than that of a lead storage battery for automobiles. The battery module of Example G which can exhibit, as such, a higher operating voltage than that of the lead storage battery can, when used in parallel with the lead storage battery through a regulator circuit in a vehicle mounting an idling-stop system or a vehicle provided with a hybrid mechanism using a traveling motor, reduce a load to the lead storage battery when large current discharge or regeneration energy input is performed, and avoid deep charge-and-discharge to extend the life of the lead storage battery.

(Synthesis)

Example A2

Examples A2-1 to A2-13

In Example A2-1 to A2-13, products of Examples A2-1 to A2-13 were synthesized according to the following procedures. Target compositions of Examples A2-1 to A2-13 are shown in the following Table 17.

First, commercially available oxide and carbonate reagents shown in the following Table 17 were provided as starting materials so that molar ratios shown in Table 17 were satisfied and the total weight was 50 g. As a result of analyzing the vaporized amount of lithium ions during sintering in a preliminary experiment, since the vaporized amount corresponding to 3% in terms of amount of lithium carbonate was confirmed, lithium carbonate was provided in 3% excess relative to the target composition.

Next, the starting materials, provided as above, were mixed, and the mixture was put in an agate pod (a volume of 300 ml) for ball mill. Agate balls having diameters of 10 mm and 5 mm were put into the pod in a number ratio of 1:1, filling up to one third of the pod volume. After that, 50 ml of ethanol was added to the pod, and the mixture was wet-mixed at 120 rpm for 60 minutes to obtain a mixture. Since the starting materials are uniformly mixed by the wet-mixing, a target single phase of a crystal phase can be obtained.

Next, the thus obtained mixture was put in an electric furnace, and a heat treatment was performed by the following procedures.

First, pre-sintering was performed at a temperature of 650° C. for 6 hours in an air atmosphere. Next, a powder obtained by pre-sintering was taken out from the furnace, and the powder was reground and mixed. By performing in this manner in advance, pre-sintering to decompose the carbonates or the like in the materials then re-mixing, the raw material particles can cohere to each other in a main sintering, and as a result, particles which are uniform and have high crystallinity can be obtained.

The thus obtained mixture was subsequently subjected to a first-sintering at a temperature of 900° C. for 6 hours. After the sintering, the sintered powder was taken out from the furnace, and the sintered powder was re-mixed.

Subsequently, the re-mixed sintered powder was put in the furnace, and a second sintering was performed at a temperature of 900° C. for 6 hours in an air atmosphere. After that, the temperature in the electric furnace was kept at 400° C. for 2 hours, and then was quickly cooled to room temperature. Next, the sintered powder was taken out from the furnace, and the sintered powder was re-mixed. The powder obtained after the second sintering, i.e., as a result of sintering at a temperature of 900° C. for a total of 12 hours was used as each of products of Example A2-1 to A2-13.

Example A2-14>

In Example A2-14, a product of Example A2-14 was synthesized in the same manner as in Example A2-5 except that the sintering was performed in a reduction atmosphere while flowing nitrogen gas including 3% hydrogen through the electric furnace.

Examples a2-1 to a2-5

In Example a2-1, in order to show that an intensity ratio of the powder X-ray diffraction diagram varies depending on the synthesis condition, products of Examples a2-1a and a2-1b, whose target composition was compound $Li_2Na_2Ti_6O_{14}$, were synthesized under two different conditions. In Example a2-1a, a product of Example a2-1a was synthesized in the same manner as in Example A2-1 except that starting materials including no Mβ source, as shown in Table 17, were used, and the sintering was continuously performed at 1000° C. for 24 hours without considering the Li vaporization amount during the sintering. On the other hand, in Example a2-1b, a product of Example a2-1b was synthesized in the same manner as in Example A2-1 except that starting materials including no Mβ source as shown in Table 17 were used.

In Example a2-2, a product of Example a2-2 was synthesized in the same manner as in Example a2-1b except that amounts of lithium carbonate and sodium carbonate were changed to those described in Table 17.

In Example a2-3, a product of Example a2-3 was synthesized in the same manner as in Example a2-1b except that starting materials shown in Table 17 were used.

In Examples a2-4 and a2-5, products of Examples a2-4 and a2-5 were synthesized in the same manner as in Example A2-1 except that the target compositions were those described in Jpn. Pat. Appln. KOKAI Publication No. 2013-8493. The target compositions, the starting materials and the molar ratios were as described in the above Table 17.

(Examining of Composition of Product)

The compositions of the products of Examples A2-1 to A2-14 and the products of Examples a2-1 to a2-5 were analyzed according to the ICP method described above. The results are shown in Table 18 below.

As shown in Table 18, for the product of Example A2-14, a subscript of oxygen in the composition formula was 13.5. In the product of Example A2-14, accordingly, oxygen deficiency occurred slightly compared to Example A-25.

TABLE 17

| A2 series | Target Composition | Li Source/ Amount | Na Source/ Amount | Mα Source/ Amount | Ti Source/ Amount | Mβ Source/ Amount |
|---|---|---|---|---|---|---|
| Example a2-1a | $Li_2Na_2Ti_6O_{14}$ | $Li_2CO_3$/1.0 | $Na_2CO_3$/1.0 | — | $TiO_2$/6.0 | — |
| Example a2-1b | $Li_2Na_2Ti_6O_{14}$ | $Li_2CO_3$/1.0 | $Na_2CO_3$/1.0 | — | $TiO_2$/6.0 | — |
| Example a2-2 | $Li_{2.1}Na_{1.9}Ti_6O_{14}$ | $Li_2CO_3$/1.05 | $Na_2CO_3$/0.95 | — | $TiO_2$/6.0 | — |
| Example a2-3 | $Li_2Na_2Ti_{5.9}Nb_{0.1}O_{14}$ | $Li_2CO_3$/1.0 | $Na_2CO_3$/1.0 | — | $TiO_2$/5.9 | $Nb_2O_5$/0.05 |
| Example a2-4 | $Li_2MgTi_6O_{14}$ | $Li_2CO_3$/1.0 | — | MgO/1.0 | $TiO_2$/6.0 | — |
| Example a2-5 | $Li_2BaTi_{5.9}Al_{0.1}O_{14}$ | $Li_2CO_3$/1.0 | — | $BaCO_3$/1.0 | $TiO_2$/5.9 | $Al_2O_3$/0.05 |
| Example A2-1 | $Li_2Na_{1.99}Ti_{5.99}Nb_{0.01}O_{14}$ | $Li_2CO_3$/1.0 | $Na_2CO_3$/0.995 | — | $TiO_2$/5.99 | $Nb_2O_5$/0.005 |
| Example A2-2 | $Li_2Na_{1.95}Ti_{5.95}Nb_{0.05}O_{14}$ | $Li_2CO_3$/1.0 | $Na_2CO_3$/0.975 | — | $TiO_2$/5.95 | $Nb_2O_5$/0.01 |
| Example A2-3 | $Li_2Na_{1.9}Ti_{5.9}Nb_{0.1}O_{14}$ | $Li_2CO_3$/1.0 | $Na_2CO_3$/0.95 | — | $TiO_2$/5.9 | $Nb_2O_5$/0.05 |
| Example A2-4 | $Li_2Na_{1.75}Ti_{5.75}Nb_{0.25}O_{14}$ | $Li_2CO_3$/1.0 | $Na_2CO_3$/0.875 | — | $TiO_2$/5.75 | $Nb_2O_5$/0.125 |
| Example A2-5 | $Li_2Na_{1.5}Ti_{5.5}Nb_{0.5}O_{14}$ | $Li_2CO_3$/1.0 | $Na_2CO_3$/0.75 | — | $TiO_2$/5.50 | $Nb_2O_5$/0.25 |
| Example A2-6 | $Li_2Na_{1.25}Ti_{5.25}Nb_{0.75}O_{14}$ | $Li_2CO_3$/1.0 | $Na_2CO_3$/0.625 | — | $TiO_2$/5.25 | $Nb_2O_5$/0.375 |
| Example A2-7 | $Li_2Na_{1.1}Ti_{5.1}Nb_{0.9}O_{14}$ | $Li_2CO_3$/1.0 | $Na_2CO_3$/0.55 | — | $TiO_2$/5.10 | $Nb_2O_5$/0.45 |
| Example A2-8 | $Li_2Na_{1.05}Ti_{5.05}Nb_{0.95}O_{14}$ | $Li_2CO_3$/1.0 | $Na_2CO_3$/0.525 | — | $TiO_2$/5.05 | $Nb_2O_5$/0.475 |
| Example A2-9 | $Li_2Na_{1.01}Ti_{5.01}Nb_{0.99}O_{14}$ | $Li_2CO_3$/1.0 | $Na_2CO_3$/0.505 | — | $TiO_2$/5.01 | $Nb_2O_5$/0.495 |
| Example A2-10 | $Li_{2.1}Na_{1.99}Ti_{5.99}Nb_{0.01}O_{14}$ | $Li_2CO_3$/1.05 | $Na_2CO_3$/0.995 | — | $TiO_2$/5.99 | $Nb_2O_5$/0.005 |
| Example A2-11 | $Li_{2.5}Na_{1.5}Ti_{5.5}Nb_{0.5}O_{14}$ | $Li_2CO_3$/1.25 | $Na_2CO_3$/0.75 | — | $TiO_2$/5.50 | $Nb_2O_5$/0.25 |
| Example A2-12 | $Li_4Na_{1.5}Ti_{5.5}Nb_{0.5}O_{14}$ | $Li_2CO_3$/2.00 | $Na_2CO_3$/0.75 | — | $TiO_2$/5.50 | $Nb_2O_5$/0.25 |
| Example A2-13 | $Li_6Na_{1.5}Ti_{5.5}Nb_{0.5}O_{14}$ | $Li_2CO_3$/3.00 | $Na_2CO_3$/0.75 | — | $TiO_2$/5.50 | $Nb_2O_5$/0.25 |
| Example A2-14 | $Li_2Na_{1.5}Ti_{5.5}Nb_{0.5}O_{13.5}$ | $Li_2CO_3$/1.00 | $Na_2CO_3$/0.75 | — | $TiO_2$/5.50 | $Nb_2O_5$/0.25 |

TABLE 18

| A2 series | Composition | $Li_{2+w}Na_{2-x2}M\alpha_{y2}Ti_{6-z2}M\beta_{z2}O_{14}$ | | | |
|---|---|---|---|---|---|
| | | w | x2 | y2 | z2 |
| Example a2-1a | $Li_2Na_2Ti_6O_{14}$ | 0 | 0 | 0 | 0 |
| Example a2-1b | $Li_2Na_2Ti_6O_{14}$ | 0 | 0 | 0 | 0 |
| Example a2-2 | $Li_{2.1}Na_{1.9}Ti_6O_{14}$ | 0.1 | 0.1 | 0 | 0 |
| Example a2-3 | $Li_2Na_2Ti_{5.9}Nb_{0.1}O_{14}$ | 0 | 0 | 0 | 0.1 |
| Example a2-4 | $Li_2MgTi_6O_{14}$ | 0 | — | 0 | 0 |
| Example a2-5 | $Li_2BaTi_{5.9}Al_{0.1}O_{14}$ | 0 | — | 0 | 0.1 |
| Example A2-1 | $Li_2Na_{1.99}Ti_{5.99}Nb_{0.01}O_{14}$ | 0 | 0.01 | 0 | 0.01 |
| Example A2-2 | $Li_2Na_{1.95}Ti_{5.95}Nb_{0.05}O_{14}$ | 0 | 0.05 | 0 | 0.05 |
| Example A2-3 | $Li_2Na_{1.9}Ti_{5.9}Nb_{0.1}O_{14}$ | 0 | 0.1 | 0 | 0.1 |
| Example A2-4 | $Li_2Na_{1.75}Ti_{5.75}Nb_{0.25}O_{14}$ | 0 | 0.25 | 0 | 0.25 |
| Example A2-5 | $Li_2Na_{1.5}Ti_{5.5}Nb_{0.5}O_{14}$ | 0 | 0.5 | 0 | 0.5 |
| Example A2-6 | $Li_2Na_{1.25}Ti_{5.25}Nb_{0.75}O_{14}$ | 0 | 0.75 | 0 | 0.75 |
| Example A2-7 | $Li_2Na_{1.1}Ti_{5.1}Nb_{0.9}O_{14}$ | 0 | 0.9 | 0 | 0.9 |
| Example A2-8 | $Li_2Na_{1.05}Ti_{5.05}Nb_{0.95}O_{14}$ | 0 | 0.95 | 0 | 0.95 |
| Example A2-9 | $Li_2Na_{1.01}Ti_{5.01}Nb_{0.99}O_{14}$ | 0 | 0.99 | 0 | 0.99 |
| Example A2-10 | $Li_{2.1}Na_{1.99}Ti_{5.99}Nb_{0.01}O_{14}$ | 0.1 | 0.5 | 0 | 0.5 |
| Example A2-11 | $Li_{2.5}Na_{1.5}Ti_{5.5}Nb_{0.5}O_{14}$ | 0.5 | 0.5 | 0 | 0.5 |
| Example A2-12 | $Li_4Na_{1.5}Ti_{5.5}Nb_{0.5}O_{14}$ | 2.0 | 0.5 | 0 | 0.5 |
| Example A2-13 | $Li_6Na_{1.5}Ti_{5.5}Nb_{0.5}O_{14}$ | 4.0 | 0.5 | 0 | 0.5 |
| Example A2-14 | $Li_2Na_{1.5}Ti_{5.5}Nb_{0.5}O_{13.5}$ | 2.0 | 0.5 | 0 | 0.5 |

(Powder X-Ray Diffraction Measurement)

The products of Examples A2-1 to A2-14 and the products of Examples a2-1 to a2-5 were subjected to the powder X-ray diffraction measurement according to the procedure described above.

The following Table 19 shows a crystal plane index corresponding to a strongest diffraction peak L20 appearing in a range of 17°≤2θ≤18.5°; a value $2\theta_{L20}$ of 2θ of the diffraction peak L20; a crystal plane index corresponding to a strongest diffraction peak H20 appearing in a range of 18.5°<2θ≤19.5°; a value $2\theta_{H20}$ of 2θ of the diffraction peak H20; and an intensity ratio $I_L/I_H$ of these diffraction peaks, which were obtained from the results of the powder X-ray diffraction measurement of each product.

As apparent from the following Table 19, in Examples a2-1a and a2-1b, although the target compositions are the same, the obtained results of the intensity ratio $I_{L20}/I_{H20}$ of the diffraction peaks were different. In Example a2-1a, the sintering was performed at one time at 1000° C. for a long time without considering the vaporization amount of Li. On the other hand, in Example a2-1b, the synthesis was performed in the same manner as in Example A2-1 of the present application. It can be considered therefore that if the sintering condition or the feed amount of the lithium raw materials is different, the crystallite growing condition is also different.

On the other hand, as a result of analyzing the results of the powder X-ray diffraction according to the Rietveld method, it was found that the products obtained in Examples A-1 to A-14 were orthorhombic type compounds having the space group Fmmm symmetry shown in FIG. 3. Crystal phases and space groups of the products are shown below in Table 19 altogether.

TABLE 19

| A2 series | Composition | Crystal Phase | Space Group | Diffraction Peak L20 | | Diffraction Peak H20 | | Intensity Ratio of Diffraction Peaks $I_{L20}/I_{H20}$ |
|---|---|---|---|---|---|---|---|---|
| | | | | Plane Index | 2θ/deg | Plane Index | 2θ/deg | |
| Example a2-1a | $Li_2Na_2Ti_6O_{14}$ | Orthorhombic | Fmmm | (111) | 18.14 | (202) | 19.09 | 3.06 |
| Example a2-1b | $Li_2Na_2Ti_6O_{14}$ | Orthorhombic | Fmmm | (111) | 18.15 | (202) | 19.13 | 2.20 |
| Example a2-2 | $Li_{2.1}Na_{1.9}Ti_6O_{14}$ | Orthorhombic | Fmmm | (111) | 18.16 | (202) | 19.14 | 2.21 |
| Example a2-3 | $Li_2Na_2Ti_{5.9}Nb_{0.1}O_{14}$ | Orthorhombic | Fmmm | (111) | 18.16 | (202) | 19.14 | 2.23 |
| Example a2-4 | $Li_2MgTi_6O_{14}$ | Orthorhombic | Cmca | (021) | 18.35 | (220) | 19.34 | 0.52 |
| Example a2-5 | $Li_2BaTi_{5.9}Al_{0.1}O_{14}$ | Orthorhombic | Cmca | (021) | 17.58 | (220) | 19.28 | 0.43 |
| Example A2-1 | $Li_2Na_{1.99}Ti_{5.99}Nb_{0.01}O_{14}$ | Orthorhombic | Fmmm | (111) | 18.16 | (202) | 19.15 | 2.25 |
| Example A2-2 | $Li_2Na_{1.95}Ti_{5.95}Nb_{0.05}O_{14}$ | Orthorhombic | Fmmm | (111) | 18.17 | (202) | 19.16 | 2.29 |
| Example A2-3 | $Li_2Na_{1.9}Ti_{5.9}Nb_{0.1}O_{14}$ | Orthorhombic | Fmmm | (111) | 18.17 | (202) | 19.17 | 2.40 |
| Example A2-4 | $Li_2Na_{1.75}Ti_{5.75}Nb_{0.25}O_{14}$ | Orthorhombic | Fmmm | (111) | 18.17 | (202) | 19.16 | 2.43 |
| Example A2-5 | $Li_2Na_{1.5}Ti_{5.5}Nb_{0.5}O_{14}$ | Orthorhombic | Fmmm | (111) | 18.15 | (202) | 19.15 | 2.55 |
| Example A2-6 | $Li_2Na_{1.25}Ti_{5.25}Nb_{0.75}O_{14}$ | Orthorhombic | Fmmm | (111) | 18.10 | (202) | 19.11 | 2.75 |
| Example A2-7 | $Li_2Na_{1.1}Ti_{5.1}Nb_{0.9}O_{14}$ | Orthorhombic | Fmmm | (111) | 18.11 | (202) | 19.10 | 2.83 |
| Example A2-8 | $Li_2Na_{1.05}Ti_{5.05}Nb_{0.95}O_{14}$ | Orthorhombic | Fmmm | (111) | 18.12 | (202) | 19.12 | 3.21 |
| Example A2-9 | $Li_2Na_{1.01}Ti_{5.01}Nb_{0.99}O_{14}$ | Orthorhombic | Fmmm | (111) | 18.14 | (202) | 19.14 | 3.50 |
| Example A2-10 | $Li_{2.1}Na_{1.99}Ti_{5.99}Nb_{0.01}O_{14}$ | Orthorhombic | Fmmm | (111) | 18.13 | (202) | 19.14 | 2.27 |
| Example A2-11 | $Li_{2.5}Na_{1.5}Ti_{5.5}Nb_{0.5}O_{14}$ | Orthorhombic | Fmmm | (111) | 18.14 | (202) | 19.16 | 2.54 |
| Example A2-12 | $Li_4Na_{1.5}Ti_{5.5}Nb_{0.5}O_{14}$ | Orthorhombic | Fmmm | (111) | 18.13 | (202) | 19.12 | 2.35 |
| Example A2-13 | $Li_6Na_{1.5}Ti_{5.5}Nb_{0.5}O_{14}$ | Orthorhombic + Unknown Phase | Fmmm | (111) | 18.09 | (202) | 19.06 | 2.61 |
| Example A2-14 | $Li_2Na_{1.5}Ti_{5.5}Nb_{0.5}O_{13.5}$ | Orthorhombic | Fmmm | (111) | 18.15 | (202) | 19.14 | 2.59 |

Figure 17:
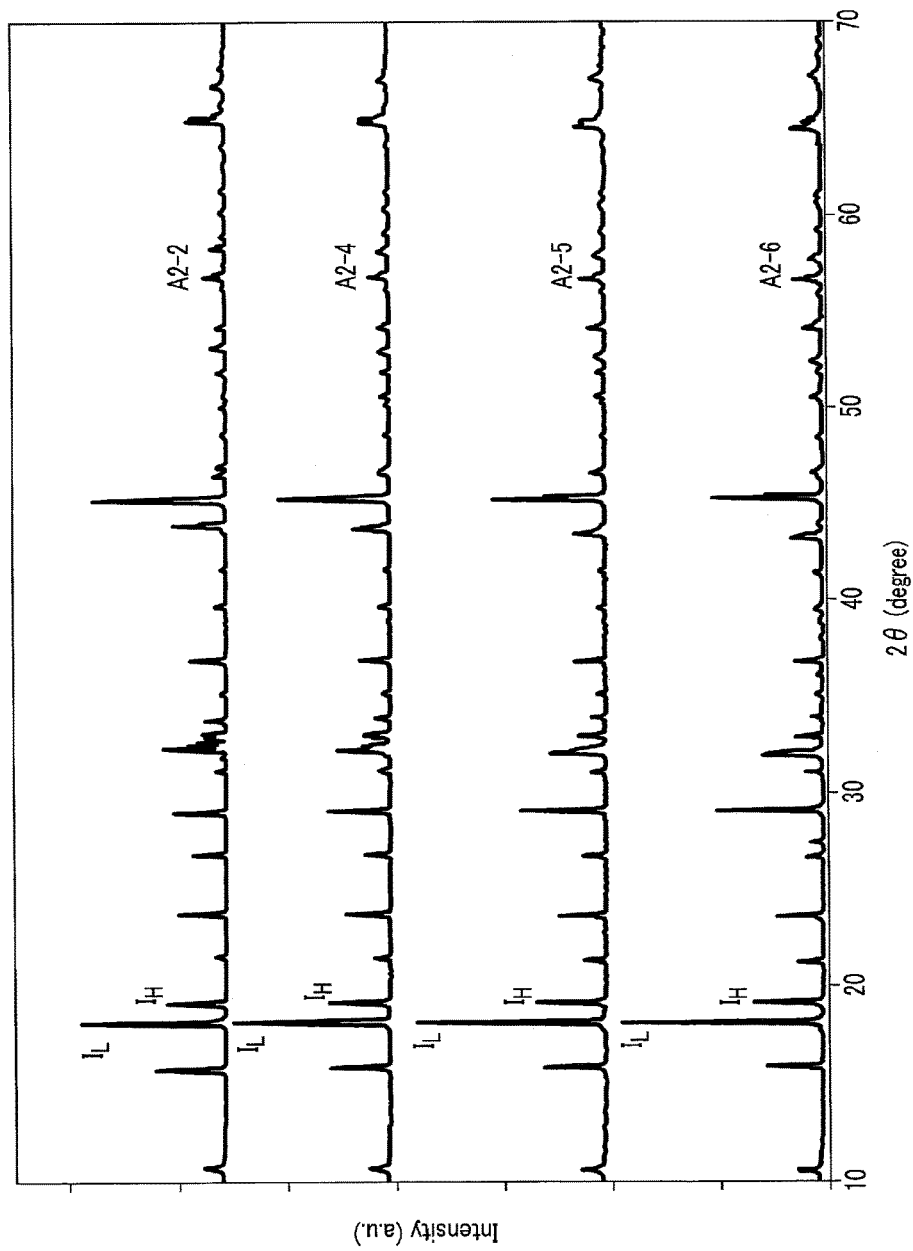
FIG. 17 shows X-ray diffraction diagrams of products of Examples A2-2, A2-4, A2-5, A2-6 and A2-9.

As typical X-ray charts, X-ray charts for Example A2-2, Example A2-4, Example A2-5, and Example A2-6 are shown in FIG. 17.

Example A2-15

In Example A2-15, a product of Example A2-15 was synthesized according to the following procedures.

First, a part of the product of Example A2-5 was immersed into a sucrose aqueous solution adjusted to a concentration of 10% by weight. Then, the sucrose solution was filtered. Then, the filtration residue was heated at 700° C. for 2 hours in a nitrogen atmosphere. The product obtained by the heating was used as the product of Example A2-15.

As a result of analyzing the product of Example A2-15 by TEM-EDX (Transmission Electron Microscopy and Energy Dispersive X-ray spectroscopy), it was found that the surface of the particles of the product of Example A2-5 was coated with carbon.

Example A2-16

In Example A2-16, a product of Example A2-16 was synthesized by coating the surface of the product of Example A2-5 with lithium titanate $Li_4Ti_5O_{12}$ using a tumbling fluidized bed granulator, according to the following procedures.

Specifically, first, lithium ethoxide and titanium tetraisopropoxide were mixed in a molar ratio of Li:Ti=4:5 to prepare a sol-gel liquid. Next, the prepared sol-gel liquid was sprayed to a part of the product of Example A2-5 in the tumbling fluidized bed granulator. Thus a composite in which the sol-gel liquid adhered to the particle surface is obtained. The composite was sintered at 600° C. for 2 hours in an air atmosphere. Thereby, the sol-gel liquid was converted into a spinel type lithium titanate. The thus obtained product was used as the product of Example A2-16.

As a result of analyzing the product of Example A2-16 by TEM-EDX (transmission electron microscopy and energy dispersive X-ray spectroscopy), and electron beam diffraction, it was found that the surface of the particle of the product of Example A2-5 was coated with a layer of lithium titanate $Li_4Ti_5O_{12}$ having spinel type crystal structure.

Example B2

In Examples B2-1 to B2-8, products of Examples B2-1 to B2-8 were obtained in the same manner as in Examples A2-1 to A2-13 except that in order to obtain products of the target compositions shown in the following Table 20, starting materials as shown in Table 20 were used. The molar ratios of the starting materials were set to ratios shown in the following Table 20.

TABLE 20

| B2 series | Target Composition | Li Source/ Amount | Na Source/ Amount | Mα Source/ Amount | Ti Source/ Amount | Mβ Source/ Amount |
|---|---|---|---|---|---|---|
| Example B2-1 | $Li_2Na_{1.9}Cs_{0.05}Ti_{5.95}Nb_{0.05}O_{14}$ | $Li_2CO_3$/1.0 | $Na_2CO_3$/0.95 | $Cs_2CO_3$/0.025 | $TiO_2$/5.95 | $Nb_2O_5$/0.025 |
| Example B2-2 | $Li_2Na_{1.5}Cs_{0.25}Ti_{5.75}Nb_{0.25}O_{14}$ | $Li_2CO_3$/1.0 | $Na_2CO_3$/0.75 | $Cs_2CO_3$/0.125 | $TiO_2$/5.75 | $Nb_2O_5$/0.125 |
| Example B2-3 | $Li_2Na_{1.0}Cs_{0.5}Ti_{5.5}Nb_{0.5}O_{14}$ | $Li_2CO_3$/1.0 | $Na_2CO_3$/0.5 | $Cs_2CO_3$/0.25 | $TiO_2$/5.50 | $Nb_2O_5$/0.25 |
| Example B2-4 | $Li_2Na_{0.5}Cs_{0.75}Ti_{5.25}Nb_{0.75}O_{14}$ | $Li_2CO_3$/1.0 | $Na_2CO_3$/0.25 | $Cs_2CO_3$/0.375 | $TiO_2$/5.25 | $Nb_2O_5$/0.375 |
| Example B2-5 | $Li_2Na_{0.1}Cs_{0.95}Ti_{5.05}Nb_{0.95}O_{14}$ | $Li_2CO_3$/1.0 | $Na_2CO_3$/0.05 | $Cs_2CO_3$/0.475 | $TiO_2$/5.05 | $Nb_2O_5$/0.475 |
| Example B2-6 | $Li_2Na_{0.5}Cs_{1.0}Ti_{5.5}Nb_{0.5}O_{14}$ | $Li_2CO_3$/1.0 | $Na_2CO_3$/0.25 | $Cs_2CO_3$/0.5 | $TiO_2$/5.50 | $Nb_2O_5$/0.25 |
| Example B2-7 | $Li_2Na_{0.25}Cs_{1.5}Ti_{5.75}Nb_{0.25}O_{14}$ | $Li_2CO_3$/1.0 | $Na_2CO_3$/0.125 | $Cs_2CO_3$/0.75 | $TiO_2$/5.75 | $Nb_2O_5$/0.125 |
| Example B2-8 | $Li_2Na_{0.05}Cs_{1.9}Ti_{5.95}Nb_{0.05}O_{14}$ | $Li_2CO_3$/1.0 | $Na_2CO_3$/0.025 | $Cs_2CO_3$/0.95 | $TiO_2$/5.95 | $Nb_2O_5$/0.025 |

The products of Examples B2-1 to B2-8 were subjected to the composition analysis and the powder X-ray diffraction measurement in the same manner as in the Example A-series. The results are shown in the following Table 21 and Table 22.

TABLE 21

| | | $Li_{2+w}Na_{2-x2}M\alpha_{y2}Ti_{6-z2}M\beta_{z2}O_{14}$ | | | |
|---|---|---|---|---|---|
| B2 series | Composition | w | x | y | z |
| Example B2-1 | $Li_2Na_{1.9}Cs_{0.05}Ti_{5.95}Nb_{0.05}O_{14}$ | 0 | 0.1 | 0.05 | 0.05 |
| Example B2-2 | $Li_2Na_{1.5}Cs_{0.25}Ti_{5.75}Nb_{0.25}O_{14}$ | 0 | 0.5 | 0.25 | 0.25 |
| Example B2-3 | $Li_2Na_{1.0}Cs_{0.5}Ti_{5.5}Nb_{0.5}O_{14}$ | 0 | 1.0 | 0.5 | 0.5 |
| Example B2-4 | $Li_2Na_{0.5}Cs_{0.75}Ti_{5.25}Nb_{0.75}O_{14}$ | 0 | 1.5 | 0.75 | 0.75 |
| Example B2-5 | $Li_2Na_{0.1}Cs_{0.95}Ti_{5.05}Nb_{0.95}O_{14}$ | 0 | 1.9 | 0.95 | 0.95 |
| Example B2-6 | $Li_2Na_{0.5}Cs_{1.0}Ti_{5.5}Nb_{0.5}O_{14}$ | 0 | 1.5 | 1.0 | 0.5 |
| Example B2-7 | $Li_2Na_{0.25}Cs_{1.5}Ti_{5.75}Nb_{0.25}O_{14}$ | 0 | 1.75 | 1.5 | 0.25 |
| Example B2-8 | $Li_2Na_{0.05}Cs_{1.9}Ti_{5.95}Nb_{0.05}O_{14}$ | 0 | 1.95 | 1.9 | 0.05 |

TABLE 22

| B2 series | Composition | Crystal Phase | Space Group | Diffraction Peak L Plane Index | Diffraction Peak L 2θ/deg | Diffraction Peak H Plane Index | Diffraction Peak H 2θ/deg | Intensity Ratio of Diffraction Peaks $I_{L20}/I_{H20}$ |
|---|---|---|---|---|---|---|---|---|
| Example B2-1 | $Li_2Na_{1.9}Cs_{0.05}Ti_{5.95}Nb_{0.05}O_{14}$ | Orthorhombic | Fmmm | (111) | 18.13 | (202) | 19.12 | 2.27 |
| Example B2-2 | $Li_2Na_{1.5}Cs_{0.25}Ti_{5.75}Nb_{0.25}O_{14}$ | Orthorhombic | Fmmm | (111) | 18.09 | (202) | 19.08 | 2.35 |
| Example B2-3 | $Li_2Na_{1.0}Cs_{0.5}Ti_{5.5}Nb_{0.5}O_{14}$ | Orthorhombic | Fmmm | (111) | 18.01 | (202) | 19.00 | 2.51 |
| Example B2-4 | $Li_2Na_{0.5}Cs_{0.75}Ti_{5.25}Nb_{0.75}O_{14}$ | Orthorhombic | Fmmm | (111) | 17.98 | (202) | 18.39 | 2.55 |
| Example B2-5 | $Li_2Na_{0.1}Cs_{0.95}Ti_{5.05}Nb_{0.95}O_{14}$ | Orthorhombic | Fmmm | (111) | 17.95 | (202) | 18.94 | 2.64 |
| Example B2-6 | $Li_2Na_{0.5}Cs_{1.0}Ti_{5.5}Nb_{0.5}O_{14}$ | Orthorhombic | Fmmm | (111) | 17.93 | (202) | 18.92 | 2.83 |
| Example B2-7 | $Li_2Na_{0.25}Cs_{1.5}Ti_{5.75}Nb_{0.25}O_{14}$ | Orthorhombic | Fmmm | (111) | 17.89 | (202) | 18.88 | 2.78 |
| Example B2-8 | $Li_2Na_{0.05}Cs_{1.9}Ti_{5.95}Nb_{0.05}O_{14}$ | Orthorhombic | Fmmm | (111) | 17.86 | (202) | 18.86 | 2.89 |

Example C2

In Examples C2-1 to C2-10, products of Example C2-1 to C2-10 were obtained in the same manner as in Examples A2-1 to A2-12 except that in order to obtain the products of target compositions shown in the following Table 23, starting materials shown in Table 23 were used. The molar ratios of the starting materials were set to ratios shown in the following Table 23.

Example c2

In Examples c2-1 and c2-2, in order to obtain products of the target compositions shown in the following Table 23, synthesis was performed in a manner described in Jpn. Pat. Appln. KOKAI Publication No. 2014-103032, thereby obtaining products of Examples c2-1 and c2-2. The molar ratios of the starting materials were set to ratios shown in the following Table 23.

TABLE 23

| C2 series | Target Composition | Li Source/Amount | Na Source/Amount | Mα Source/Amount | Ti Source/Amount | Mβ Source/Amount |
|---|---|---|---|---|---|---|
| Example c2-1 | $Li_2NaKTi_6O_{14}$ | $Li_2CO_3/1.0$ | $Na_2CO_3/0.5$ | $K_2CO_3/0.5$ | $TiO_2/6.00$ | — |
| Example c2-2 | $Li_2Na_{1.15}K_{0.6}Rb_{0.25}Ti_6O_{14}$ | $Li_2CO_3/1.0$ | $Na_2CO_3/0.575$ | $K_2CO_3/0.3$ $Rb_2CO_3/0.125$ | $TiO_2/6.00$ | — |
| Example C2-1 | $Li_2Na_{1.9}K_{0.05}Ti_{5.95}Nb_{0.05}O_{14}$ | $Li_2CO_3/1.0$ | $Na_2CO_3/0.95$ | $K_2CO_3/0.025$ | $TiO_2/5.95$ | $Nb_2O_5/0.025$ |
| Example C2-2 | $Li_2Na_{1.5}K_{0.25}Ti_{5.75}Nb_{0.25}O_{14}$ | $Li_2CO_3/1.0$ | $Na_2CO_3/0.75$ | $K_2CO_3/0.125$ | $TiO_2/5.75$ | $Nb_2O_5/0.125$ |
| Example C2-3 | $Li_2Na_{1.0}K_{0.5}Ti_{5.5}Nb_{0.5}O_{14}$ | $Li_2CO_3/1.0$ | $Na_2CO_3/0.5$ | $K_2CO_3/0.25$ | $TiO_2/5.50$ | $Nb_2O_5/0.25$ |
| Example C2-4 | $Li_2Na_{0.5}K_{0.75}Ti_{5.25}Nb_{0.75}O_{14}$ | $Li_2CO_3/1.0$ | $Na_2CO_3/0.25$ | $K_2CO_3/0.375$ | $TiO_2/5.25$ | $Nb_2O_5/0.375$ |
| Example C2-5 | $Li_2Na_{0.1}K_{0.95}Ti_{5.05}Nb_{0.95}O_{14}$ | $Li_2CO_3/1.0$ | $Na_2CO_3/0.05$ | $K_2CO_3/0.475$ | $TiO_2/5.05$ | $Nb_2O_5/0.475$ |
| Example C2-6 | $Li_2Na_{0.5}K_{1.0}Ti_{5.5}Nb_{0.5}O_{14}$ | $Li_2CO_3/1.0$ | $Na_2CO_3/0.25$ | $K_2CO_3/0.5$ | $TiO_2/5.50$ | $Nb_2O_5/0.25$ |
| Example C2-7 | $Li_2Na_{0.25}K_{1.5}Ti_{5.75}Nb_{0.25}O_{14}$ | $Li_2CO_3/1.0$ | $Na_2CO_3/0.125$ | $K_2CO_3/0.75$ | $TiO_2/5.75$ | $Nb_2O_5/0.125$ |
| Example C2-8 | $Li_2Na_{0.05}K_{1.9}Ti_{5.95}Nb_{0.05}O_{14}$ | $Li_2CO_3/1.0$ | $Na_2CO_3/0.025$ | $K_2CO_3/0.95$ | $TiO_2/5.95$ | $Nb_2O_5/0.025$ |
| Example C2-9 | $Li_2Na_{1.95}K_{0.05}Ti_{5.99}Zr_{0.01}O_{14}$ | $Li_2CO_3/1.0$ | $Na_2CO_3/0.975$ | $K_2CO_3/0.025$ | $TiO_2/5.99$ | $ZrO_2/0.01$ |
| Example C2-10 | $Li_2NaKTi_{5.9}Sn_{0.1}O_{14}$ | $Li_2CO_3/1.0$ | $Na_2CO_3/0.5$ | $K_2CO_3/0.5$ | $TiO_2/5.9$ | $SnO_2/0.1$ |

The products of Examples C2-1 to C2-7 and Examples c2-1 and c2-2 were subjected to the composition analysis and the powder X-ray diffraction measurement in the same manner as in the Example A2-series. The results thereof are shown in the following Table 24 and Table 25.

TABLE 24

| | | $Li_{2+w}Na_{2-x2}Mα_yTi_{6-z2}Mβ_{z2}O_{14}$ | | | |
|---|---|---|---|---|---|
| C2 series | Composition | w | x | y | z |
| Example c2-1 | $Li_2NaKTi_6O_{14}$ | 0 | 1.0 | 1.0 | 0 |
| Example c2-2 | $Li_2Na_{1.15}K_{0.6}Rb_{0.25}Ti_6O_{14}$ | 0 | 0.85 | 0.85 | 0 |
| Example C2-1 | $Li_2Na_{1.9}K_{0.05}Ti_{5.95}Nb_{0.05}O_{14}$ | 0 | 0.1 | 0.05 | 0.05 |
| Example C2-2 | $Li_2Na_{1.5}K_{0.25}Ti_{5.75}Nb_{0.25}O_{14}$ | 0 | 0.5 | 0.25 | 0.25 |
| Example C2-3 | $Li_2Na_{1.0}K_{0.5}Ti_{5.5}Nb_{0.5}O_{14}$ | 0 | 1.0 | 0.5 | 0.5 |
| Example C2-4 | $Li_2Na_{0.5}K_{0.75}Ti_{5.25}Nb_{0.75}O_{14}$ | 0 | 1.5 | 0.75 | 0.75 |
| Example C2-5 | $Li_2Na_{0.1}K_{0.95}Ti_{5.05}Nb_{0.95}O_{14}$ | 0 | 1.9 | 0.95 | 0.95 |
| Example C2-6 | $Li_2Na_{0.5}K_{1.0}Ti_{5.5}Nb_{0.5}O_{14}$ | 0 | 1.5 | 1.0 | 0.5 |
| Example C2-7 | $Li_2Na_{0.25}K_{1.5}Ti_{5.75}Nb_{0.25}O_{14}$ | 0 | 1.75 | 1.5 | 0.25 |
| Example C2-8 | $Li_2Na_{0.05}K_{1.9}Ti_{5.95}Nb_{0.05}O_{14}$ | 0 | 1.95 | 1.9 | 0.05 |
| Example C2-9 | $Li_2Na_{1.95}K_{0.05}Ti_{5.99}Zr_{0.01}O_{14}$ | 0 | 0.05 | 0.05 | 0.01 |
| Example C2-10 | $Li_2NaKTi_{5.9}Sn_{0.1}O_{14}$ | 0 | 1.0 | 1.0 | 0.1 |

TABLE 25

| C2 series | Composition | Crystal Phase | Space Group | Diffraction Peak L Plane Index | Diffraction Peak L 2θ/deg | Diffraction Peak H Plane Index | Diffraction Peak H 2θ/deg | Intensity Ratio of Diffraction Peaks $I_{L20}/I_{H20}$ |
|---|---|---|---|---|---|---|---|---|
| Example c2-1 | $Li_2NaKTi_6O_{14}$ | Orthorhombic | Fmmm | (111) | 18.23 | (202) | 19.24 | 2.20 |
| Example c2-2 | $Li_2Na_{1.15}K_{0.6}Rb_{0.25}Ti_6O_{14}$ | Orthorhombic | Fmmm | (111) | 18.14 | (202) | 19.15 | 2.19 |
| Example C2-1 | $Li_2Na_{1.9}K_{0.05}Ti_{5.95}Nb_{0.05}O_{14}$ | Orthorhombic | Fmmm | (111) | 18.17 | (202) | 19.16 | 2.33 |
| Example C2-2 | $Li_2Na_{1.5}K_{0.25}Ti_{5.75}Nb_{0.25}O_{14}$ | Orthorhombic | Fmmm | (111) | 18.19 | (202) | 19.18 | 2.41 |
| Example C2-3 | $Li_2Na_{1.0}K_{0.5}Ti_{5.5}Nb_{0.5}O_{14}$ | Orthorhombic | Fmmm | (111) | 18.20 | (202) | 19.20 | 2.50 |
| Example C2-4 | $Li_2Na_{0.5}K_{0.75}Ti_{5.25}Nb_{0.75}O_{14}$ | Orthorhombic | Fmmm | (111) | 18.22 | (202) | 19.21 | 2.85 |
| Example C2-5 | $Li_2Na_{0.1}K_{0.95}Ti_{5.05}Nb_{0.95}O_{14}$ | Orthorhombic | Fmmm | (111) | 18.24 | (202) | 19.23 | 2.81 |
| Example C2-6 | $Li_2Na_{0.5}K_{1.0}Ti_{5.5}Nb_{0.5}O_{14}$ | Orthorhombic | Fmmm | (111) | 18.22 | (202) | 19.22 | 2.65 |
| Example C2-7 | $Li_2Na_{0.25}K_{1.5}Ti_{5.75}Nb_{0.25}O_{14}$ | Orthorhombic | Fmmm | (111) | 18.26 | (202) | 19.25 | 3.01 |
| Example C2-8 | $Li_2Na_{0.05}K_{1.9}Ti_{5.95}Nb_{0.05}O_{14}$ | Orthorhombic | Fmmm | (111) | 18.27 | (202) | 19.27 | 2.71 |
| Example C2-9 | $Li_2Na_{1.95}K_{0.05}Ti_{5.99}Zr_{0.01}O_{14}$ | Orthorhombic | Fmmm | (111) | 18.18 | (202) | 19.17 | 2.29 |
| Example C2-10 | $Li_2NaKTi_{5.9}Sn_{0.1}O_{14}$ | Orthorhombic | Fmmm | (111) | 18.23 | (202) | 19.23 | 2.26 |

Example D2

In Examples D2-1 to D2-18, products of Examples D2-1 to D2-18 were obtained in the same manner as in Examples A2-1 to A2-12 except that in order to obtain products of the compositions shown in the following Table 26, starting materials shown in Table 26 were used. The molar ratios of the starting materials were set to ratios shown in the following Table 26.

TABLE 26

| D2 series | Target Composition | Li Source/ Amount | Na Source/ Amount | Mα source/ Amount | Ti Source/ Amount | Mβ Source/ Amount |
|---|---|---|---|---|---|---|
| Example D2-1 | $Li_2Na_{1.9}Ti_{5.8}(Nb_{0.1}Zr_{0.1})O_{14}$ | $Li_2CO_3$/1.0 | $Na_2CO_3$/0.95 | — | $TiO_2$/5.80 | $ZrO_2$/0.1 $Nb_2O_5$/0.05 |
| Example D2-2 | $Li_2Na_{1.9}Ti_{5.8}(Nb_{0.1}Sn_{0.1})O_{14}$ | $Li_2CO_3$/1.0 | $Na_2CO_3$/0.95 | — | $TiO_2$/5.80 | $SnO_2$/0.1 $Nb_2O_5$/0.05 |
| Example D2-3 | $Li_2Na_{1.5}Ti_{5.4}(Nb_{0.5}Sn_{0.1})O_{14}$ | $Li_2CO_3$/1.0 | $Na_2CO_3$/0.75 | — | $TiO_2$/5.40 | $SnO_2$/0.1 $Nb_2O_5$/0.25 |
| Example D2-4 | $Li_2Na_{1.9}Ti_{5.9}V_{0.1}O_{14}$ | $Li_2CO_3$/1.0 | $Na_2CO_3$/0.95 | — | $TiO_2$/5.90 | $V_2O_5$/0.05 |
| Example D2-5 | $Li_2Na_{1.8}Ti_{5.8}(Nb_{0.1}V_{0.1})O_{14}$ | $Li_2CO_3$/1.0 | $Na_2CO_3$/0.90 | — | $TiO_2$/5.80 | $V_2O_5$/0.05 $Nb_2O_5$/0.05 |
| Example D2-6 | $Li_2Na_{1.9}Ti_{5.9}Ta_{0.1}O_{14}$ | $Li_2CO_3$/1.0 | $Na_2CO_3$/0.95 | — | $TiO_2$/5.90 | $Ta_2O_5$/0.05 |
| Example D2-7 | $Li_2Na_{1.99}Ti_{5.99}Ta_{0.01}O_{14}$ | $Li_2CO_3$/1.0 | $Na_2CO_3$/0.995 | — | $TiO_2$/5.99 | $Ta_2O_5$/0.005 |
| Example D2-8 | $Li_2Na_{1.9}Ti_{5.9}(Nb_{0.09}Ta_{0.01})O_{14}$ | $Li_2CO_3$/1.0 | $Na_2CO_3$/0.95 | — | $TiO_2$/5.90 | $Ta_2O_5$/0.005 $Nb_2O_5$/0.045 |
| Example D2-9 | $Li_2Na_{1.5}Ti_{5.5}(Nb_{0.49}Ta_{0.01})O_{14}$ | $Li_2CO_3$/1.0 | $Na_2CO_3$/0.75 | — | $TiO_2$/5.50 | $Ta_2O_5$/0.005 $Nb_2O_5$/0.245 |
| Example D2-10 | $Li_2Na_{1.5}Ti_{5.5}(Nb_{0.4}Ta_{0.1})O_{14}$ | $Li_2CO_3$/1.0 | $Na_2CO_3$/0.75 | — | $TiO_2$/5.50 | $Ta_2O_5$/0.05 $Nb_2O_5$/0.2 |
| Example D2-11 | $Li_2Na_{1.25}Ti_{5.75}(Nb_{0.74}Ta_{0.01})O_{14}$ | $Li_2CO_3$/1.0 | $Na_2CO_3$/0.625 | — | $TiO_2$/5.75 | $Ta_2O_5$/0.005 $Nb_2O_5$/0.37 |
| Example D2-12 | $Li_2Na_{1.8}Ti_{5.9}Mo_{0.1}O_{14}$ | $Li_2CO_3$/1.0 | $Na_2CO_3$/0.90 | — | $TiO_2$/5.90 | $MoO_3$/0.1 |
| Example D2-13 | $Li_2Na_{1.4}Ti_{5.6}(Nb_{0.2}Mo_{0.2})O_{14}$ | $Li_2CO_3$/1.0 | $Na_2CO_3$/0.70 | — | $TiO_2$/5.60 | $Nb_2O_5$/0.1 $MoO_3$/0.2 |
| Example D2-14 | $Li_{2.2}Na_{1.9}Ti_{5.9}Fe_{0.1}O_{14}$ | $Li_2CO_3$/1.10 | $Na_2CO_3$/0.95 | — | $TiO_2$/5.90 | $Fe_2O_3$/0.05 |
| Example D2-15 | $Li_2Na_{1.5}Ti_{5.5}(Nb_{0.4}Fe_{0.1})O_{14}$ | $Li_2CO_3$/1.10 | $Na_2CO_3$/0.75 | — | $TiO_2$/5.50 | $Nb_2O_5$/0.20 $Fe_2O_3$/0.05 |
| Example D2-16 | $Li_{2.2}Na_{1.9}Ti_{5.9}Co_{0.1}O_{14}$ | $Li_2CO_3$/1.10 | $Na_2CO_3$/0.95 | — | $TiO_2$/5.90 | $Co_2O_3$/0.05 |
| Example D2-17 | $Li_{2.2}Na_{1.9}Ti_{5.9}Mn_{0.1}O_{14}$ | $Li_2CO_3$/1.10 | $Na_2CO_3$/0.95 | — | $TiO_2$/5.90 | $Mn_2O_3$/0.05 |
| Example D2-18 | $Li_{2.2}Na_{1.9}Ti_{5.9}Al_{0.1}O_{14}$ | $Li_2CO_3$/1.10 | $Na_2CO_3$/0.95 | — | $TiO_2$/5.90 | $Al_2O_3$/0.05 |

The products of Examples D2-1 to D2-18 were subjected to composition analysis and powder X-ray diffraction measurement in the same manner as in the Example A2-series. The results thereof are shown in the following Table 27 and Table 28.

TABLE 27

| D2 series | Composition | $Li_{2+w}Na_{2-x2}M\alpha_y Ti_{6-z2}M\beta_z O_{14}$ | | | |
|---|---|---|---|---|---|
| | | w | x | y | z |
| Example D2-1 | $Li_2Na_{1.9}Ti_{5.8}(Nb_{0.1}Zr_{0.1})O_{14}$ | 0 | 0.1 | 0 | 0.2 |
| Example D2-2 | $Li_2Na_{1.9}Ti_{5.8}(Nb_{0.1}Sn_{0.1})O_{14}$ | 0 | 0.1 | 0 | 0.2 |
| Example D2-3 | $Li_2Na_{1.5}Ti_{5.4}(Nb_{0.5}Sn_{0.1})O_{14}$ | 0 | 0.5 | 0 | 0.6 |
| Example D2-4 | $Li_2Na_{1.9}Ti_{5.9}V_{0.1}O_{14}$ | 0 | 0.1 | 0 | 0.1 |
| Example D2-5 | $Li_2Na_{1.8}Ti_{5.8}(Nb_{0.1}V_{0.1})O_{14}$ | 0 | 0.2 | 0 | 0.2 |
| Example D2-6 | $Li_2Na_{1.9}Ti_{5.9}Ta_{0.1}O_{14}$ | 0 | 0.1 | 0 | 0.1 |
| Example D2-7 | $Li_2Na_{1.99}Ti_{5.99}Ta_{0.01}O_{14}$ | 0 | 0.01 | 0 | 0.01 |
| Example D2-8 | $Li_2Na_{1.9}Ti_{5.9}(Nb_{0.09}Ta_{0.01})O_{14}$ | 0 | 0.1 | 0 | 0.1 |
| Example D2-9 | $Li_2Na_{1.5}Ti_{5.5}(Nb_{0.49}Ta_{0.01})O_{14}$ | 0 | 0.5 | 0 | 0.5 |
| Example D2-10 | $Li_2Na_{1.5}Ti_{5.5}(Nb_{0.4}Ta_{0.1})O_{14}$ | 0 | 0.5 | 0 | 0.5 |
| Example D2-11 | $Li_2Na_{1.25}Ti_{5.75}(Nb_{0.74}Ta_{0.01})O_{14}$ | 0 | 0.75 | 0 | 0.75 |
| Example D2-12 | $Li_2Na_{1.8}Ti_{5.9}Mo_{0.1}O_{14}$ | 0 | 0.2 | 0 | 0.1 |
| Example D2-13 | $Li_2Na_{1.4}Ti_{5.6}(Nb_{0.2}Mo_{0.2})O_{14}$ | 0 | 0.6 | 0 | 0.4 |
| Example D2-14 | $Li_{2.2}Na_{1.9}Ti_{5.9}Fe_{0.1}O_{14}$ | 0.2 | 0.1 | 0 | 0.1 |
| Example D2-15 | $Li_{2.2}Na_{1.5}Ti_{5.5}(Nb_{0.4}Fe_{0.1})O_{14}$ | 0.2 | 0.5 | 0 | 0.5 |
| Example D2-16 | $Li_{2.2}Na_{1.9}Ti_{5.9}Co_{0.1}O_{14}$ | 0.2 | 0.1 | 0 | 0.1 |
| Example D2-17 | $Li_{2.2}Na_{1.9}Ti_{5.9}Mn_{0.1}O_{14}$ | 0.2 | 0.1 | 0 | 0.1 |
| Example D2-18 | $Li_{2.2}Na_{1.9}Ti_{5.9}Al_{0.1}O_{14}$ | 0.2 | 0.1 | 0 | 0.1 |

TABLE 28

| D2 series | Composition | Crystal Phase | Space Group | Diffraction Peak L | | Diffraction Peak H | | Intensity Ratio of Diffraction Peaks $I_{L20}/I_{H20}$ |
|---|---|---|---|---|---|---|---|---|
| | | | | Plane Index | 2θ/deg | Plane Index | 2θ/deg | |
| Example D2-1 | $Li_2Na_{1.9}Ti_{5.8}(Nb_{0.1}Zr_{0.1})O_{14}$ | Orthorhombic | Fmmm | (111) | 18.16 | (202) | 19.16 | 2.41 |
| Example D2-2 | $Li_2Na_{1.9}Ti_{5.8}(Nb_{0.1}Sn_{0.1})O_{14}$ | Orthorhombic | Fmmm | (111) | 18.16 | (202) | 19.16 | 2.45 |
| Example D2-3 | $Li_2Na_{1.5}Ti_{5.4}(Nb_{0.5}Sn_{0.1})O_{14}$ | Orthorhombic | Fmmm | (111) | 18.15 | (202) | 19.14 | 2.56 |
| Example D2-4 | $Li_2Na_{1.9}Ti_{5.9}V_{0.1}O_{14}$ | Orthorhombic | Fmmm | (111) | 18.16 | (202) | 19.16 | 2.43 |
| Example D2-5 | $Li_2Na_{1.8}Ti_{5.8}(Nb_{0.1}V_{0.1})O_{14}$ | Orthorhombic | Fmmm | (111) | 18.16 | (202) | 19.16 | 2.42 |
| Example D2-6 | $Li_2Na_{1.9}Ti_{5.9}Ta_{0.1}O_{14}$ | Orthorhombic | Fmmm | (111) | 18.17 | (202) | 19.17 | 2.46 |
| Example D2-7 | $Li_2Na_{1.99}Ti_{5.99}Ta_{0.01}O_{14}$ | Orthorhombic | Fmmm | (111) | 18.16 | (202) | 19.15 | 2.28 |
| Example D2-8 | $Li_2Na_{1.9}Ti_{5.9}(Nb_{0.09}Ta_{0.01})O_{14}$ | Orthorhombic | Fmmm | (111) | 18.16 | (202) | 19.15 | 2.42 |
| Example D2-9 | $Li_2Na_{1.5}Ti_{5.5}(Nb_{0.49}Ta_{0.01})O_{14}$ | Orthorhombic | Fmmm | (111) | 18.15 | (202) | 19.14 | 2.53 |
| Example D2-10 | $Li_2Na_{1.5}Ti_{5.5}(Nb_{0.4}Ta_{0.1})O_{14}$ | Orthorhombic | Fmmm | (111) | 18.15 | (202) | 19.14 | 2.55 |
| Example D2-11 | $Li_2Na_{1.25}Ti_{5.75}(Nb_{0.74}Ta_{0.01})O_{14}$ | Orthorhombic | Fmmm | (111) | 18.10 | (202) | 19.11 | 2.77 |
| Example D2-12 | $Li_2Na_{1.8}Ti_{5.9}Mo_{0.1}O_{14}$ | Orthorhombic | Fmmm | (111) | 18.17 | (202) | 19.17 | 2.50 |
| Example D2-13 | $Li_2Na_{1.4}Ti_{5.6}(Nb_{0.2}Mo_{0.2})O_{14}$ | Orthorhombic | Fmmm | (111) | 18.18 | (202) | 19.18 | 2.52 |
| Example D2-14 | $Li_{2.2}Na_{1.9}Ti_{5.9}Fe_{0.1}O_{14}$ | Orthorhombic | Fmmm | (111) | 18.17 | (202) | 19.17 | 2.55 |
| Example D2-15 | $Li_{2.2}Na_{1.5}Ti_{5.5}(Nb_{0.4}Fe_{0.1})O_{14}$ | Orthorhombic | Fmmm | (111) | 18.15 | (202) | 19.14 | 2.58 |
| Example D2-16 | $Li_{2.2}Na_{1.9}Ti_{5.9}Co_{0.1}O_{14}$ | Orthorhombic | Fmmm | (111) | 18.16 | (202) | 19.17 | 2.57 |
| Example D2-17 | $Li_{2.2}Na_{1.9}Ti_{5.9}Mn_{0.1}O_{14}$ | Orthorhombic | Fmmm | (111) | 18.17 | (202) | 19.17 | 2.56 |
| Example D2-18 | $Li_{2.2}Na_{1.9}Ti_{5.9}Al_{0.1}O_{14}$ | Orthorhombic | Fmmm | (111) | 18.16 | (202) | 19.16 | 2.53 |

(Electrochemical Measurement)

For each of the products obtained in Examples described above, an electrochemical measurement was performed according to the following procedures. Explained below is an example using the product of Example A2-1; however, for the products of other Examples, too, electrochemical measurements were performed in the same manner as in for the product of Example A2-1.

First, particles of the product of Example A2-1 were ground to obtain a ground product having an average particle size of 5 μm or less. Next, acetylene black, as a conductive agent, was mixed in a proportion of 10 parts by mass relative to the active material to obtain a mixture. Next, the mixture was dispersed in NMP (N-methyl-2-pyrrolidone) to obtain a dispersion. Polyvinylidene fluoride (PVdF), as a binder, was mixed with the dispersion in a proportion of 10 parts by mass relative to the product of Example to produce an electrode slurry. This slurry was coated using a blade onto a current collector made of an aluminum foil. This was dried at 130° C. for 12 hours under vacuum, and then rolled so that the density of an electrode layer (excluding the current collector) was 2.2 g/cm³ to obtain an electrode.

Using this electrode, a metal lithium foil as a counter electrode, and nonaqueous electrolyte, an electrochemical measurement cell of Example was produced. As a nonaqueous electrolyte, a mixture in which lithium hexafluorophosphate ($LiPF_6$) was dissolved in a concentration of 1 M in a mixed solvent of ethylene carbonate and diethyl carbonate (volume ratio of 1:1) was used.

For electrochemical measurement cell of Example A2-1, a charge-and-discharge test was performed at room temperature. The charge-and-discharge test was performed within a potential range of 1.0 V to 3.0 V with reference to the metal lithium electrode at a charge-and-discharge current value of 0.2 C (hourly discharge rate). In this test, a first Li insertion amount was defined as an initial charge capacity, and a first Li release amount was defined as an initial discharge capacity. At this time, a value obtained by dividing an initial discharge capacity by the initial charge capacity, and multiplying the obtained value by 100 (initial discharge capacity/initial charge capacity ×100) was defined as an initial charge-and-discharge efficiency.

Next, in order to examine whether the product of Example A2-1 can be stably charged and discharged, the electrochemical measurement cell of Example A2-1 was repeatedly subjected to 50 cycles of charge and discharge. One cycle was considered as being one charge and one discharge. The charge and discharge were performed at room temperature within a potential range of 1.0 V to 3.0 V with reference to the metal lithium electrode at a current value of 1 C (hourly discharge rate).

In order to confirm the discharge capacity retention ratio after 50 cycles, the electrochemical measurement cell of Example was charged and discharged again at 0.2 C (hourly discharge rate), and the capacity retention ratio was calculated taking the initial discharge capacity as 100%.

In addition, the discharge capacity at 0.2 C and the discharge capacity at 10.0 C of the electrochemical measurement cell of Example A2-1 were measured. The discharge rate was calculated as the barometer of the rate performance by dividing the discharge capacity at 10 C obtained by the measurement by the capacity at 0.2 C similarly obtained by the measurement.

[Charge-and-Discharge Curve]

Figure 18:
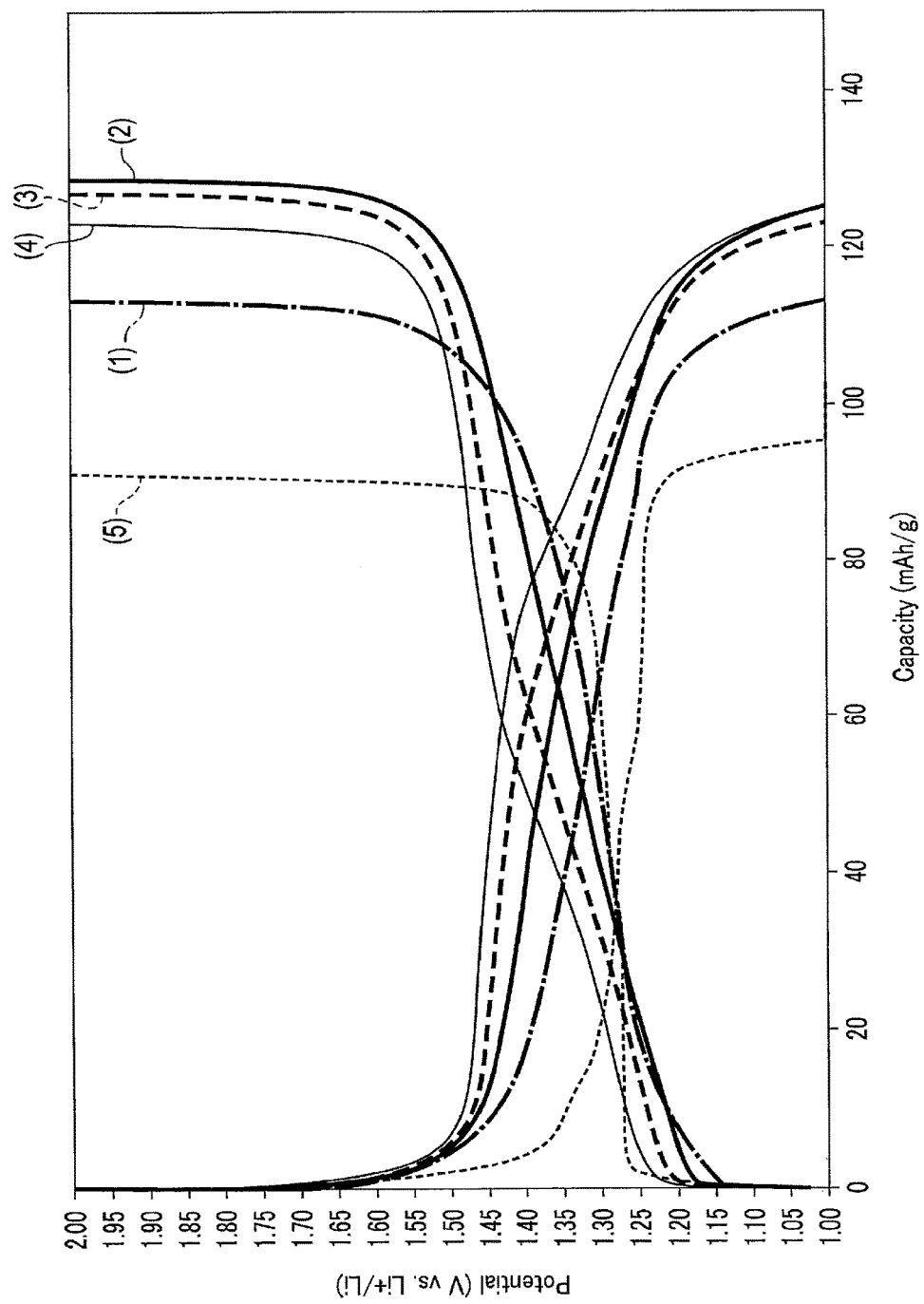
FIG. 18 shows initial charge-and-discharge curves obtained by an electrochemical measurement of electrochemical measurement cells of Examples A2-4, A2-5, A2-6 and A2-9 and an electrochemical measurement cell of Example a2-1b.

FIG. 18 shows initial charge and discharge curves obtained by the electrochemical measurement of the electrochemical measurement cells of Examples A2-4, A2-5, A2-6 and A2-9 and a electrochemical measurement cell of Example a2-1b. In FIG. 18, the dotted dashed line curves having symbol (1) show a potential change of the electrode including the orthorhombic type composite oxide of Example A2-4. The solid line curves having symbol (2) show a potential change of the electrode including the orthorhombic type composite oxide of Example A2-5. The broken line curves having symbol (3) show a potential change of the electrode including the orthorhombic type composite oxide of Example A2-6. The solid line curves having symbol (4) show a potential change of the electrode including the orthorhombic type composite oxide of Example A2-9. The dotted line curves having symbol (5) show a potential change of the electrode including the orthorhombic type composite oxide of Example a2-1b.

As apparent from FIG. 18, in a potential of the electrochemical measurement cell within a range of 1.0 V (vs. Li/Li$^+$) to 2.0 V (vs. Li/Li$^+$) which is the effective potential range of the negative electrode, the charge-and-discharge curve of Example a2-1b had, over a wide range of the capacity, potential flat portions in which the variation in the potential accompanied with a change in the capacity is small. The product of Example a2-1b exhibiting such charge-and-discharge curve is not practically preferable, because the correlation between the charging capacity and the battery voltage is difficult to grasp, as described above. Furthermore, the electrode of Example a2-1b has a small capacity of about 90 mAh/g.

On the contrary, as shown in FIG. 18, each of the charge-and-discharge curves of Examples A2-4, A2-5, A2-6, and A2-9 has, within a range of 1.0 V (vs. Li/Li$^+$) to 2.0 V (vs. Li/Li$^+$), a continuous potential-gradient exhibiting a large variation in the potential accompanying the change of charged or discharged capacity. In a rechargeable battery, a state-of-charge (residual capacity) of the battery can be estimated by examining a battery voltage. Thus the continuous potential gradient, which can be exhibited by the products of Examples A2-4, A2-5, A2-6, and A2-9, is useful when controlling the charge-and-discharge of the battery. In addition, as apparent from FIG. 18, the electrode capacities in Examples A2-4, A2-5, A2-6, and A2-9 are higher than that in Example a2-1b. Accordingly, the products of Examples A2-4, A2-5, A2-6, and A2-9 can provide a battery exhibiting a high energy density.

On the other hand, in the charge-and-discharge curves in Examples A2-4, A2-5, A2-6, and A2-9, an electrode potential relative to metal Li at SOC=50% (a state in which a half of the charge capacity is charged) varies within a range of 1.43 V to 1.30 V. It is found from this result and the compositions shown in Table 18 that a battery voltage can be arbitrarily controlled, depending on the application of the battery, by changing the value of the subscript x2 in the general formula $Li_{2+w}Na_{2-x2}M\alpha_{y2}Ti_{6-z2}M\beta_{z2}O_{14+\delta2}$ for the composite oxide. For example, when the battery is used for a battery module for automobiles, whose operating voltage range is decided, a desired battery voltage can be obtained by changing a negative electrode potential according to the positive electrode to be combined, as shown in Examples.

Although not shown, for the initial charge-and-discharge curves of the electrochemical measurement cells of Examples A2-1 to A2-3, A2-7, A2-8, A2-10 to A2-16, B2-1 to B2-8, C2-1 to C2-10, and D2-1 to D2-18, as in Examples A2-4 to 6, and A2-9, in the battery voltage of each of the electrochemical measurement cell within a range of 1.0 V to 2.0 V, an amount of variation in the potential accompanied with a change in the capacity during the charge-and-discharge was larger than that in Example a2-1b, and had a continuous potential gradient corresponding to the charged or discharged capacity. In addition, the electrode capacities in these Examples were higher than that in Example a2-1b.

Table 29 to Table 32 below show an initial discharge capacity (mAh/g), an initial charge-and-discharge efficiency (%), a 10 C/0.2 C discharge capacity ratio (%), a capacity retention ratio after 50 cycles, a potential (V vs. Li/Li$^+$) at a half charge state (when full charge is defined as 100%, 50% state-of-charge=SOC 50%), and a SOC 20-80% potential difference ΔV (mV), of each the electrochemical measurement cells of Examples A2 series to D2 series, Example a2 series, and Examples c2 series.

Here, the potential at SOC 50% refers to an electrode potential relative to metallic lithium in an open circuit state at the half charged state (a potential of the cell one hour after putting the cell in the open circuit state after charging the cell at 0.2 C from the completely discharged state (Li extracted state) to 50% of the capacity (Li insertion)).

The SOC 20-80% potential difference ΔV refers to a difference in potential between an electrode potential (vs. metallic lithium) at 20% of 0.2 C discharge capacity and an electrode potential at 80%.

Figure 19:
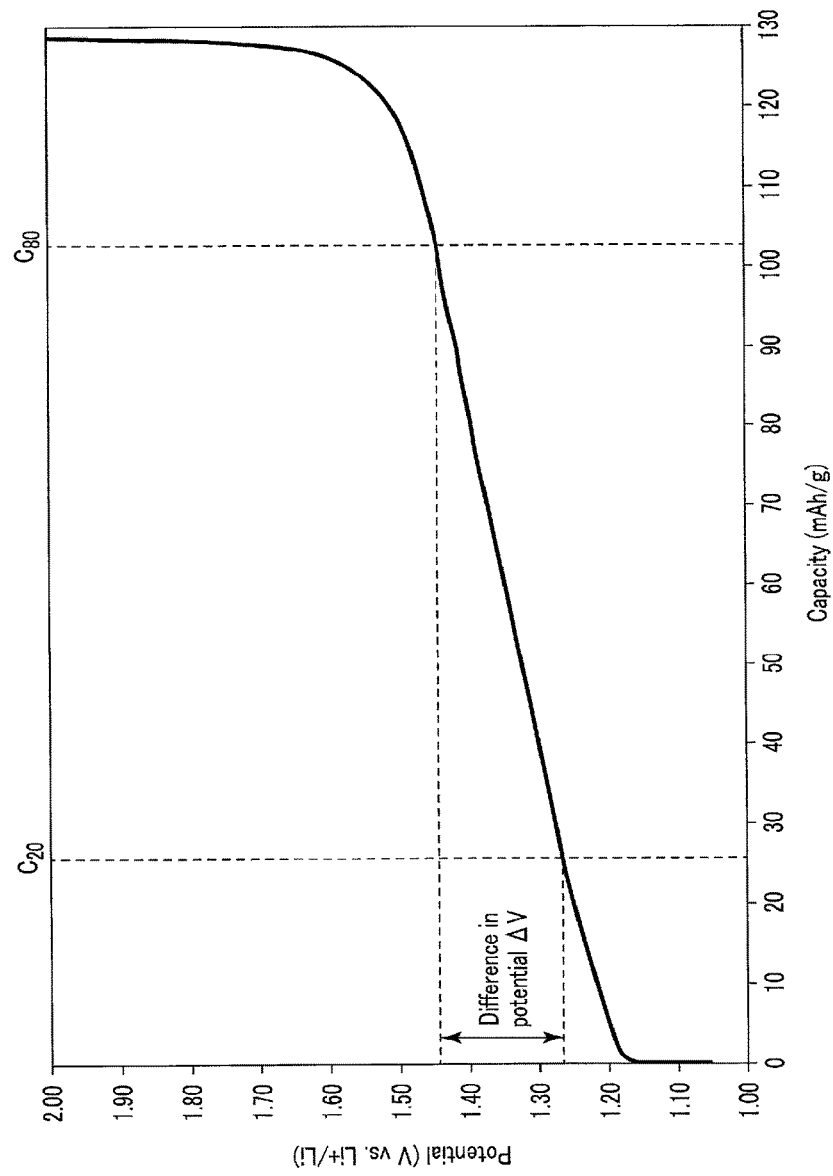
FIG. 19 shows a discharge (Li release) curve of $Li_2Na_{1.5}Ti_{5.5}O_{14}$.

The calculation method of the potential difference is as follows: FIG. 19 shows a discharge (Li release) curve of $Li_2Na_{1.5}Ti_{5.5}Nb_{0.5}O_{14}$ as one example. First, Li is inserted to an electrode including a composite oxide to be measured at a charge rate of 0.2 C, then the electrode is subjected to a constant-voltage charge at 1.0 V (vs. metallic lithium potential) for 5 hours, and a one-hour suspension is taken (CC-CV charge). Next, the electrode is discharged (Li release) at 0.2 C up to 2.0 V (vs. metallic lithium). Thus, the discharge curve as shown in FIG. 12 can be obtained. Discharge of the total capacity at this time is defined as 100%, and a difference between a potential (vs. metallic lithium) at capacity $C_{20}$, corresponding to 20%, and a potential (vs. metallic lithium) at capacity $C_{80}$, corresponding to 80%, is obtained from the discharge curve obtained as above. In FIG. 19, the potential is 1.445 V (vs. Li/Li$^+$) at SOC 80% and the potential is 1.264 V (vs. Li/Li$^+$) at SOC 20%. The difference thereof, i.e., the difference in potential ΔV is, accordingly, 181 mV. The larger the numerical value is, the larger the change in electrode potential with the change of capacity during charge and discharge is. In an electrode where this value is high, the correlation between the charged or discharged capacity and the battery voltage can be easily comprehended, and it can be presumed that it is an electrode in which the charge-and-discharge can be easily managed.

TABLE 29

| A2 series | Composition | Initial Discharge Capacity (mAh/g) | Initial Charge-and-Discharge Efficiency (%) | 10 C/0.2 C Discharge Capacity Ratio (%) | Capacity Retention Ratio after 50 Cycles (%) | Potential at SOC50% (V vs. Li+/Li) | Difference in potential between SOC20% and SOC80% ΔV (mV) |
|---|---|---|---|---|---|---|---|
| Example a2-1a | $Li_2Na_2Ti_6O_{14}$ | 90.8 | 92.0 | 89.8 | 90.5 | 1.28 | 36 |
| Example a2-1b | $Li_2Na_2Ti_6O_{14}$ | 90.7 | 92.2 | 90.1 | 90.7 | 1.28 | 35 |
| Example a2-2 | $Li_{2.1}Na_{1.9}Ti_6O_{14}$ | 91.5 | 90.9 | 89.3 | 90.1 | 1.27 | 36 |
| Example a2-3 | $Li_2Na_2Ti_{5.9}Nb_{0.1}O_{14}$ | 91.6 | 92.3 | 90.9 | 91.3 | 1.28 | 38 |
| Example a2-4 | $Li_2MgTi_6O_{14}$ | 96.1 | 91.8 | 86.5 | 87.3 | 1.42 | 18 |
| Example a2-5 | $Li_2BaTi_{5.9}Al_{0.1}O_{14}$ | 107.3 | 90.9 | 84.3 | 90.1 | 1.43 | 16 |
| Example A2-1 | $Li_2Na_{1.99}Ti_{5.99}Nb_{0.01}O_{14}$ | 92.0 | 92.1 | 89.9 | 91.5 | 1.28 | 40 |
| Example A2-2 | $Li_2Na_{1.95}Ti_{5.95}Nb_{0.05}O_{14}$ | 92.8 | 92.2 | 91.5 | 93.0 | 1.28 | 76 |
| Example A2-3 | $Li_2Na_{1.9}Ti_{5.9}Nb_{0.1}O_{14}$ | 101.7 | 92.3 | 91.4 | 92.8 | 1.29 | 118 |
| Example A2-4 | $Li_2Na_{1.75}Ti_{5.75}Nb_{0.25}O_{14}$ | 115.9 | 92.5 | 92.7 | 93.8 | 1.30 | 129 |
| Example A2-5 | $Li_2Na_{1.5}Ti_{5.5}Nb_{0.5}O_{14}$ | 131.5 | 93.5 | 92.9 | 93.6 | 1.34 | 181 |
| Example A2-6 | $Li_2Na_{1.25}Ti_{5.25}Nb_{0.75}O_{14}$ | 129.8 | 93.1 | 92.8 | 93.3 | 1.39 | 193 |
| Example A2-7 | $Li_2Na_{1.1}Ti_{5.1}Nb_{0.9}O_{14}$ | 128.5 | 92.8 | 91.3 | 92.8 | 1.41 | 183 |
| Example A2-8 | $Li_2Na_{1.05}Ti_{5.05}Nb_{0.95}O_{14}$ | 127.9 | 92.9 | 92.5 | 93.5 | 1.41 | 179 |
| Example A2-9 | $Li_2Na_{1.01}Ti_{5.01}Nb_{0.99}O_{14}$ | 122.3 | 92.7 | 92.1 | 93.6 | 1.43 | 180 |
| Example A2-10 | $Li_{2.1}Na_{1.99}Ti_{5.99}Nb_{0.01}O_{14}$ | 91.8 | 91.7 | 93.6 | 93.4 | 1.28 | 43 |
| Example A2-11 | $Li_{2.5}Na_{1.5}Ti_{5.5}Nb_{0.5}O_{14}$ | 128.9 | 93.9 | 93.2 | 92.9 | 1.33 | 181 |
| Example A2-12 | $Li_4Na_{1.5}Ti_{5.5}Nb_{0.5}O_{14}$ | 109.0 | 93.4 | 92.6 | 93.9 | 1.32 | 178 |
| Example A2-13 | $Li_6Na_{1.5}Ti_{5.5}Nb_{0.5}O_{14}$ | 92.4 | 92.6 | 92.8 | 92.2 | 1.31 | 165 |
| Example A2-14 | $Li_2Na_{1.5}Ti_{5.5}Nb_{0.5}O_{13.5}$ | 132.4 | 93.9 | 95.7 | 94.8 | 1.35 | 182 |
| Example A2-15 | $Li_2Na_{1.5}Ti_{5.5}Nb_{0.5}O_{14}$ | 133.3 | 94.1 | 96.0 | 94.9 | 1.34 | 181 |
| Example A2-16 | $Li_2Na_{1.5}Ti_{5.5}Nb_{0.5}O_{14}$ | 131.7 | 94.0 | 95.5 | 95.1 | 1.34 | 183 |

TABLE 30

| B2 series | Composition | Initial Discharge Capacity (mAh/g) | Initial Charge-and-Discharge Efficiency (%) | 10 C/0.2 C Discharge Capacity Ratio (%) | Capacity Retention Ratio after 50 Cycles (%) | Potential at SOC50% (V vs. Li+/Li) | Difference in potential between SOC20% and SOC80% ΔV (mV) |
|---|---|---|---|---|---|---|---|
| Example B2-1 | $Li_2Na_{1.9}Cs_{0.05}Ti_{5.95}Nb_{0.05}O_{14}$ | 93.1 | 92.6 | 92.0 | 93.4 | 1.28 | 81 |
| Example B2-2 | $Li_2Na_{1.5}Cs_{0.25}Ti_{5.75}Nb_{0.25}O_{14}$ | 116.7 | 92.3 | 93.1 | 93.6 | 1.31 | 131 |
| Example B2-3 | $Li_2Na_{1.0}Cs_{0.5}Ti_{5.5}Nb_{0.5}O_{14}$ | 121.9 | 92.5 | 92.8 | 93.1 | 1.42 | 178 |
| Example B2-4 | $Li_2Na_{0.5}Cs_{0.75}Ti_{5.25}Nb_{0.75}O_{14}$ | 128.4 | 93.3 | 93.2 | 93.8 | 1.42 | 186 |
| Example B2-5 | $Li_2Na_{0.1}Cs_{0.95}Ti_{5.05}Nb_{0.95}O_{14}$ | 126.6 | 92.7 | 92.9 | 93.1 | 1.42 | 165 |
| Example B2-6 | $Li_2Na_{0.5}Cs_{1.0}Ti_{5.5}Nb_{0.5}O_{14}$ | 120.3 | 92.2 | 92.3 | 93.8 | 1.42 | 155 |
| Example B2-7 | $Li_2Na_{0.25}Cs_{1.5}Ti_{5.75}Nb_{0.25}O_{14}$ | 115.9 | 92.1 | 92.6 | 94.2 | 1.30 | 128 |
| Example B2-8 | $Li_2Na_{0.05}Cs_{1.9}Ti_{5.95}Nb_{0.05}O_{14}$ | 92.5 | 91.8 | 91.9 | 93.7 | 1.25 | 92 |

TABLE 31

| C2 series | Composition | Initial Discharge Capacity (mAh/g) | Initial Charge-and-Discharge Efficiency (%) | 10 C/0.2 C Discharge Capacity Ratio (%) | Capacity Retention Ratio after 50 Cycles (%) | Potential at SOC50% (V vs. Li+/Li) | Difference in potential between SOC20% and SOC80% ΔV (mV) |
|---|---|---|---|---|---|---|---|
| Example c2-1 | $Li_2NaKTi_6O_{14}$ | 86.8 | 92.3 | 88.8 | 89.5 | 1.26 | 38 |
| Example c2-2 | $Li_2Na_{1.15}K_{0.6}Rb_{0.25}Ti_6O_{14}$ | 83.5 | 92.0 | 90.4 | 90.1 | 1.26 | 39 |
| Example C2-1 | $Li_2Na_{1.9}K_{0.05}Ti_{5.95}Nb_{0.05}O_{14}$ | 93.1 | 92.6 | 91.3 | 92.7 | 1.28 | 78 |
| Example C2-2 | $Li_2Na_{1.5}K_{0.25}Ti_{5.75}Nb_{0.25}O_{14}$ | 116.4 | 92.3 | 92.4 | 93.6 | 1.30 | 129 |
| Example C2-3 | $Li_2Na_{1.0}K_{0.5}Ti_{5.5}Nb_{0.5}O_{14}$ | 130.9 | 93.4 | 92.6 | 93.9 | 1.34 | 181 |
| Example C2-4 | $Li_2Na_{0.5}K_{0.75}Ti_{5.25}Nb_{0.75}O_{14}$ | 129.5 | 93.0 | 92.8 | 93.6 | 1.39 | 195 |
| Example C2-5 | $Li_2Na_{0.1}K_{0.95}Ti_{5.05}Nb_{0.95}O_{14}$ | 127.7 | 92.9 | 92.3 | 93.1 | 1.41 | 176 |
| Example C2-6 | $Li_2Na_{0.5}K_{1.0}Ti_{5.5}Nb_{0.5}O_{14}$ | 129.2 | 93.1 | 92.5 | 93.6 | 1.35 | 178 |
| Example C2-7 | $Li_2Na_{0.25}K_{1.5}Ti_{5.75}Nb_{0.25}O_{14}$ | 115.3 | 92.5 | 92.8 | 93.3 | 1.32 | 125 |
| Example C2-8 | $Li_2Na_{0.05}K_{1.9}Ti_{5.95}Nb_{0.05}O_{14}$ | 92.5 | 92.2 | 91.9 | 93.4 | 1.30 | 73 |
| Example C2-9 | $Li_2Na_{1.95}K_{0.05}Ti_{5.99}Zr_{0.01}O_{14}$ | 92.1 | 92.3 | 90.5 | 92.8 | 1.26 | 42 |
| Example C2-10 | $Li_2NaKTi_{5.9}Sn_{0.1}O_{14}$ | 92.0 | 92.7 | 91.7 | 92.2 | 1.26 | 45 |

TABLE 32

| D2 series | Composition | Initial Discharge Capacity (mAh/g) | Initial Charge-and-Discharge Efficiency (%) | 10 C/0.2 C Discharge Capacity Ratio (%) | Capacity Retention Ratio after 50 Cycles (%) | Potential at SOC50% (V vs. Li$^+$/Li) | Difference in potential between SOC20% and SOC80% ΔV (mV) |
|---|---|---|---|---|---|---|---|
| Example D2-1 | $Li_2Na_{1.9}Ti_{5.8}(Nb_{0.1}Zr_{0.1})O_{14}$ | 100.5 | 92.4 | 91.8 | 93.2 | 1.29 | 119 |
| Example D2-2 | $Li_2Na_{1.9}Ti_{5.8}(Nb_{0.1}Sn_{0.1})O_{14}$ | 99.7 | 92.1 | 92.0 | 92.9 | 1.29 | 116 |
| Example D2-3 | $Li_2Na_{1.5}Ti_{5.4}(Nb_{0.5}Sn_{0.1})O_{14}$ | 131.4 | 93.8 | 93.3 | 93.9 | 1.34 | 180 |
| Example D2-4 | $Li_2Na_{1.9}Ti_{5.9}V_{0.1}O_{14}$ | 101.8 | 92.6 | 92.5 | 93.5 | 1.29 | 117 |
| Example D2-5 | $Li_2Na_{1.8}Ti_{5.8}(Nb_{0.1}V_{0.1})O_{14}$ | 102.5 | 93.5 | 93.4 | 93.4 | 1.29 | 118 |
| Example D2-6 | $Li_2Na_{1.9}Ti_{5.9}Ta_{0.1}O_{14}$ | 101.9 | 92.1 | 91.6 | 92.5 | 1.29 | 115 |
| Example D2-7 | $Li_2Na_{1.99}Ti_{5.99}Ta_{0.01}O_{14}$ | 92.2 | 92.3 | 90.2 | 91.8 | 1.28 | 46 |
| Example D2-8 | $Li_2Na_{1.9}Ti_{5.9}(Nb_{0.09}Ta_{0.01})O_{14}$ | 102.3 | 92.2 | 91.7 | 92.6 | 1.29 | 116 |
| Example D2-9 | $Li_2Na_{1.5}Ti_{5.5}(Nb_{0.49}Ta_{0.01})O_{14}$ | 133.5 | 93.8 | 93.1 | 94.3 | 1.34 | 182 |
| Example D2-10 | $Li_2Na_{1.5}Ti_{5.5}(Nb_{0.4}Ta_{0.1})O_{14}$ | 129.4 | 93.7 | 92.8 | 93.6 | 1.34 | 178 |
| Example D2-11 | $Li_2Na_{1.25}Ti_{5.75}(Nb_{0.74}Ta_{0.1})O_{14}$ | 130.1 | 93.5 | 93.0 | 93.9 | 1.39 | 200 |
| Example D2-12 | $Li_2Na_{1.8}Ti_{5.9}Mo_{0.1}O_{14}$ | 100.5 | 92.1 | 92.3 | 92.8 | 1.29 | 111 |
| Example D2-13 | $Li_2Na_{1.4}Ti_{5.6}(Nb_{0.2}Mo_{0.2})O_{14}$ | 130.6 | 92.4 | 93.3 | 93.0 | 1.34 | 179 |
| Example D2-14 | $Li_{2.2}Na_{1.9}Ti_{5.9}Fe_{0.1}O_{14}$ | 99.3 | 92.0 | 92.7 | 92.5 | 1.28 | 108 |
| Example D2-15 | $Li_{2.2}Na_{1.5}Ti_{5.5}(Nb_{0.4}Fe_{0.1})O_{14}$ | 135.5 | 93.7 | 93.3 | 94.1 | 1.34 | 180 |
| Example D2-16 | $Li_{2.2}Na_{1.9}Ti_{5.9}Co_{0.1}O_{14}$ | 98.3 | 92.3 | 92.9 | 93.0 | 1.28 | 109 |
| Example D2-17 | $Li_{2.2}Na_{1.9}Ti_{5.9}Mn_{0.1}O_{14}$ | 99.0 | 92.1 | 92.7 | 92.7 | 1.28 | 106 |
| Example D2-18 | $Li_{2.2}Na_{1.9}Ti_{5.9}Al_{0.1}O_{14}$ | 97.7 | 92.1 | 92.9 | 92.4 | 1.28 | 108 |

Example E2

In Example E2, a nonaqueous electrolyte battery was produced according to the following procedures.

(Production of Negative Electrode)

First, particles of the product of Example A2-5 were ground so that the average particle size was 5 μm or less to obtain a ground product. Next, acetylene black, as a conductive agent, was mixed with the active material in a proportion of 6 parts by mass relative to the active material to obtain a mixture. Next, the mixture was dispersed in NMP (N-methyl-2-pyrrolidone) to obtain a dispersion. Polyvinylidene fluoride (PVdF), as a binder, was mixed with the dispersion in proportion of 10 parts by mass relative to the product of Example A-5 to prepare a negative electrode slurry. A current collector, formed of aluminum foil, was coated with the slurry using a blade. After the obtained product was dried at 130° C. for 12 hours in vacuum, it was rolled so that a density of the electrode layer (excluding the current collector) was 2.2 g/cm$^3$ to obtain a negative electrode.

(Production of Positive Electrode)

With a commercially available spinel lithium manganese oxide (LiMn$_2$O$_4$) was mixed 5 parts by weight of acetylene black as a conductive auxiliary agent to obtain a mixture. Next, the mixture was dispersed in NMP to obtain a dispersion. To the dispersion was mixed PVdF, as a binder, in a proportion of 5 parts by weight relative to the lithium manganese oxide to prepare a positive electrode slurry. A current collector, formed of an aluminum foil, was coated with the slurry using a blade. After the obtained product was dried at 130° C. for 12 hours in vacuum, it was rolled so that a density of the electrode layer (excluding the current collector) was 2.1 g/cm$^3$, to obtain a positive electrode.

(Production of Electrode Group)

The positive electrode and the negative electrode produced as described above were stacked with a polyethylene separator sandwiched therebetween to obtain a stack. Next, this stack was wound and pressed to obtain a flat-shaped wound electrode group. A positive electrode terminal and a negative electrode terminal were connected to this electrode group.

(Preparation of Nonaqueous Electrolyte)

As a mixed solvent, a mixed solvent of ethylene carbonate and diethyl carbonate (volume ratio of 1:1) was provided. Lithium hexafluorophosphate (LiPF$_6$) was dissolved in this solvent in a concentration of 1 M. Thus, a nonaqueous electrolyte was prepared.

(Assembly of Nonaqueous Electrolyte Battery)

Using the electrode group and the nonaqueous electrolyte produced as described above, a nonaqueous electrolyte battery of Example E2 was fabricated.

(Charge-and-Discharge Test)

The nonaqueous electrolyte battery of Example E2 was subjected to a charge-and-discharge test at room temperature. The charge-and-discharge test was performed at a charge-and-discharge current value of 0.2 C (a time discharge rate) within a potential range of 1.8 V to 3.1 V as the battery voltage.

Figure 20:
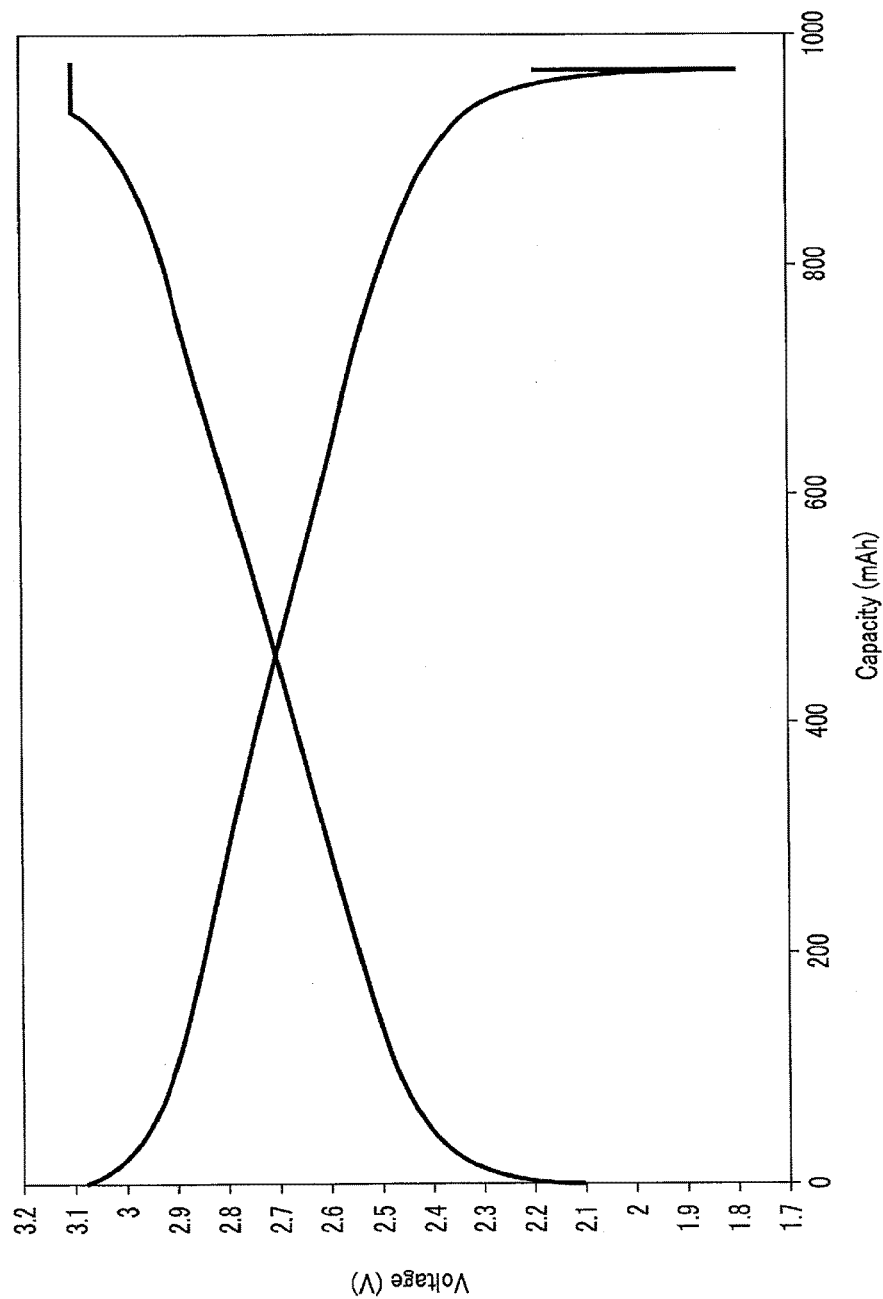
FIG. 20 shows a charge-and-discharge curve of a nonaqueous electrolyte battery of Example E2.

FIG. 20 shows a charge-and-discharge curve of the nonaqueous electrolyte battery of Example E2. As apparent from FIG. 20, in the nonaqueous electrolyte battery of Example E2, the voltage changes smoothly within a voltage range of 2.3 V to 3.0 V. That is, a nonaqueous electrolyte battery in which the voltage smoothly varies within a voltage range of 2.3 V to 3.0 V was obtained by using the product of Example A2-5. When five of the nonaqueous electrolyte batteries are connected to each other in series, the operating voltage becomes higher than that obtained in a case using a spinel type lithium titanate (Li$_4$Ti$_5$O$_{12}$) as the negative electrode, i.e., 15.1 V to 11.5 V, and thus, a battery pack having a voltage compatible with a 12 V lead storage battery for automobiles can be fabricated.

Example F2

In Example F2, battery modules of Examples F2-1 to F2-4 were produced according to the following procedures.

Example F2-1

In Example F2-1, five nonaqueous electrolyte batteries of Example F2-1 were produced by the same procedures as described in Example E2 except that the particles of the product of Example A2-4 were used instead of the particles of the product of Example A2-5 when the negative electrode was produced.

Next, the five nonaqueous electrolyte batteries produced were electrically connected to each other in series. The thus obtained battery module was used as the battery module of Example F2-1.

Example F2-2 to F2-4

In Examples F2-2 to F2-4, battery modules of Examples F2-2 to F2-4 were produced by the same procedure as in Example F2-1 except that the nonaqueous electrolyte battery of each of Examples F2-2 to F2-4 produced by the following procedures was used.

In Example F2-2, five nonaqueous electrolyte batteries each of which was the same as the nonaqueous electrolyte battery of Example E2 were produced by the same procedure as described in Example E2. They were used as the nonaqueous electrolyte batteries of Example F2-2.

In Example F2-3, five nonaqueous electrolyte batteries of Example F2-3 were produced by the same procedure as described in Example E2 except that the particles of the product of Example A2-6 were used instead of the particles of the product of Example A2-5 when the negative electrode was produced.

In Example F2-4, five nonaqueous electrolyte batteries of Example F2-4 were produced by the same procedure as described in Example E2 except that the particles of the product of Example A2-9 were used instead of the particles of the product of Example A2-5 when the negative electrode was produced.

(Charge-and-Discharge Test)

The battery modules of Examples F2-1 to F2-4 were subjected to a charge-and-discharge test at room temperature. The charge-and-discharge test was performed at a charge-and-discharge current value of 0.2 C (a time discharge rate) within a potential range of 9.0 V to 15.5 V as the voltage of the battery module.

FIG. 21 shows discharge curves of the battery modules of Examples F2-1 to F2-4. In FIG. 21, the dotted dashed line curve having symbol (1) shows a discharge curve of the battery module of Example F2-1. The solid line curve having symbol (2) shows a discharge curve of the battery module of Example F2-2. The broken line curve having symbol (3) shows a discharge curve of the battery module of Example F2-3. In addition, the solid line curve having symbol (4) shows a discharge curve of the battery module of Example F2-4.

From the results shown in FIG. 21, it is found that when the products of Examples A2-4, A2-5, A2-6 and A2-9 are used as the negative electrode active material, battery modules having an average operating-voltage within a range of about 12.5 V to 13.5 V can be produced. It also is found that each discharge curve has a different voltage gradient. By changing the average operating-voltage or the voltage gradient as such, the operating voltage of the battery module can be designed according to the use. For example, when a motor assist type hybrid car or an idling stop system is constructed by combining the battery module with a 12 V lead storage battery for automobiles, it is possible to prevent over-discharge of the lead storage battery upon a high load or to design a battery pack voltage that adapts to a voltage fluctuation upon an input of regenerative energy.

The nonaqueous electrolyte battery using spinel lithium titanate ($Li_4Ti_5O_{12}$) as the negative electrode has a low average-operating-voltage, and thus, in order to obtain a voltage compatible with a lead storage battery for automobiles, it is necessary to connect six batteries in series. On the other hand, as explained referring to examples, when the products of Example A2-series, Example B2-series, Example C2-series and Example D2-series are used for the negative electrode, the average operating-voltage of the nonaqueous electrolyte battery can be increased. When the products of Example A2-series, Example B2-series, Example C2-series and Example D-2series are used, accordingly, even if the number of the nonaqueous electrolyte batteries connected in series is changed to five, a battery module, and battery pack also, that are capable of exhibiting a voltage compatible with the 12 V lead storage battery for automobiles can be constructed can be constructed. The products of Example A2-series, Example B2-series, Example C2-series, and Example D2-series, accordingly, can realize a small size battery pack capable of exhibiting a low resistance and a high energy density at a low cost.

According to at least one embodiment and Example described above, a battery module is provided. The battery module includes a negative electrode including an active material that includes a titanium composite oxide. The titanium composite oxide includes Na and a metal element M in its crystal structure. The metal element M is at least one selected from the group consisting of Zr, Sn, V, Nb, Ta, Mo, W, Fe, Co, Mn, and Al. The battery module can exhibit an average operating voltage comparable to the average operating voltage of a 12 V battery module including a lead storage battery. Therefore, the battery module can exhibit excellent voltage compatibility with a battery module including a lead storage battery.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A battery module comprising five nonaqueous electrolyte batteries electrically connected in series, each of the five nonaqueous electrolyte batteries comprising:
   a positive electrode;
   a negative electrode; and
   a nonaqueous electrolyte,
   wherein the negative electrode comprises an active material comprising a titanium composite oxide comprising Na and a metal element M in its crystal structure, the metal element M being at least one selected from the group consisting of Zr, Sn, V, Nb, Ta, Mo, W, Fe, Co, Mn, and Al, and
   the crystal structure of the titanium composite oxide has symmetry belonging to a space group Cmca or Fmmm.

2. The battery module according to claim 1, wherein the metal element M comprises Nb.

3. The battery module according to claim 1, wherein the titanium composite oxide is a composite oxide represented by a formula $Li_{2+a}M(I)_{2-b}Ti_{6-c}M(II)_dO_{14+\sigma}$:
   wherein:
   M(I) is Na, or comprises Na and at least one element selected from the group consisting of Sr, Ba, Ca, Mg, Cs, and K;

M(II) is at least one element selected from the group consisting of Zr, Sn, V, Nb, Ta, Mo, W, Fe, Co, Mn, and Al;

a is within a range of $0 \leq a \leq 6$;
b is within a range of $0 \leq b < 2$;
c is within a range of $0 < c < 6$;
d is within a range of $0 < d \leq 6$; and
σ is within a range of $-0.5 \leq \sigma \leq 0.5$.

4. The battery module according to claim 1, wherein the titanium composite oxide has an orthorhombic crystal structure, and is a composite oxide represented by a formula $Li_xM1_{1-y}M2_yTi_{6-z}M3_zO_{14+\delta}$:

wherein:
M1 is at least one element selected from the group consisting of Sr, Ba, Ca, and Mg;
M2 is Na, or comprises Na and at least one element selected from the group consisting of Cs and K;
M3 is at least one element selected from the group consisting of Al, Fe, Zr, Sn, V, Nb, Ta, and Mo;
x is within a range of $2 \leq x \leq 6$;
y is within a range of $0 < y < 1$;
z is within a range of $0 < z < 6$; and
δ is within a range of $-0.5 \leq \delta \leq 0.5$.

5. The battery module according to claim 4, wherein M3 is at least one element selected from the group consisting of trivalent Al and Fe, tetravalent Zr and Sn, pentavalent V, Nb and Ta, and hexavalent Mo.

6. The battery module according to claim 4, wherein, in an X-ray diffraction diagram for the composite oxide obtained by a powder X-ray diffraction method using Cu—Kα rays, an intensity ratio $I_L/I_H$ is within a range of $0.6 \leq I_L/I_H \leq 3$, wherein the intensity $I_L$ is an intensity of a strongest diffraction peak appearing within a range of $17° \leq 2\theta \leq 18.5°$, and the intensity $I_H$ is an intensity of a strongest diffraction peak appearing within a range of $18.5° < 2\theta \leq 19.5°$.

7. The battery module according to claim 1, wherein the titanium composite oxide has an orthorhombic crystal structure, and is a composite oxide represented by a formula $Li_{2+w}Na_{2-x2}M\alpha_{y2}Ti_{6-z2}M\beta_{z2}O_{14+\delta2}$:

wherein:
Mα is at least one element selected from the group consisting of Cs and K;
Mβ is at least one element selected from the group consisting of Zr, Sn, V, Nb, Ta, Mo, W, Fe, Co, Mn, and Al;
w is within a range of $0 \leq w \leq 4$;
x2 is within a range of $0 < x2 < 2$;
y2 is within a range of $0 \leq y2 < 2$;
z2 is within a range of $0 < z2 < 6$; and
δ2 is within a range of $-0.5 \leq \delta2 \leq 0.5$.

8. The battery module according to claim 7, wherein Mβ is at least one element selected from the group consisting of trivalent Fe, Co, Mn and Al, tetravalent Zr and Sn, pentavalent V, Nb and Ta, and hexavalent Mo and W.

9. A battery pack comprising the battery module according to claim 1.

10. The battery pack according to claim 9, which further comprises a protective circuit and an energizing terminal.

11. The battery pack according to claim 9, wherein the battery pack comprises a plurality of the battery modules, wherein the plurality of the battery modules are electrically connected in series, in parallel, or in a combination of in series and in parallel.

12. A vehicle onto which is mounted the battery pack according to claim 9.

13. The vehicle according to claim 12, wherein the battery pack is configured to recover a regenerative energy from motivity of the vehicle.

14. The battery module according to claim 4, wherein the titanium composite oxide has a charge neutrality.

15. The battery module according to claim 7, wherein the titanium composite oxide has a charge neutrality.

16. The battery module according to claim 7, wherein, in an X-ray diffraction diagram for the composite oxide obtained by a powder X-ray diffraction method using Cu—Kα rays, an intensity ratio $I_{L20}/I_{H20}$ is within a range of $2.25 \leq I_{L20}/I_{H20} \leq 3.5$, wherein the intensity $I_{L20}$ is an intensity of a strongest diffraction peak appearing in a range of $17° \leq 2\theta \leq 18.5°$, and the intensity $I_{H20}$ is an intensity of a strongest diffraction peak appearing in a range of $18.5° \leq 2\theta \leq 19.5°$.

17. The battery module according to claim 1, wherein the metal element M is at least one selected from the group consisting of Zr, Sn, V, Ta, Mo, Fe, Co, and Mn.

* * * * *